(12) United States Patent
Araki et al.

(10) Patent No.: US 8,775,374 B2
(45) Date of Patent: Jul. 8, 2014

(54) DATA SYNCHRONIZATION SYSTEM AND DATA SYNCHRONIZATION METHOD

(75) Inventors: Yoshiaki Araki, Tokyo (JP); Susumu Ishizuka, Tokyo (JP)

(73) Assignee: KII Corporation, Tokyo (JP)

( * ) Notice: Subject to any disclaimer, the term of this patent is extended or adjusted under 35 U.S.C. 154(b) by 115 days.

(21) Appl. No.: 13/390,431

(22) PCT Filed: Aug. 11, 2010

(86) PCT No.: PCT/JP2010/063623
§ 371 (c)(1),
(2), (4) Date: Mar. 26, 2012

(87) PCT Pub. No.: WO2011/027654
PCT Pub. Date: Mar. 10, 2011

(65) Prior Publication Data
US 2012/0179653 A1  Jul. 12, 2012

(30) Foreign Application Priority Data
Sep. 4, 2009 (JP) ................................. 2009-204686

(51) Int. Cl.
*G06F 7/02* (2006.01)
*G06F 17/30* (2006.01)
*G06F 11/20* (2006.01)

(52) U.S. Cl.
CPC .... *G06F 17/30174* (2013.01); *G06F 17/30144* (2013.01); *G06F 17/30575* (2013.01); *G06F 11/2082* (2013.01)
USPC ............ 707/621; 707/613; 707/624; 707/634

(58) Field of Classification Search
CPC .................... G06F 17/30174; G06F 17/30144; G06F 17/30575; G06F 11/2082
See application file for complete search history.

(56) References Cited

U.S. PATENT DOCUMENTS

| 6,564,215 | B1 * | 5/2003 | Hsiao et al. ........................ 1/1 |
| 7,280,996 | B2 * | 10/2007 | Hayakawa et al. ........... 707/621 |
| 2002/0194205 | A1 * | 12/2002 | Brown et al. ................. 707/200 |
| 2004/0044799 | A1 | 3/2004 | Sivaraman et al. |
| 2004/0205263 | A1 | 10/2004 | Sivaraman et al. |

FOREIGN PATENT DOCUMENTS

| CN | 101030157 A | 9/2007 |
| JP | 2004-086800 | 3/2004 |
| JP | 2005-537579 | 12/2005 |

OTHER PUBLICATIONS

"Open Mobile Alliance DS Protocol", Approved Version 1.2.1, Open Mobile Alliance Ltd., Aug. 10, 2007, cover sheet and pp. 17-18, 78-79, [online], [retrieval date Heisei 22 Nen 9 Gatsu 13 Nichi], <http://www.openmobilealliance.org/technical/release_program/docs/DS/V1_2_1-20070810-A/OMA-TS-DS_Protocol-V1_2_1-20070810-A.pdf>.
"System Development of Telephone Directory Entrust Service", Makoto Hamatsu et al., NTT DoCoMo Technical Journal, Jul. 1, 2006, vol. 14 No. 2, 15 pages.
Office Action for corresponding Chinese Patent Application No. 201080039401.8, issued by SIPO on Apr. 3, 2013 (in Chinese with English Translation).

* cited by examiner

*Primary Examiner* — Bruce Moser
(74) *Attorney, Agent, or Firm* — Harness, Dickey & Pierce, PLC

(57) ABSTRACT

[PROBLEM TO BE SOLVED] To reduce a server load when synchronizing data between a client and a server.
[SOLUTION] A client 10 sends a synchronization request 41 containing an anchor point to a server 20. The server 20 sends synchronization information 42 to the client 10, which synchronization information including change profile information on data updated between the anchor point and a boundary point and change profile information on a change log after the anchor point. Based on the synchronization information 42, the client 10 sends a download request 43 to the server 20, and the server 20 sends download information 44 to the client 10 in response to the download request 43. The client 10 registers data contained in the download information 44 to a client database 11.

20 Claims, 47 Drawing Sheets

Fig. 6

ANCHOR STORING PART 132

| FILTER | ANCHOR |
|---|---|
| category=company | 154 |
| category=friend | 132 |
| FURIGANA LIKE "A%" | 101 |
| ⋮ | ⋮ |

Fig. 12

SERVER DB

| GUID | CREATION POINT | UPDATE POINT | KEY | COLUMN | HINT | BODY |
|---|---|---|---|---|---|---|
| 0001 | 1 | 5 | 03-1234... | category=company | name=○○ | phone=03-01234-.... |
| 0002 | 2 | 2 | 03-1234... | category=friend | name=△△ | phone=03-01234-.... |
| 0003 | 2 | 8 | 06-3333... | category=company | name=□□ | phone=03-01234-.... |
| 0004 | 2 | 9 | 03-3344... | category=friend | name=◎◎ | phone=03-01234-.... |
| 0005 | 3 | 3 | 06-4433... | category=company | name=▽▽ | phone=03-01234-.... |
| ⋮ | ⋮ | ⋮ | ⋮ | ⋮ | ⋮ | ⋮ |

Fig. 13

SERVER CHANGE LOG STORING PART 231

| GUID | POINT OF CREATION | POINT OF UPDATE | DELETE FLAG | OLD COLUMN | NEW COLUMN | HINT | KEY |
|---|---|---|---|---|---|---|---|
| 0002 | 2 | 2 | FALSE | category=friend | category=friend | IMPORTANCE=1 | 03-1234... |
| 0005 | 2 | 3 | FALSE | category=company | category=company | IMPORTANCE=5 | 03-1234... |
| 0001 | 1 | 4 | FALSE | category=friend | category=friend | IMPORTANCE=5 | 06-3333... |
| 0001 | 1 | 5 | FALSE | category=friend | category=company | IMPORTANCE=5 | 03-3344... |
| 0008 | 9 | 15 | FALSE | category=friend |  | IMPORTANCE=5 | 06-4433... |

Fig. 24

CLIENT DB 11

| LUID | GUID | UPDATE POINT | UPDATE POSSIBILITY FLAG | DELETE POSSIBILITY FLAG | KEY | COLUMN | HINT | BODY |
|---|---|---|---|---|---|---|---|---|
| C1-001 | 0001 | 5 | FALSE | FALSE | 03-01234-.... | category=company | name=○○ | phone=03-01234-, ... |
| C1-002 | 0005 | 3 | FALSE | FALSE | 03-01234-... | category=company | name=○○ | phone=03-01234-, ... |
| ⋮ | ⋮ | ⋮ | ⋮ | ⋮ | ⋮ | ⋮ | ⋮ | ⋮ |

CLIENT CHANGE LOG STORING PART

| TYPE OF CHANGE | LUID | GUID | UPDATE POINT | OLD COLUMN | NEW COLUMN | KEY | HINT |
|---|---|---|---|---|---|---|---|
| ADD | L0001 | null | null | category=company | category=company | 03-1234-... | ○○ |
| UPDATE | C1-002 | 0005 | 3 | category=company | category=company | 03-1234-... | ○○ |
| ⋮ | ⋮ | ⋮ | ⋮ | ⋮ | ⋮ | ⋮ | ⋮ |

Fig. 35

SERVER DB 21

| GUID | CREATION POINT | LUID | CREATOR ID | UPDATE POINT | KEY | COLUMN | HINT | BODY |
|---|---|---|---|---|---|---|---|---|
| 0001 | 1 | C1-001 | C1 | 5 | 03-1234... | category=company | name=○○ | phone=03-01234-.... |
| 0002 | 2 | C3-011 | C3 | 2 | 03-1234... | category=friend | name=△△ | phone=03-01234-.... |
| 0003 | 2 | C2-101 | C2 | 8 | 06-3333... | category=company | name=□□ | phone=03-01234-.... |
| 0004 | 2 | C1-014 | C1 | 9 | 03-3344... | category=friend | name=◎◎ | phone=03-01234-.... |
| 0005 | 3 | C1-002 | C1 | 3 | 06-4433... | category=company | name=▽▽ | phone=03-01234-.... |
| ⋮ | ⋮ | ⋮ | ⋮ | ⋮ | ⋮ | ⋮ | ⋮ | ⋮ |

DATA SYNCHRONIZATION SYSTEM AND DATA SYNCHRONIZATION METHOD

CROSS-REFERENCE TO RELATED APPLICATIONS

This application is a 371 U.S. National Stage of International Application No. PCT/JP2010/063623, filed Aug. 11, 2010. This application claims the benefit of Japanese Patent Application No. 2009-204686, filed Sep. 4, 2009. The disclosures of the above applications are incorporated herein by reference.

TECHNICAL FIELD

The present invention relates to data synchronization system and data synchronization method.

BACKGROUND ART

It is known that a client such as a mobile phone synchronizes data with a server. The client regularly makes inquiries about whether there is any data that has been changed and, if there is updated data, downloads the data. In the background art, the server keeps a change log to manage whether there is any data that has been changed. For example, according to PTL 1, in order to avoid sending and receiving a large quantity of data in single data synchronization, an update log of a second database is stored and synchronization is initiated when a number of records in the update log is greater than a threshold.

CITATION LIST

Patent Literature

PTL 1: JP-A-2004-86800

DISCLOSURE OF INVENTION

Problems to be Solved by the Invention

However, a client such as a mobile phone is not always capable of communicating with a server, and in a case of an elongated communication failure time between the server and the client, it is necessary to store all change logs until recovery. Further, in a case where a server communicates with a plurality of clients, it is necessary to manage up to which point each of the clients has been synchronized.

The present invention is contrived in view of the background, and its object is to provide a data synchronization system and a data synchronization method that can reduce a server load when synchronizing data between a client and a server.

Means for Solving the Problems

A main aspect of the present invention in solving the above-mentioned problems is, a data synchronization system for synchronizing data between a server and a client communicably connected to the server, the server being accessible to a first database configured to store at least one data item containing an update point, the client being accessible to a second database configured to store the data item acquired from the server, the client including: an anchor point storing part that stores an anchor point which is a point in time at which the data item was last acquired from the server; and a synchronization request sending part configured to send a synchronization request containing the anchor point to the server, the server including: a change information acquiring part configured to search for an updated data item in the first database, the updated data item being the data item in which the update point is later than the anchor point, and creates change information for each of the updated data items, the change information containing a data ID indicating the updated data item and the update point of the updated data item; and a synchronization information sending part configured to send synchronization information containing the change information to the client, the client further including: a download determining part configured to determine an acquisition data item to be downloaded from among the data items corresponding to the change information; and a download request sending part configured to send a download request to the server, the download request containing a data ID indicating the acquisition data item, the server further including: a data acquiring part configured to acquire, from the first database, the data item corresponding to the data ID contained in the download request; and a download information sending part configured to send download information containing the acquired data to the client, the client further including: an update processing part configured to register the data item contained in the download information to the second database.

Further, according to the data synchronization system of the present invention, for each of the change information, the download determining part may acquire, from the second database, the update point contained in the data item corresponding to the data ID contained in the change information, and in a case where the update point acquired from the second database is older than the update point contained in the change information, may determine that the data item is to be downloaded, and in a case where the update point acquired from the second database is newer than the update point contained in the change information, may determine whether or not to download the data item in response to a setting specified by a user.

Further, according to the data synchronization system of the present invention, the server may further include: a server change log storing part configured to store a change log containing the data ID indicating the data item deleted from the first database and a delete point; and a change log acquiring part configured to acquire, from the server change log storing part, the change log that contains the delete point which is later than the anchor point contained in the synchronization request, the synchronization information sending part may adds the change log acquired by the change log acquiring part into the synchronization information, and the client may further includes a delete processing part that deletes, from the second database, the data item corresponding to the change log contained in the synchronization information.

Further, according to the data synchronization system of the present invention, the server may include a server change log storing part configured to store, for a data item deleted from the first database, a predetermined number of change logs each containing a data ID indicating the deleted data item and a delete point in a reverse chronological order of the delete point, the change information acquiring part may acquire, from the server change log storing part, the change log containing the delete point after the anchor point, the synchronization information sending part may send the synchronization information to the client with a boundary point and the acquired change log contained therein in addition to the change information, the boundary point being the oldest delete point contained in the change log contained in the change log stored in the server change log storing part, the client may further include: a delete processing part configured to delete, from the second database, the data item corresponding to the change log contained in the synchronization information; and an obsolete information acquiring part configured to search through the data items stored in the second database for the data item in which the update point of the data item is before the boundary point and the change information containing a data ID indicating the data item is not contained in the synchronization information, in a case where the anchor point is before the boundary point, and to create obsolete information containing, for each of the searched data item, the data ID indicating the data item and the update point of the data item, the download request sending part may send the download request to the server, the download request containing the obsolete information therein in addition to the acquired data ID, the data acquiring part may further determine, for each of the obsolete information contained in the download request, whether the data item corresponding to the obsolete information is stored in the first database or not, and adds the data ID indicating the data item which has been determined as not being stored in the first database into the download information as a delete ID indicating deleted data item, and the delete processing part may delete, from the second database, the data item corresponding to the delete ID contained in the download information.

Further, according to the data synchronization system of the present invention, the client may include a collision resolving part configured to retrieve, from the second database and for each of the change information contained in the synchronization information, the update point of the data item corresponding to the data ID contained in the change information, and to determine in a case where the retrieved update point is newer than the update point contained in the change information, whether to upload the data item corresponding to the data ID to the server or to download the data item corresponding to the data ID from the server, the download request sending part may send the download request to the server, the download request further containing the data ID indicating the data item which has been determined by the collision resolving part to be downloaded, the client may further includes a resolution request sending part configured to retrieve, from the second database, the data item which has been determined by the collision resolving part to be uploaded, and sends a resolution request that contains the retrieved data item to the server, and the server may further includes a resolution processing part configured to register the data item contained in the resolution request into the first database.

Further, another aspect of the present invention is a data synchronization system for synchronizing data between a server and a client communicably connected to the server, the server being accessible to a first database configured to store at least one data item with an update point being attached to the data item, the client being accessible to a second database configured to store the data item acquired from the server, the server including a server change log storing part configured to store only a predetermined number of change logs of the data item with respect to the first database in a reverse chronological order, the change log stored in the server change log storing part being a server change log, the server change log containing a data ID indicating the data item that has been changed and an update point attached to the data item, the server change log being the change log that the server change log storing part stores, the client including: an anchor storing part that stores an anchor point which is a point in time at which the data item was last acquired from the server; and a synchronization request sending part configured to send a synchronization request to the server, the synchronization request containing a condition for acquiring the data item and the anchor point, the server further including: a change log acquiring part configured to acquire, from the server change log storing part, a server change log having the update point that is later than the anchor point from among the server change logs corresponding to the data item that matches the condition contained in the synchronization request; a change information acquiring part configured to search, in the first database, for the data item having the update point later than the anchor point and before a boundary point, the boundary point being the latest update point stored in the server change log storing part, through the data items that match the condition contained in the synchronization request and creates, for each of the searched data item, change information containing the data ID indicating the data item and the update point attached to the data item; and a synchronization information sending part configured to send synchronization information to the client, the synchronization information containing the boundary point, the acquired server change log and the change information, the client further including: a download determining part configured to determine the data item to be downloaded from among the data items corresponding to one of the server change log and the change information contained in the synchronization information; an obsolete information acquiring part configured to search in the second database for the data item having the update point between the anchor point and the boundary point through the data items that matches the condition, and creates, for each of the searched data item, obsolete information containing the data ID indicating the data item and the update point attached to the data item; and a download request sending part configured to send a download request to the server, the download request containing an acquired data ID indicating the determined data item and the obsolete information, the server further including, a data acquiring part configured to acquire, from the first database, the data item having the update point newer than the update point contained in the obsolete information and the data item corresponding to the acquired data ID from the data items corresponding to the obsolete information in the download request; and a download information sending part configured to send download information containing the acquired data item to the client, the client further including an update processing part configured to register the data item contained in the download information into the second database.

Further, according to the data synchronization system of the present invention, the server change log may further contain type-of-change information indicating one of addition, update and delete for the change of data item, and the client may further include a delete processing part that deletes, from the second database and in response to reception of the synchronization information, the data item identified by the data ID contained in the server change log for those server change logs contained in the synchronization information in which the type of change information indicate delete.

Further, according to the data synchronization system of the present invention, the data acquiring part may set delete information containing the data ID contained in the obsolete information into the download information, for those obsolete information contained in the download request in which the data item corresponding to the data ID contained in the obsolete information is not registered in the first database, and the client may include a delete processing part that deletes, from the second database, the data item corresponding to the data ID contained in the delete information, in a case where the delete information is contained in the download information.

Further, according to data synchronization system of the present invention, the data item may further include a column attached thereto, the column being information for determining whether the data item matches the condition and created based on a content of the data item, the server change log may further contain type-of-change information indicating one of addition, update and delete of data item regarding the change of data item, and the column attached to the data item, the change log acquiring part may acquire those server change log in which the column matches the condition contained in the synchronization request and the update point is later than the anchor point, the change information acquiring part may search through the data items stored in the first database for the data item in which the column attached to the data item matches the condition contained in the synchronization request and in which the update point is after the anchor point and before the boundary point, and for each of the searched data item, sets the data ID indicating the data item, the update point attached to the data item, and column contained in the data item to the change information, and the obsolete information acquiring part may search through the data items stored in the second database for the data item in which the column matches the condition and the update point is between the anchor point and the boundary point.

Further, according to the data synchronization system of the present invention, the data item may further include a hint attached thereto that is information for determining whether or not to download the data item at the client, the hint being created based on a content of the data item, the server change log may further includes type of change information indicating which of addition, update and delete the change of data item was and the hint attached to the data item, the change information acquiring part may further add, for each of the searched data item, the hint added to the data item, and the download determining part may determine the data item to be downloaded based on one of the server change log and the hint contained in the change information.

Further, according to the data synchronization system of the present invention, the download determining part may output the hint contained in one of the server change log and the change information, and determine the data item corresponding to the output data item selected by the user as the data item to be downloaded.

Further, according to the data synchronization system of the present invention, the data item may includes the update point attached thereto, the server may further include a point-in-time creating part that creates, as the update point, a numerical value that increases each time an operation on the first database is performed, and the update point created by the point-in-time creating part may be attached to the data item when the data item is written into the first database.

Further, according to the data synchronization system of the present invention, the data item may include the update point attached thereto, the server may further includes a point-in-time creating part that acquires, when an operation to the first database is performed, a time stamp at the server and creates, as the update point, a linked value of the acquired time stamp and an identification value of the data item, and the update point created by the point-in-time creating part may be attached to the data item when the data item is written into first database.

Further, according to the data synchronization system of the present invention, the client may further include a client change log storing part that stores a change log of the data item at the second database, the change log stored in the client change log storing part being a client change log, the client change log containing the data ID of the data item that has been changed and the update point attached to the data item, the synchronization request sending part may acquire the client change log that corresponds to the data item that matches the condition, set the acquired client change log to the synchronization request and send to the server, the server may further include a collision detecting part configured to create collision information containing the update point attached to the data item stored in the first database and the data ID, for each of the client change logs contained in the synchronization request, in a case where the update point attached to the data item stored in the first database and corresponding to the data ID contained in the client change log is later than the update point contained in the client change log, the synchronization information sending part may send the synchronization information to the client, the synchronization information further containing the collision information, the client may further include a collision resolving part configured to determine whether the data item corresponding to the data ID contained in the collision information is to be uploaded to the server or downloaded from the server, the download request sending part may send the download request to the server, the download request further containing the data ID indicating the data item that the collision resolving part has decided to download, the client may further include a resolution request sending part configured to retrieve, from the second database, the data item that has been determined by the collision resolving part to be uploaded, and to send a resolution request containing the retrieved data item to the server, and the server may further includes a resolution processing part configured to register the data item contained in the resolution request into the first database.

Further, according to the data synchronization system of the present invention, the data item may further include a key attached thereto, the key being a data item derived by applying a predetermined algorithm to the data item, the server change log and the client change log may each contain the key, the server may further include a duplicate detecting part configured to perform a search through the data items stored in the first database for the data item having a key that matches a key contained in one of the client change logs contained in the synchronization request and creates duplicate information containing the data ID identifying the searched data item, the synchronization information sending part may send the synchronization information further containing the duplicate information to the client, the client may include a duplicate resolution part that determines a data item to be deleted from among the data items corresponding to the data ID contained in the duplicate information, the resolution request sending part may send resolution information to the server, the resolution information containing the data ID indicating the data item that has been determined by the duplication resolution part to be delete, the resolution information being further contained in the resolution request, and the resolution processing part may further delete, from the first database, the data item corresponding to the data ID contained in the resolution information contained in the resolution request.

Further, according to the data synchronization system of the present invention, the data item may include the data ID attached thereto, the data ID may contain a local ID that is unique identification information in the client and a global ID that is unique identification information in both the server and the client, the client may further include: a local ID assigning part that assigns the local ID to the created data item in a case where the data item has been created in the client, and an unacquired ID storing part that stores an unacquired ID whereto the global ID is not assigned from among the local IDs assigned to the created data item, the synchronization request sending part may further send the synchronization request to the server with the unacquired ID stored in the unacquired ID storing part being contained therein, the server may further include a global ID acquisition part configured to perform a search on the first database for the global ID corresponding to the acquired ID contained in the synchronization request, and to acquire, in a case where there is the global ID corresponding to the unacquired ID, the corresponding global ID from the first database, creates an ID information containing the acquired global ID and the unacquired ID, and to newly assigns the global ID, and creates an ID information containing the assigned global ID and the local ID, in a case where there is no global ID corresponding to the local ID, the synchronization information sending part may further send the synchronization information to the client with the ID information being contained in the synchronization information, the client may further include a global ID registering part configured to search, for each of the ID information contained in the synchronization information, in the first database for the data item corresponding to the unacquired ID contained in the ID information, and sets the global ID contained in the ID information to the data ID attached to the searched data item.

Further, another aspect of the present invention is a method of synchronizing data between a server and a client communicably connected to the server, the server being accessible to a first database configured to store at least one data item containing an update point, the client being accessible to a second database configured to store the data item acquired from the server, the method including: storing, by the client, an anchor point which is a point in time at which the data item was last acquired from the server, the client sending a synchronization request containing the anchor point to the server, searching, by the server, in the first database for an updated data item that is the data item having the update point later than the anchor point, creating, by the server, change information for each of the updated data items, the change information containing a data ID indicating the updated data item and the update point of the updated data item, the server sending synchronization information containing the change information to the client, determining, by the client, an acquisition data item to be downloaded from among the data items corresponding to the change information and sending a download request containing a data ID indicating the acquisition data item to the server, acquiring, by the server, the data item corresponding to the data ID contained in the download request from the first database, the server sending download information containing the acquired data item to the client, and registering, by the client, the data item contained in the download information into the second database.

Further, according to the data synchronization method of the present invention, the method may further include: retrieving, by the client, from the second database and for each of the change information contained in the synchronization information, the update point of the data item corresponding to the data ID contained in the change information, and when the retrieved update point is newer than the update point contained in the change information, and determining, by the client, whether the data item corresponding to the data ID is to be uploaded to the server or to be downloaded from the server, sending, by the client, the download request to the server, the download request further including the data ID indicating the data item that has been determined to be downloaded, retrieving, by the client, from the second database, the data item that has been determined to be uploaded and sends a resolution request containing the retrieved data item to the server, registering, by the server, the data item contained in the resolution request into the first database.

Further, another aspect of the present invention is a method of synchronizing data between a server and a client communicably connected to the server, the server being accessible to a first database configured to store at least one data item with an update point attached thereto, the client being accessible to a second database configured to store the data item acquired from the server, the method including: storing, by the server, a predetermined number of change logs of data item corresponding to the first database in a reverse chronological order, the change log stored in the server being a server change log, the server change log including a data ID indicating the data item that as been changed and the update point attached to the data item, storing, by the client, an anchor point that is a point in time at which the data item was last acquired from the server, sending, by the client, a synchronization request containing a condition for acquiring the data item and the anchor point to the server, acquiring, by the server, from the server change logs corresponding to the data item that matches the condition contained in the synchronization request, the server change log having the update point that is later than the anchor point, searching, by the server, in the first database through the data items that match the condition contained in the synchronization request for the data item in which the update point is later than the anchor point and before a boundary point which is the oldest of the update point of the server change log stored in the server, creating, by the server, for each of the searched data item, change information containing the data ID indicating the data item and the update point attached to the data item, sending, by the server, synchronization information to the client, the synchronization information containing the boundary point, the acquired server change log, and the change information, determining, by the client, the data item to be downloaded from the data item corresponding to one of the server change log and the change information contained in the synchronization information, searching, by the client, in the second database through the data items that match the condition for the data item having the update point between the anchor point and the boundary point and creating, for each of the searched data item, obsolete information containing the data ID indicating the data item and the update point attached to the data item, sending, by the client, a download request to the server, the download request containing an acquisition data ID indicating the determined data item and the obsolete information, acquiring, by the server, from the first database and from the data items corresponding to the obsolete information contained in the download request, the data item having the update point newer than the update point contained in the obsolete information and corresponding to the acquired data ID, sending, by the server, download information containing the acquired data item to the client, and registering, by the client, the data item contained in the download information into the second database.

Further, according to the data synchronization method of the present invention, the method may further include: storing, by the client, a change log of the data item at the second database, the change log stored in the client being a client change log, the client change log containing the data ID indicating the data item that has been changed and the update point attached to the data item, acquiring, by the client, the client change log corresponding to the data item that matches the condition, setting, by the client, the acquired client change log to the synchronization request and sending it, by the client, to the server, creating, by the server, for each of the client change log contained in the synchronization request, collision information containing the update point attached to the data item stored in the first database and the data ID, in a case where the update point corresponding to the data ID contained in the client change log and attached to the data item stored in the first database is later than the update point contained in the client change log, sending, by the server, the synchronization information to the client, the synchronization information further containing the collision information, determining, by the client, whether the data item corresponding to the data ID contained in the collision information is to be uploaded to the server or to be downloaded from the server, sending, by the client, the download request to the server, the download request further containing the data ID indicating the data item determined to be downloaded, retrieving, by the client, from the second database, the data item determined to be uploaded and sends a resolution request containing the retrieve data item to the server, and registering, by the server, the data item contained in the resolution request into the first database.

At least the following matters will be disclosed in the present specification and accompanying drawings.

Advantageous Effects of the Invention

According to an aspect of the invention, a server load can be reduced when synchronizing data between a client and a server.

BRIEF DESCRIPTION OF DRAWINGS

FIG. 6 is a diagram illustrating an exemplary configuration of an anchor storing part 132.

FIG. 12 is a diagram illustrating an exemplary configuration of a server record.

FIG. 13 is a diagram illustrating an exemplary configuration of a server change log.

FIG. 24 is a diagram illustrating an exemplary configuration of a client record according to the second embodiment.

FIG. 35 is a diagram illustrating an exemplary configuration of a server record according to the second embodiment.

MODE FOR CARRYING OUT THE INVENTION

==Overall Configuration==

Figure 1:
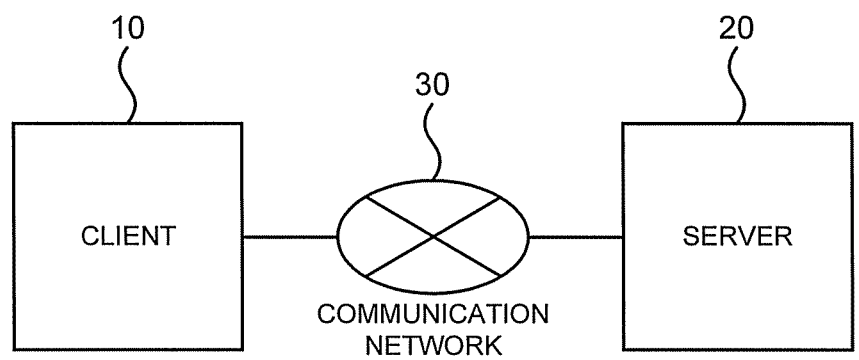
FIG. 1 is a diagram illustrating an overall configuration of a communication system.

FIG. 1 is a diagram illustrating an overall configuration of a communication system according to an embodiment of the present invention. The communication system of the present embodiment includes a client 10 and a server 20. The client 10 and the server 20 are respectively connected to a communication network 30, and the client 10 and the server 20 are capable of communicating via the communication network 30. The communication system of the present embodiment performs data synchronization between the server 20 and the client 10.

The server 20 is, for example, a computer such as a personal computer or a workstation. The server 20 is provided with a database that stores data. (Hereinafter, the database of the server 20 is referred to as a "server database 21". This corresponds to a "first database" of the present invention.) The data managed by the server 20 is, for example, image data such as photographs and data such as a phonebook. The server 20 records only a predetermined number of latest change logs for the server database 21. Change logs that are exceeding the predetermined number are deleted in chronological order.

The client 10 is, for example, a mobile phone, a PDA (Personal Data Assistant) or a computer such as a personal computer. The client 10 is also provided with a database that stores data (hereinafter, the database of the client is referred to as a "client database 11". This corresponds to a "second database" of the present invention). The client database 11 and the server database 21 are synchronized.

In the present embodiment, each data is accompanied with a last updated point in time (hereinafter referred to as an "update point". When data is newly created, a created point is also set to the update point), and determination of whether the data new or old is carried out by comparing the update points. In the present embodiment, a point in time where the data has been created, updated or deleted (hereinafter, creation, update and delete of data will be collectively referred to as a "change" in data.) is a value representing an ordinal number of the change made for the server database 21 in the server 20. In other words, only one data is changed at a single point in time in the server 20 and, in the server 20, the value representing the point in time is incremented each time a change in data is made for the server database 21.

==Hardware Configuration==

Figure 2:
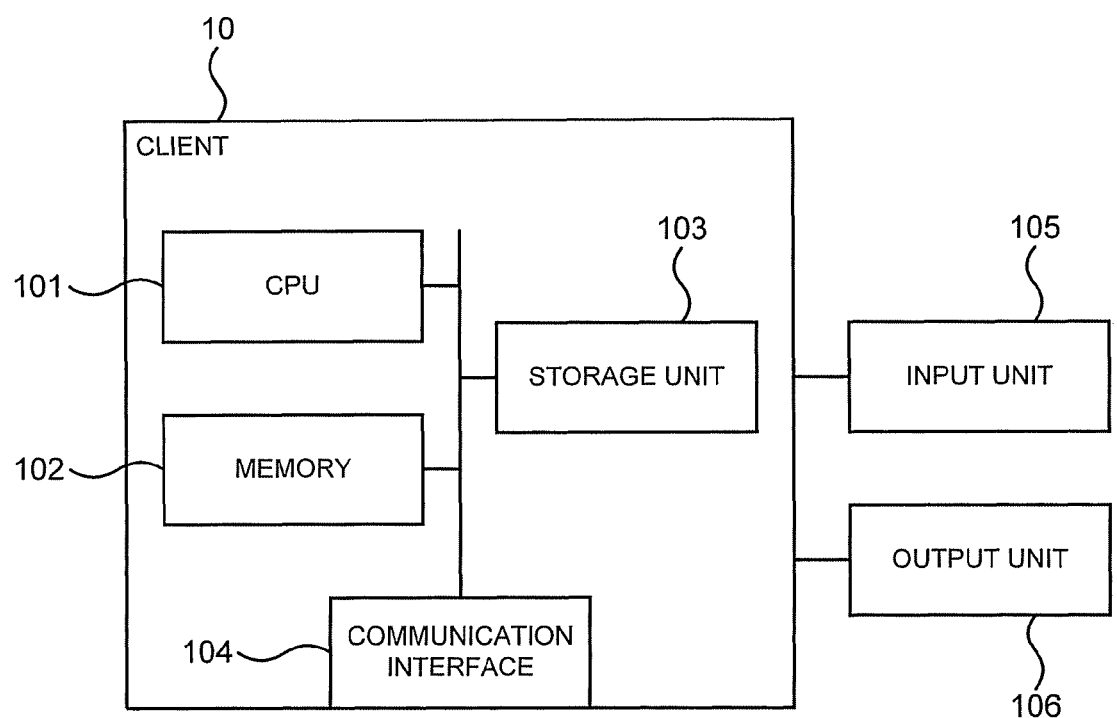
FIG. 2 is a diagram illustrating a hardware configuration of a client 10.

FIG. 2 is a diagram illustrating hardware configuration of the client 10. The client 10 includes a CPU 101, a memory 102, a storage unit 103, a communication interface 104, an input unit 105 and an output unit 106.

The storage unit 103 stores various data and programs and is, for example, a hard disk drive, a flash memory or a CD-ROM drive. The CPU 101 implements various functions by reading out a program stored in the storage unit 103 to the memory 102 and executing it. The communication interface 104 is an interface for connecting to the communication network 30. The communication interface 104 is, for example, an adapter for connection to Ethernet (Registered Trademark), a modem for connection to a telephone network, a wireless communication device for connection to a wireless communication network, etc. The input unit 105 accepts data input from a user operating the client 10 and is, for example, a keypad, a touch panel, a keyboard or a mouse, etc. The output unit 106 outputs data and is, for example, a display or a printer, etc.

Figure 3:
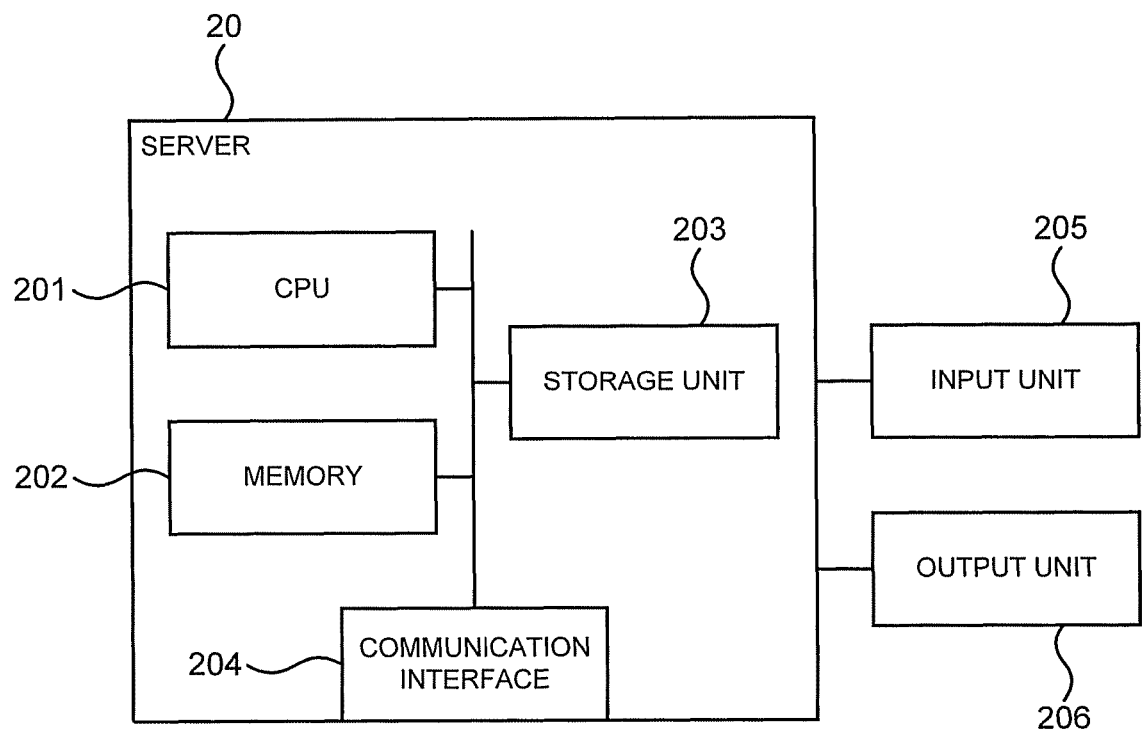
FIG. 3 is a diagram illustrating a hardware configuration of a server 20.

FIG. 3 is a diagram illustrating hardware configuration of the server 20. The server 20 includes a CPU 201, a memory 202, a storage unit 203, a communication interface 204, an input unit 205 and an output unit 206.

The storage unit 203 stores various data and programs and is, for example, a hard disk drive, a flash memory and a CD-ROM drive. The CPU 201 implements various functions by reading out a program stored in the storage unit 203 to the memory 202 and executing it. The communication interface 204 is an interface for connecting to the communication network 30. The communication interface 204 is, for example, an adapter for connection to Ethernet (Registered Trademark), a modem for connection to a telephone network, a wireless communication device for connection to a wireless communication network, etc. The input unit 205 accepts data input from a user operating the server 20 and is, for example, a keypad, a touch panel, a keyboard or a mouse, etc. The output unit 206 outputs data and is, for example, a display or a printer.

OVERVIEW OF PRESENT EMBODIMENT

With the communication system of the present embodiment, data is synchronized between the client 10 and the server 20. In the first embodiment described below, it is assumed that data is not updated in the client 10 and data is updated only in the server 20, and in the second embodiment described below, it is assumed that data is updated in both the client 10 and the server 20.

According to the communication system of the present embodiment, the client 10 takes initiatives in data synchronization. The procedure of data synchronization is as follows:

(1) Information on data that have been changed in each of the client 10 and the server 20 is exchanged between the client 10 and the server 20.

(1.1) Information on data updated in the client 10 is sent from the client 10 to the server 20. In a case where data has not been updated in the client 10, this procedure is dispensed with.

(1.2) Information on data updated in the server 20 is sent from the server 20 to the client 10.

(1.3) The client 10 detects conflict of the data and resolves the conflict. The conflict of data means collision and duplication of the data. Collision of data means that a change has been made to the same record in both the client 10 and the server 20. Duplication of data means that, by updating different data in both of the client 10 and server 20, the same or similar content are contained in different data. In the present embodiment, conflict is resolved by selecting one of the two data (for example, data of the client 10 and data of the server 20 that colliding each other, or, the duplicating two data) that are in a conflicting relationship.

(2) The client 10 downloads data to be downloaded from the server 20.

(3) The client 10 uploads, to the server 20, the data to be reflected to the server 20.

By repeating the procedures (1) through (3) described above, data is synchronized between the client 10 and the server 20. It is to be noted that the above-mentioned procedures can be performed in a different order.

A detailed explanation will be made below.

First Embodiment

In the first embodiment, it is assumed that data is not updated in the client 10. Further, in the first embodiment, it is assumed that a vast amount of data is managed in the server 20 and cannot be downloaded to the client 10 in its entirety.

In the first embodiment, the client 10 acquires, from the server 20, information on data that has been added, changed, or deleted in the server 20, and selectively downloads necessary data therefrom. In other words, the server 20 does not manage synchronization situation of the client 10, and the client 10 selectively downloads data necessary for the user.

==Software Configuration of Client 10==

Figure 4:
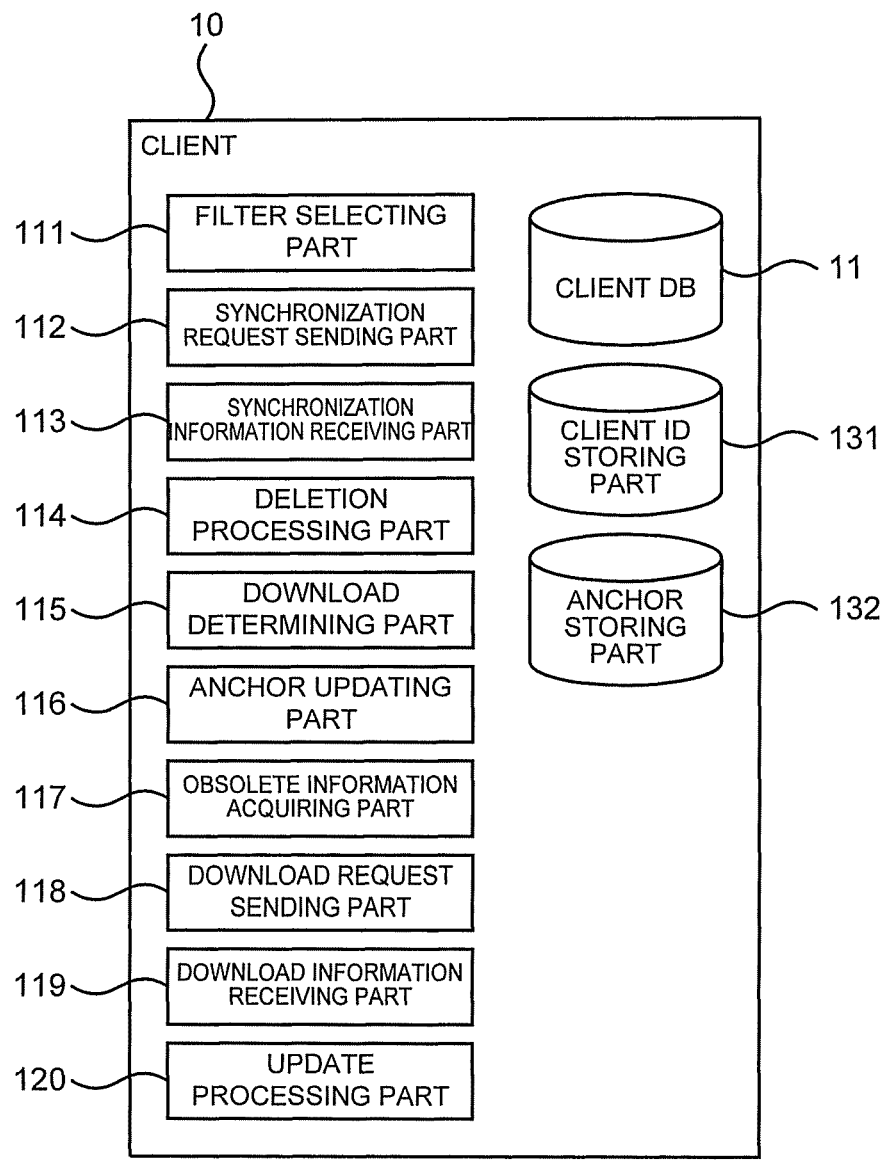
FIG. 4 is a diagram illustrating a software configuration of the client 10.

FIG. 4 is a diagram illustrating a software configuration of the client 10 of the first embodiment. As shown in FIG. 4, the client 10 includes a client database 11, a filter selecting part 111, a synchronization request sending part 112, a synchronization information receiving part 113, a delete processing part 114, a download determining part 115, an anchor updating part 116, an obsolete information acquiring part 117, a download request sending part 118, a download information receiving part 119, an update processing part 120, a client ID storing part 131 and an anchor storing part 132. It is to be noted that the filter selecting part 111, the synchronization request sending part 112, the synchronization information receiving part 113, the delete processing part 114, the download determining part 115, the anchor updating part 116, the obsolete information acquiring part 117, the download request sending part 118, the download information receiving part 119 and the update processing part 120 are implemented in such a manner that the CPU 101 of the client 10 reads out a program stored in the storage unit 103 to the memory 102 and executing it. Further, the client database 11, the client ID storing part 131 and the anchor storing part 132 are realized as a storage area provided by the memory 102 or the storage unit 103 of the client 10. The client database 11 may be provided by a computer (database server) that is different from the client 10. In this case, the client 10 is, for example, accessibly connected to the database server via the communication network 30.

Figure 5:
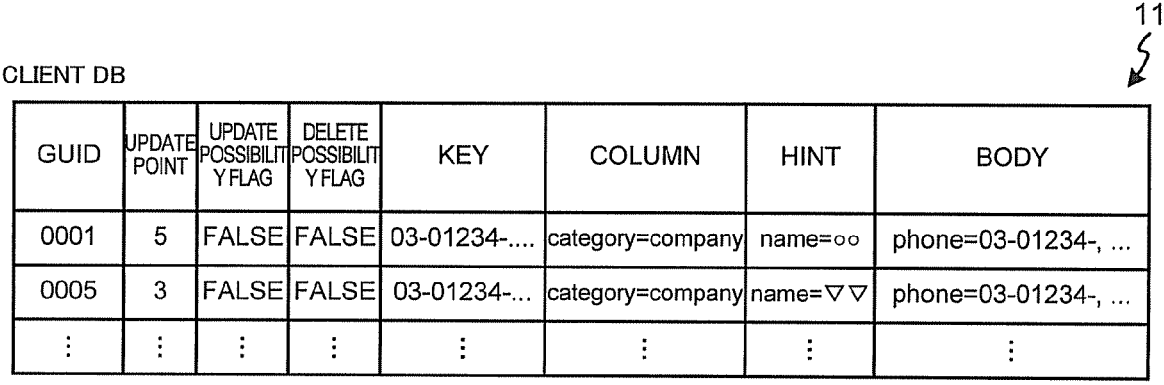
FIG. 5 is a diagram illustrating an exemplary configuration of a client record.

The client database 11 stores data acquired from the server 20. FIG. 5 is a diagram illustrating an exemplary configuration of data stored in the client database 11 (hereinafter, also referred to as a "client record".) The client record contains a GUID (Globally Unique Identifier), an update point, an update possibility flag, a delete possibility flag, a key, a column, a hint and a data body.

The GUID (corresponds to "data ID" and "global ID" of the present invention) is an identification information assigned to the data by the server 20, and is a unique number in the communication system of the present embodiment. The update point indicates a point in time where data was last updated in the server 20. The update possibility flag indicates that there is a possibility that the data has been updated in the server 20, and the delete possibility flag indicates that there is a possibility that the data has been deleted in the server 20. The key is the data for determining duplication of the client record, and is created based on the data body.

The key can be, for example, when the data body is an address book data, created by concatenating character strings such as telephone number and name, and when the data body is an email data, created by concatenating character strings that are set in ADDRESSEE (To), SENDER (From), DATE (Date) and SUBJECT (Subject) of the email.

The column is used in determining whether the data satisfies a filter condition or not, and is a part of the data body. The hint is information for determining whether or not to download data from the server 20. According to the present embodiment, the hint contains importance of the data, and, for example, when the data body is the address book data, may contain name and when the data body is the email data, may be made by coupling the character strings of the subject and the sender of the email so that the user can grasp the content of the data. Further, in the hint, for example, various metadata such as importance and category of the data, data size and summary of data content may be contained.

The client ID storing part 131 stores identification information of the client 10 (hereinafter, referred to as a "client ID".) In the present embodiment, the client ID storing part 131 stores the client ID in advance.

The anchor storing part 132 stores the last synchronized point in time (hereinafter, referred to as an "anchor point"). It is to be noted that only the data that was changed after the anchor point is to be synchronized. FIG. 6 is a diagram illustrating an exemplary configuration of an anchor storing part 132. The anchor storing part 132 stores the anchor point in association with a condition for extracting data managed in the server 20 (hereinafter referred to as a "filter condition").

The filter selecting part 111 selects, from the anchor storing part 132, the filter condition to be used when acquiring data from the server 20. The filter selecting part 111 may, for example, output a list of filter conditions stored in the anchor storing part 132 and accept designation of the filter condition from the user or may accept a filter condition input from the user.

Figure 7:
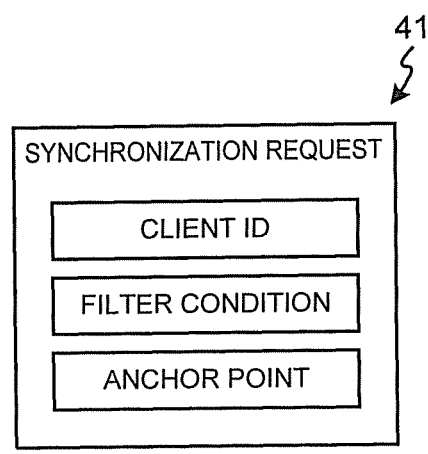
FIG. 7 is a diagram illustrating an exemplary configuration of a synchronization request 41 of a first embodiment.

The synchronization request sending part 112 sends, to the server 20, a command for synchronization (hereinafter referred to as a "synchronization request 41"). FIG. 7 is a diagram illustrating an exemplary configuration of a synchronization request 41. A client ID, a filter condition and an anchor point are set in the synchronization request 41. The synchronization request sending part 112 sets the client ID stored in the client ID storing part 131 into the synchronization request 41 and the filter condition selected by the filter selecting part 111 (hereinafter referred to as a "selected filter condition") is set in the synchronization request 41. Further, the synchronization request sending part 112 retrieves the anchor point corresponding to the selected filter condition from the anchor storing part 132 and sets the retrieved anchor point into the synchronization request 41. The synchronization request sending part 112 sends the above-mentioned synchronization request 41 to the server 20.

Figure 8:
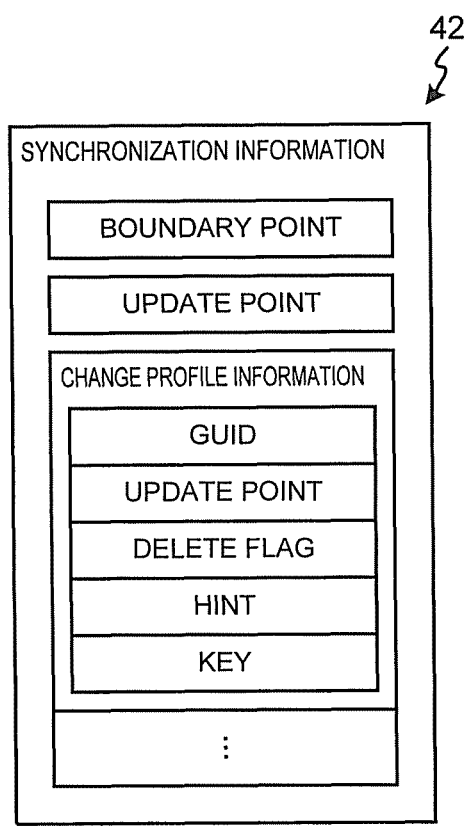
FIG. 8 is a diagram illustrating an exemplary configuration of synchronization information 42 of the first embodiment.

The synchronization information receiving part 113 receives, from the server 20, information necessary for synchronization with the server 20 (hereinafter referred to as "synchronization information") that is sent from the server 20 in response to the synchronization request 41. FIG. 8 is a diagram illustrating an exemplary configuration of synchronization information 42. The synchronization information 42 contains a boundary point, a latest log point and change profile information. The boundary point is the oldest point in time of a change log that is managed in the server 20. The latest log point is the latest point in time of the change log that is managed in the server 20. The change profile information contains information on data created or updated between the anchor point and the boundary point and information on data related to the change log managed in the server 20.

The update point contained in the change profile information is a point in time where the data was last updated and a delete flag indicates that the data was deleted from the server 20.

The delete processing part 114 deletes the data from the client database 11. For each of the change profile information in which the delete flag is TRUE for the change profile information contained in the synchronization information 42, the delete processing part 114 deletes, from client database 11, the data corresponding to the GUID. Details of the delete process by the delete processing part 114 will be described later.

The download determining part 115 determines data to be acquired (downloaded) from the server 20. In the first embodiment, the data to be downloaded refers to all or a part of: data that is registered in the client database 11 and updated in the server 20 (hereinafter referred to as "updated data"); data that is newly added to the server 20 (hereinafter referred to as "added data"); and data that did not match the filter condition at the time of the previous download, but has come to match the filter condition due to update in the server 20 (to come to match the filter condition due to update is referred to as "to filter in"). For example, the download determining part 115 may compare the update point of the data in the client database 11 corresponding to the GUID in the change profile information with the update point in the change profile information, and determine that the data for which the update point in the change profile information is newer is an updated data. Also, in a case where the data corresponding to the GUID of the change profile information is not registered in the client database 11, the download determining part 115 may determine that such data is an added data or a filtered-in data. The download determining part 115 may, for example, determine that all of the added data, the updated data and the filtered-in data as data to be downloaded, or may display the hint for the change profile information corresponding to these data and accept an input from the user specifying the data to be downloaded. Also, in a case where data size is contained in the hint, the download determining part 115 may determine that an amount of data that does not exceed the storage capacity of the client database 11 is the data to be downloaded. The download determining part 115 may determine that, from the added data, the updated data and the filtered-in data, the data having a key and a column satisfying a predetermined condition is the data to be downloaded. Further, in a case where the client database 11 can be updated and when the update point of the client record corresponding to the GUID in the change profile information is newer than the update point in the change profile information, the download determining part 115 may give priority to the downloading of the server records, may determine not to give priority to the downloading the client record, or may inquire the user whether to download or not. With a number of data and data size that can be downloaded being preset, and the download determining part 115 may determine the data to be downloaded within a range that does not exceed the number of data and data size. The download determining part may, for example, set a priority level to the client record in accordance with the update point and the data size of the client data and determine the data to be downloaded in the order from the highest priority level to the lowest in such a manner that the above-mentioned number of data and the data size will not be exceeded. Further, with a policy specifying how the download determining part 115 should determine the data to be downloaded being stored in the memory 102 or the storage unit 103, the download determining part 115 may determine the data to be downloaded in accordance with the policy.

Further, the download determining part 115 may determine that a part of or all of the data that are registered in the client database 11 but do not match the filter condition in the server 20 (to become not in match with the filter condition due to update is referred to as to "filter out") to be contained in the data to be downloaded. In this case, the download determining part 115 may search, in the client database 11, for data that matches the filter condition, and determine that, from the searched data, the data in which the GUID is not contained in the change profile information of the synchronization information 42 is a filtered-out data.

The anchor updating part 116 updates the anchor point stored in the anchor storing part 132. The latest log point in synchronization information 42 is registered into the anchor storing part 132 as an anchor point corresponding to the selected filter condition. It is to be noted that, in a case where the filter selecting part 111 has newly created a filter condition, the anchor updating part 116 registers, into the anchor storing part 132, a value obtained by subtracting 1 from the smallest possible value as an anchor point and the newly created filter condition being associated therewith.

In a case where the anchor point precedes the boundary point contained in the synchronization information 42, the obsolete information acquiring part 117 searches through the client records stored in the client database 11 for the client record that matches the selected filter condition and has an update point older than the boundary point (hereinafter referred to as an "obsolete data"), and creates information on the searched obsolete data (hereinafter referred to as an "obsolete information". The GUID and the update point of the obsolete data are set in the obsolete information.

Figure 9:
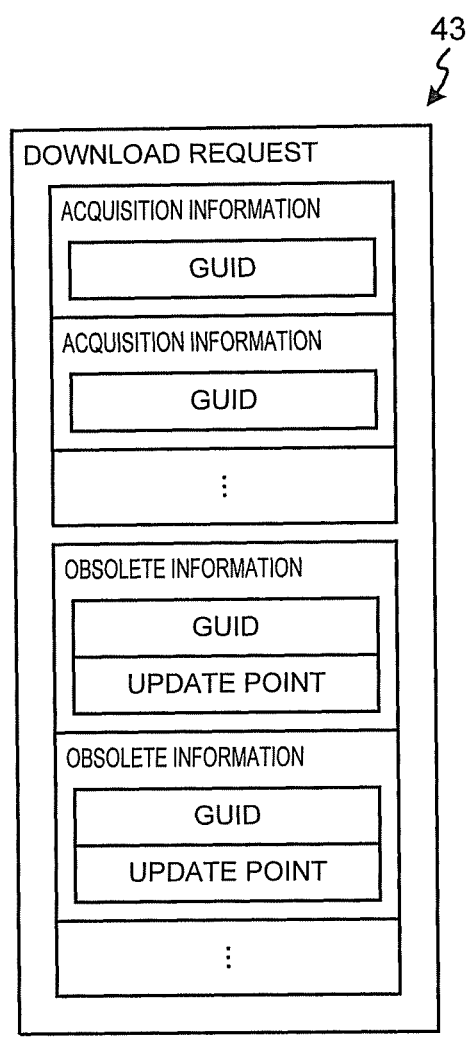
FIG. 9 is a diagram illustrating an exemplary configuration of a download request 43.

The download request sending part 118 sends, to the server 20, a command for acquiring data from the server 20 (hereinafter referred to as a "download request"). FIG. 9 is a diagram illustrating an exemplary configuration of a download request 43. Information containing the GUID of the data determined by the download determining part 115 (hereinafter referred to as "acquisition information") is set in the download request 43. Further, in a case where the obsolete information acquiring part 117 has created obsolete information, the obsolete information is also set in the download request 43.

Figure 10:
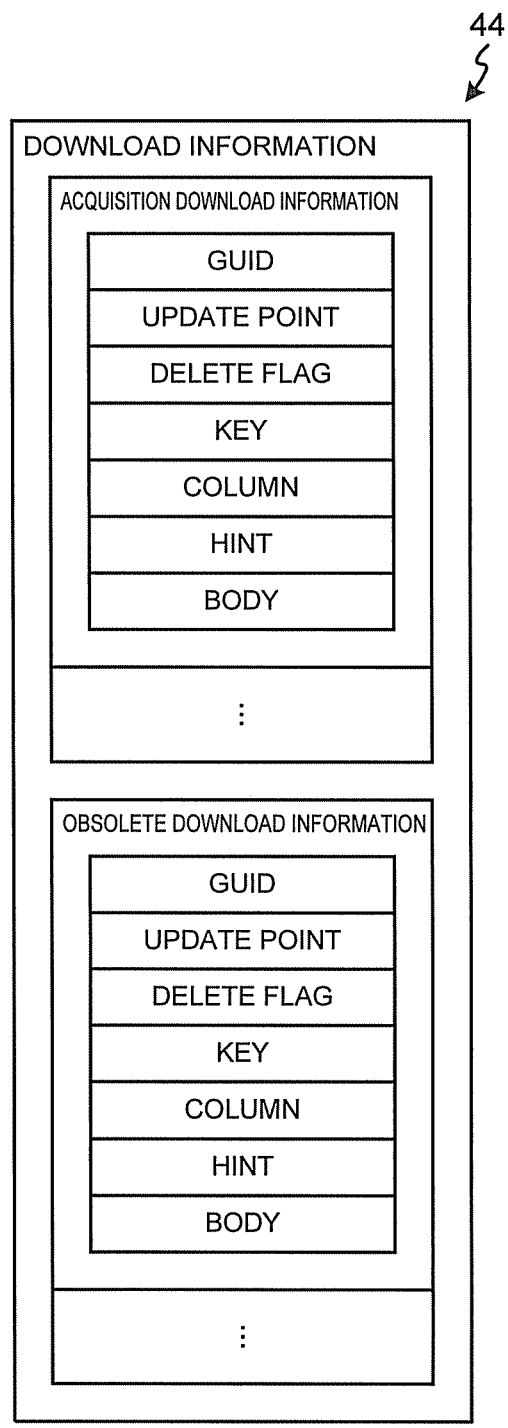
FIG. 10 is a diagram illustrating an exemplary configuration of download information.

The download information receiving part 119 receives information containing data corresponding to the acquisition information and the obsolete information (hereinafter referred to as "download information") that is sent from the server 20 in response to the download request 43. FIG. 10 is a diagram illustrating an exemplary configuration of download information. The download information contains acquisition download information and obsolete download information. The acquisition download information is information containing data corresponding to the acquisition information and the obsolete download information is information containing those data that were updated in the server 20 among the data corresponding to the obsolete information. The acquisition download information and the obsolete download information contain, the GUID, the update point, the delete flag, the key, the column, the hint and the body, respectively. In a case where the data corresponding to the GUID contained in the acquisition information or obsolete information has been deleted from the server 20, TRUE is set to the delete flag, and the key, the column, the hint and the body are omitted.

The update processing part 120 updates the client database 11 in response to the download information. For each of the acquisition download information and the obsolete download information contained in the download information, if the delete flag is TRUE, the update processing part 120 deletes the data corresponding to the GUID from the client database 11, and if the delete flag is FALSE, registers the update point, the key, the column, the hint, the body, as well as update possibility flag and delete possibility flag that are "FALSE" into the client database 11 in association with the GUID contained in the acquisition download information or the obsolete download information. Details of the update process by the update processing part 120 will be described later.

==Software Configuration of Server 20==

Figure 11:
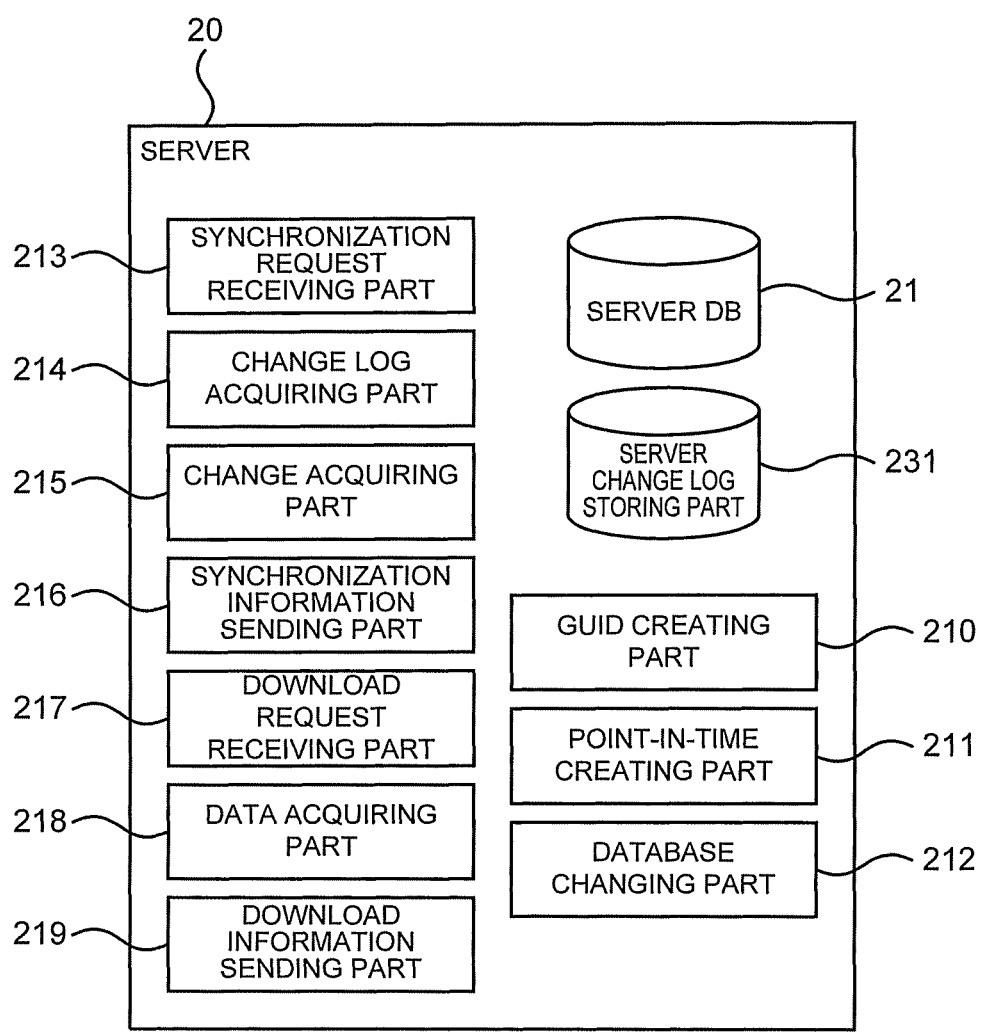
FIG. 11 is a diagram illustrating a software configuration of the server 20.

FIG. 11 is a diagram illustrating a software configuration of the server 20. The server 20 includes a GUID creating part 210, a point-in-time creating part 211, a database changing part 212, a synchronization request receiving part 213, a change log acquiring part 214, a change acquiring part 215, a synchronization information sending part 216, a download request receiving part 217, a data acquiring part 218, a download information sending part 219, a server database 21 and a server change log storing part 231.

It is to be noted that the GUID creating part 210, the point-in-time creating part 211, and database changing part 212 are, the synchronization request receiving part 213, the change log acquiring part 214, the change acquiring part 215, synchronization information sending part 216, the download request receiving part 217, the data acquiring part 218 and the download information sending part 219 are implemented by the CPU 201 that reads out, into the memory 202, the program stored in the storage unit 203 and executes it. Further, the server database 21 and the server change log storing part 231 are implemented as a storage area provided by the memory 202 or the storage unit 203 provided in the server 20. The server database 21 may be provided by a computer that is different from the server 20 (a database server). In this case, the server 20 is accessibly connected to the database server over the communication network 30.

The server database 21 stores the data to be synchronized (hereinafter referred to as a "server record"). FIG. 12 is a diagram illustrating an exemplary configuration of a server record stored in the server database 21. The server record contains a GUID that identifies the data, a creation point of the data, an update point of the data, a key, a column, a hint and a body of the data.

The server change log storing part 231 stores a predetermined number of change logs of the server database 21 (hereinafter referred to as a "server change log") in a reverse chronological order. FIG. 13 is a diagram illustrating an exemplary configuration of a server change log stored in the server change log storing part 231. The server change log contains a GUID that identifies the data, a creation point of the data, an update point of the data, a delete flag, a hint of the data, an old column and a current column. The delete flag indicates that the data has been deleted from the server database 21. The old column is a column of the data prior the change in the data related to the server change log and the current column is a column of the data after the change. In a case where the data is newly added, a predetermined part of the added data is added to the old column and the current column.

The GUID creating part 210 assigns the GUID. The GUID creating part 210 assigns, for example, in a case where a server record is newly recorded in the server database 21, the GUID identifying the server record.

The point-in-time creating part 211 creates a current point in time in the server 20. In the present embodiment, the point-in-time creating part 211 creates a point in time as a serial value that is incremented each time a change of data is made in the server database 21.

The database changing part 212 performs a change of data on the server database 21.

In a case where a server record is added to the server database 21, the database changing part 212 sets a time in point created by the point-in-time creating part 211 to the creation point and the update point, respectively, and adds the server record to the server database 21. Further, the database changing part 212 creates a server change log containing the GUID, the creation point, the update point and the hint of the added server record, sets "FALSE" to the delete flag of the created server change log, sets the column of the added server record to each of the old column and the current column, and registers into the server change log storing part 231.

In a case where the server record stored in the server database 21 is updated, the database changing part 212 sets a point in time generated by the point-in-time creating part 211 to the update point in the server record. Further, the database changing part 212 creates a server change log containing the GUID, the creation point, the update point and hint of the updated server record, sets "FALSE" to the delete flag of the created server change log, sets the column before update to the old column, sets the column after update to the current column and registers into the server change log storing part 231.

Also, in a case where the server record stored in the server database 21 has been deleted, the database changing part 212 creates a server log containing a point in time created by the point-in-time creating part 211, the GUID, the creation point and hint of the deleted server record, sets "TRUE" to the delete flag of the created server change log, sets the column of the deleted server column to the old column and registers into the server change log storing part 231.

It is to be noted that, in a case where a number of server change logs stored in the server change log storing part 231 is equal the predetermined number, the database changing part 212 deletes the server change log having the oldest update point and then registers a new server change log.

The synchronization request receiving part 213 receives synchronization request 41 sent from the client 10. It is to be noted that, in a case where an anchor point is not set in the synchronization request 41, the synchronization request receiving part 213 sets the anchor point as the oldest value that can be set as the point in time.

The change log acquiring part 214 acquires information related to the changed data. The change log acquiring part 214 searches, in the server change log storing part 231, for a server change log that matches the selected filter condition contained in the synchronization request 41. The change log acquiring part 214 creates change profile information containing the GUID, the creation point, the update point, the delete flag and the hint contained in the searched server change log. The update information acquiring part 214 sets the oldest update point in the server change log in the server change log storing part 231 as a boundary point and the latest update point as the latest log point. On the other hand, in a case where the server change log that matches the selected filter condition is not stored in the server change log storing part 231, the update information acquiring part 214 stores the latest update point among the update points in the server record stored in the server database 21 as the boundary point and the latest log point.

In a case where anchor point contained in the synchronization request 41 is older than the boundary point, the change acquiring part 215 searches, in the server database 21, for a server record having the creation point newer than the anchor point and the update point older than the boundary point, and creates change profile information containing the GUID, the creation point, the update point and the hint of the searched server record.

The synchronization information sending part 216 creates synchronization information 42 containing the boundary point, the latest log point and the change profile information, and sends the created synchronization information 42 to the client 10.

The download request receiving part 217 receives a download request 43 sent from the client 10.

The data acquiring part 218 extracts acquisition information contained in the download request 43, retrieves, from the server database 21, the server record indicated by the GUID for each of the GUIDs contained in the extracted acquisition information, and creates acquisition download information containing the GUID, the update point, the "FALSE" delete flag, the column and the body of the retrieved server record. In a case where the server record indicated by the GUID of the acquisition information is not stored in the server database 21 (in a case where it is delete from the server database 21), the data acquiring part 218 creates acquisition download information containing only the GUID and delete flag indicating "TRUE".

Also, the data acquiring part 218 extracts obsolete information contained in the download request 43, retrieves, for each of the obsolete information, the server record indicated by the GUID contained in the obsolete information from the server database 21, and in a case where the update point of the retrieved server record is newer than the update point of the obsolete information, creates obsolete download information that contains the GUID, the update point, the "FALSE" delete flag, the column and the body. In a case where the server record indicated by the GUID of the obsolete information is not stored in the server database 21 (in a case where it is deleted from the server database 21), the data acquiring part 218 creates the obsolete download information that contains only the GUID and the "TRUE" delete flag.

The download information sending part 219 creates the download information containing only the acquisition download information and the obsolete download information and sends the created download information to the client 10.

==Overview of the Synchronization Process==

Figure 14:
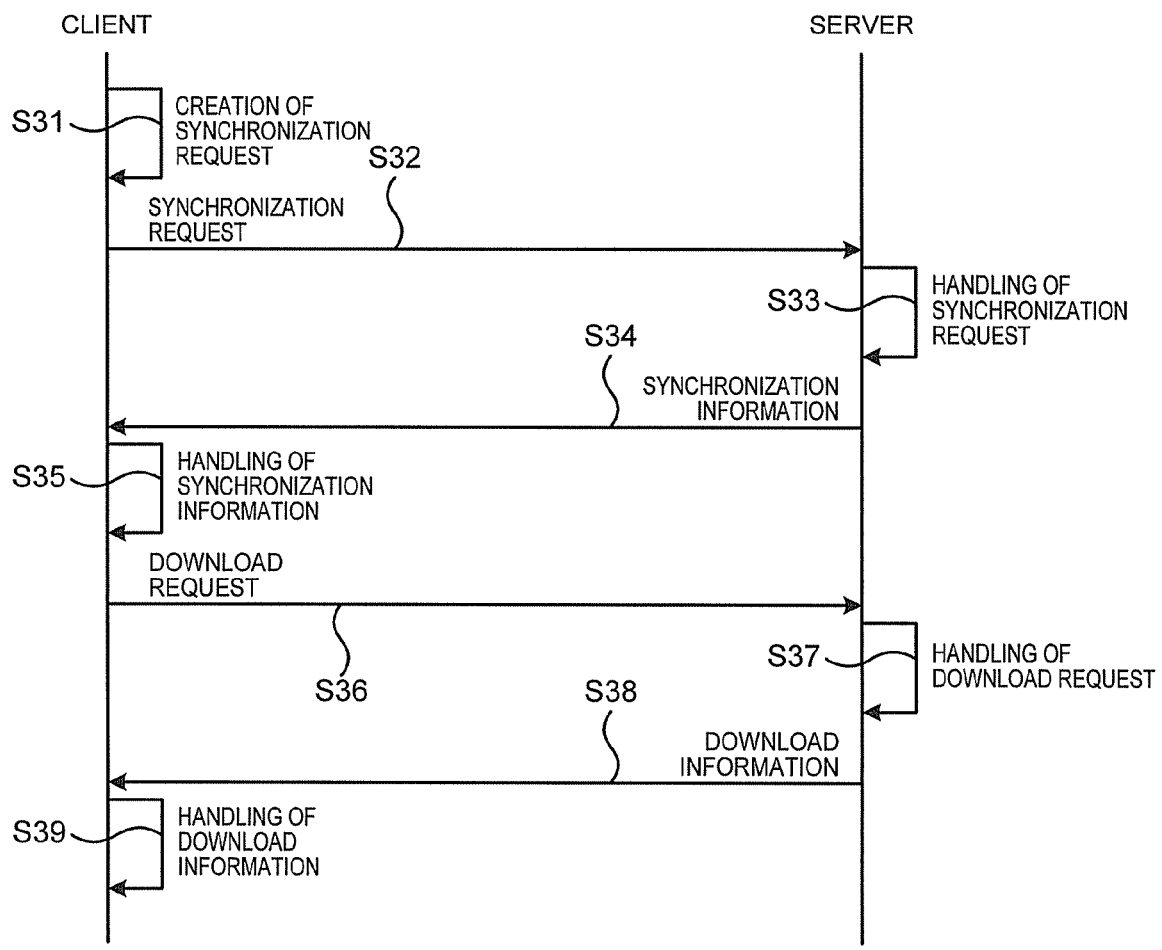
FIG. 14 is an explanatory diagram illustrating a flow of a synchronization process of data according to the first embodiment.

FIG. 14 is an explanatory diagram illustrating a flow of a synchronization process of data performed in the communication system according to the first embodiment.

The client 10 creates a synchronization request 41 (S31) and sends the created synchronization request 41 to the server 20 (S32). When the synchronization request 41 is received, the server 20 creates synchronization information 42 containing a boundary point, a latest log point and change profile information (S33), and sends the created synchronization information 42 to the client 10 (S34).

When the synchronization information 42 is received, the client 10 deletes, from the client database 11, the data having the delete flag set to TRUE, creates a download request 43 containing the acquisition information and the obsolete information indicating the data to be downloaded (S35), and sends the created download request 43 to the server 20 (S36). When the download request 43 is received, the server 20 creates download information containing the acquisition download information and the obsolete download information (S37), and sends the created download information to the client 10 (S38).

In accordance with the acquisition download information and the obsolete download information contained in the download information, the client 10 performs registration or delete of the data to or from the client database 11 (S39).

Details will be described below.

==Creation Process of Synchronization Request 41 (S31)==

Figure 15:
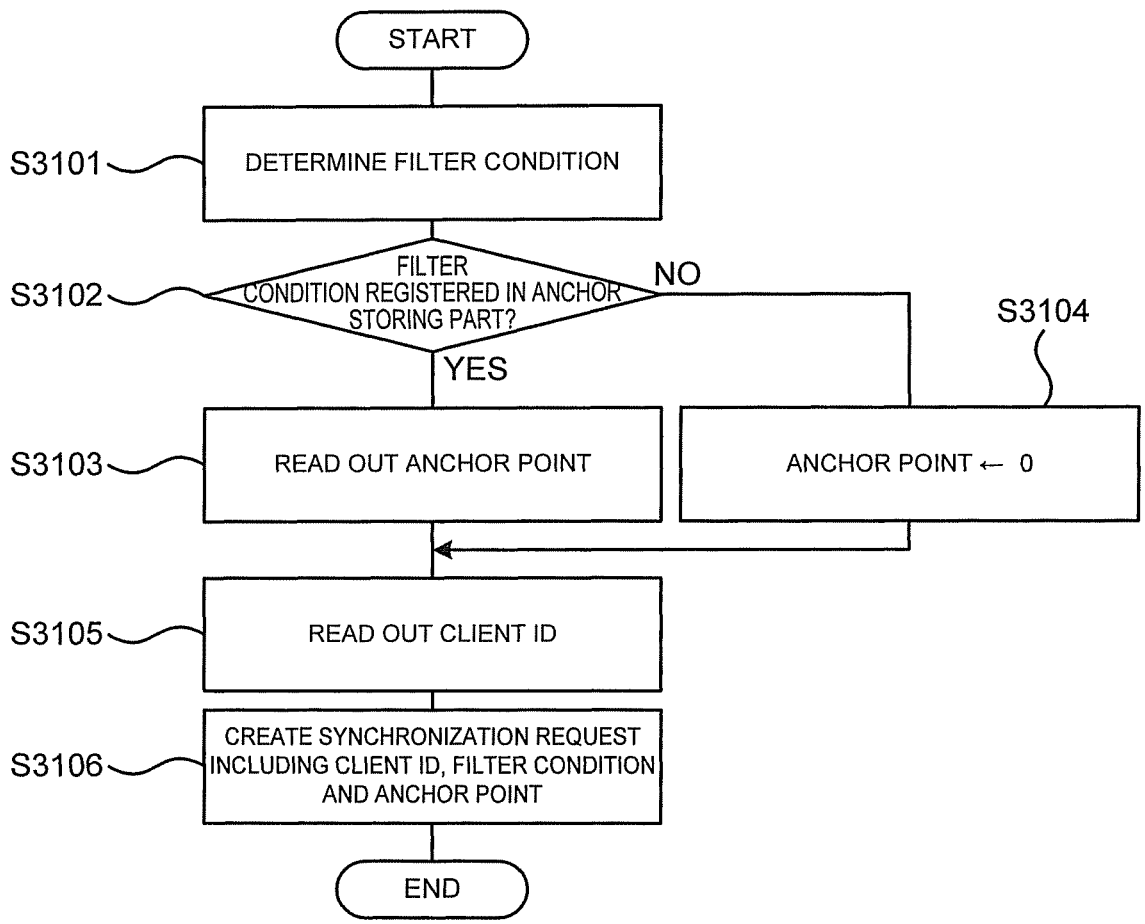
FIG. 15 is a diagram illustrating a flow of a creation process of the synchronization request 41 according to the first embodiment.

FIG. 15 is a diagram illustrating a flow of a creation process of the synchronization request 41 performed in the client 10.

First, the filter selecting part 111 selects a filter condition (S3101). As has been described above, the filter selecting part 111 selects the filter condition by, for example, accepting input from a user specifying the filter condition.

In a case where the selected filter condition is stored in the anchor storing part 132 (S3102:YES), the filter selecting part 111 retrieves the anchor point corresponding to the selected filter condition from the anchor storing part 132 (S3103).

On the other hand, in a case where the selected filter condition is not stored in the anchor storing part 132 (S3102:NO), the filter selecting part 111 sets a value ("0" in the present embodiment) obtained by subtracting 1 from a predetermined minimum value to the anchor point (S3104).

The synchronization request sending part 112 retrieves a client ID from the client ID storing part 131 (S3105), and creates a synchronization request 41 containing the client ID, the selected filter condition and the anchor point (S3106).

The synchronization request 41 is created in a manner described above. The created synchronization request is sent to server 20 by the synchronization request sending part 112.

==Handling Process of Synchronization Request 41 (S33)==

Figure 16:
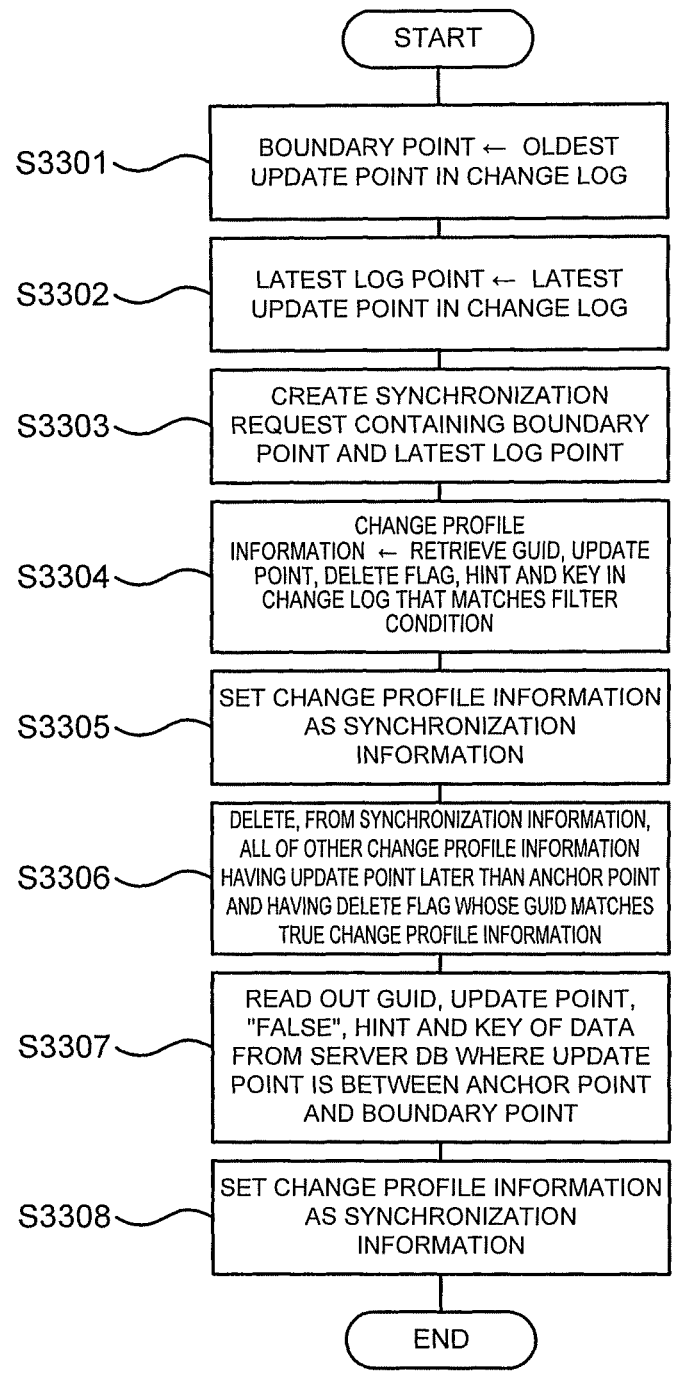
FIG. 16 is a diagram illustrating a flow of a handling process of the synchronization request 41 according to the first embodiment.

FIG. 16 is a diagram illustrating a flow of a handling process of the synchronization request 41 performed in the server 20.

The synchronization information sending part 216 sets the oldest update point of the server change log registered in the server change log storing part 231 as a boundary point (S3301), sets the latest update point as a latest log point (S3302), and creates synchronization information 42 containing the boundary point and the latest log point (S3303). It is to be noted that, in a case where the change log is not registered in the server change log storing part 231, the synchronization information sending part 216 acquires a point in time created by the point-in-time creating part 211 and sets the acquired point in time as the boundary point and the latest log point.

The change log acquiring part 214 retrieves, from the server change log storing part 231, the server change log that matches the filter condition, and for each of the retrieved server change logs, creates change profile information containing the GUID, the update point, the delete flag, the hint and the key of the server change log (S3304). The change log acquiring part 214 sets the created change profile information to the synchronization information 42 (S3305).

Among the change profile information set in the synchronization information 42, for each of the change profile information having the update point after the anchor point and the delete flag is "TRUE", the synchronization information sending part 216 deletes, from the synchronization information 42, the relevant change profile information and other change profile information having the same GUID as the relevant change profile information (S3306).

The change acquiring part 215 retrieves, from the server database 21, the data having the update point after the anchor point and the update point before the boundary point, and creates change profile information containing the GUID, the update point, the hint and the key of the retrieved data and the delete flag set to "FALSE" (S3307). The change acquiring part 215 sets the created change profile information to synchronization information 42 (S3308).

The synchronization information 42 is created in a manner described above. The created synchronization information 42 is sent to the client 10 by the synchronization information sending part 216.

==Relationship Between Point in Time and Change Log==

Figure 17:
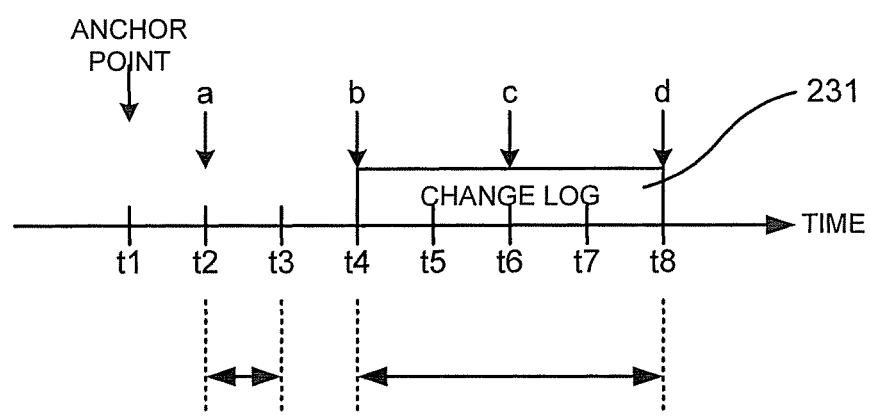
FIG. 17 is an explanatory diagram of a relationship between a change log and change profile information in a case where an anchor point is t1.
Figure 18:
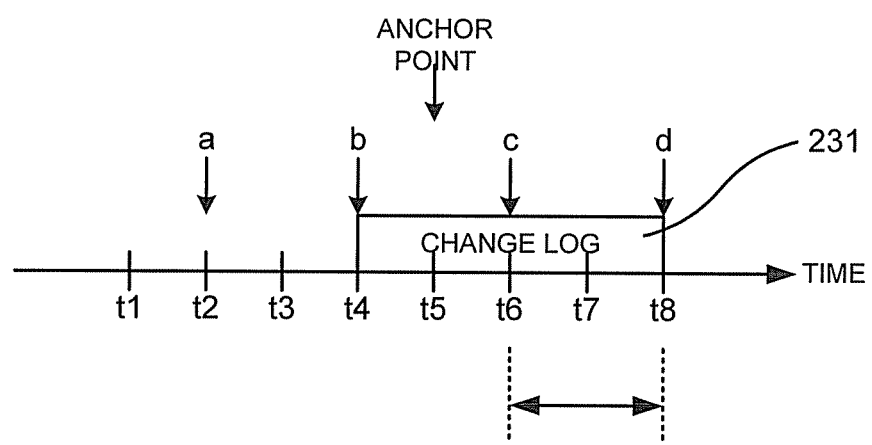
FIG. 18 is an explanatory diagram of a relationship between a change log and a change profile information in a case where an anchor point is t5.

FIGS. 17 and 18 are explanatory diagrams of a relationship between a change log stored in server change log storing part 231 and the change profile information. In FIGS. 17 and 18, the server change log storing part 231 stores server change log 231 for a period between point t4 and point t8 only, and data "a", "b", "c" and "d" are indicated as having been changed at time t2, t4, t6 and t8, respectively. Here, the boundary point is point t4.

FIG. 17 is a diagram illustrating a case where the anchor point is t1. In this case, change profile information containing update point t2 of data "a" updated in a period between point t2 and t3 and change profile information containing update points t4, t6 and t8 of data "b" to "d" related to the server change log 231 are created. For a period between point t2 and t3, which is before boundary point t4, the change profile information is created only for the added and updated data and not created for the deleted data. Whereas, for points t4 to t8 that are after the boundary point t4, the change profile information is created for all of the added, updated and deleted data.

FIG. 18 is a diagram illustrating a case where the anchor point is t5. In this case, since the anchor point t5 is later than the boundary point t4, the change profile information is created for all the data that have been changed after the anchor point t5. In other words, in an example of FIG. 18, the change profile information is created that contains the update point t6 and t8 for data "c" and "d" that have been updated after the anchor point t5.

==Handling Process of Synchronization Information 42 (S35)==

Figure 19:
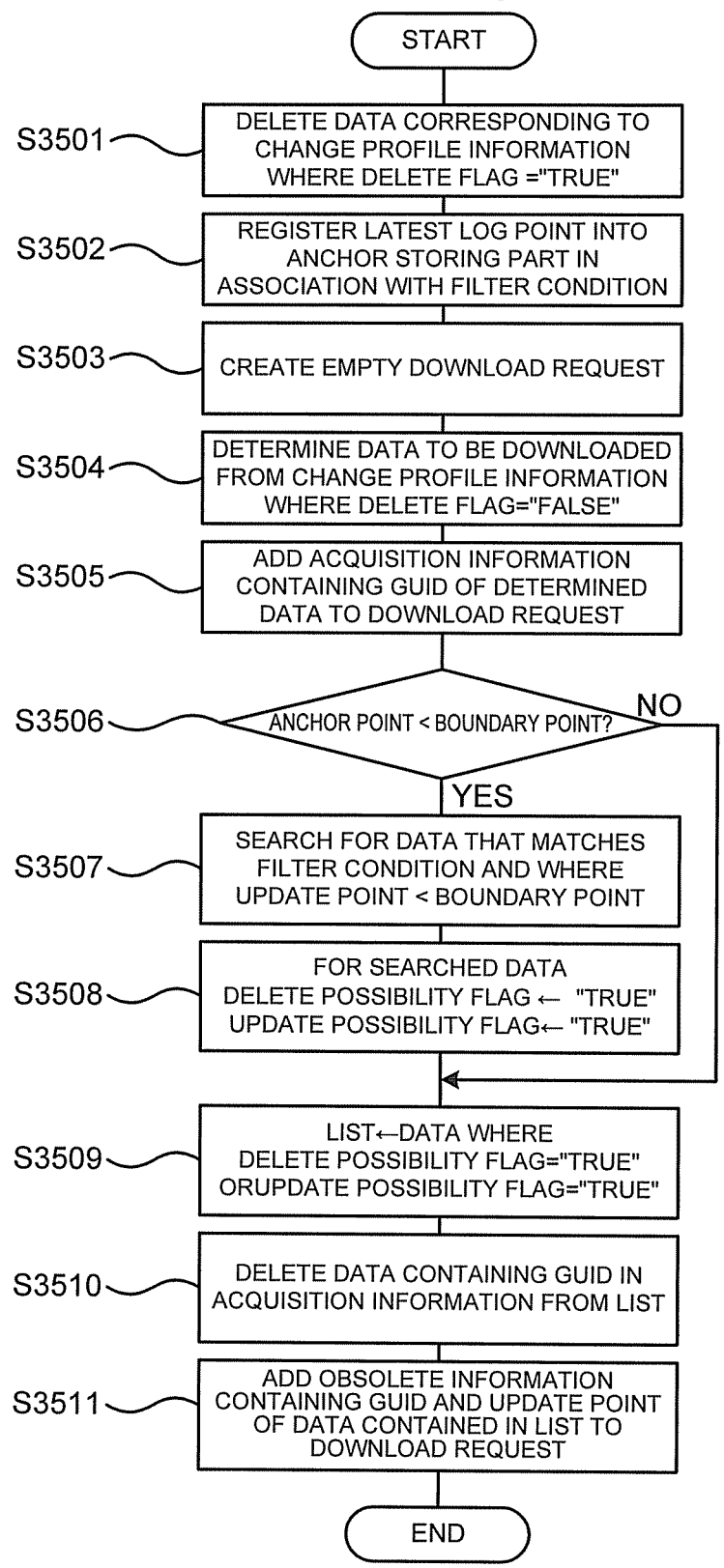
FIG. 19 is a diagram illustrating a flow of a handling process of the synchronization information 42 according to the first embodiment.

FIG. 19 is a diagram illustrating a flow of a handling process of the synchronization information 42 performed in the client 10.

First, the delete processing part 114 deletes, from the client database 11, the data corresponding to the GUID for those change profile information contained in the synchronization information 42 in which the delete flag is TRUE (S3501). The anchor updating part 116 registers the latest log point contained in the synchronization information 42 into the anchor storing part 132 in association with the selected filter condition (S3502).

Then, the download determining part 115 creates an empty download request 43 (S3503), and determines, from the data corresponding to the change profile information contained in the synchronization information 42, those data to be downloaded (S3504). As has been described above, the download determining part 115 outputs, for example, the key and the hint contained in the change profile information and let the user select the data to be downloaded. It is to be noted that, here, the download determining part 115 may determine that, among the data that matches the selected filter condition in the client database 11, the data in which the GUID is not contained in the synchronization information 42 (filtered out data) is the data to be downloaded. The download determining part 115 creates acquisition information containing GUID indicating the data for each of the determined data, and adds the created acquisition information to the download request 43 (S3505).

In the case where the anchor point is before the boundary point contained in the synchronization information 42 (S3506:YES), the obsolete information acquiring part 117 searches, in the client database 11, for the data that matches the selected filter condition and also has the update point before the boundary point (S3507), and sets "TRUE" in the delete possibility flag and the update possibility flag of the searched data (S3508).

The obsolete information acquiring part 117 acquires, from the client database 11, a list of data in which the delete possibility flag or the update possibility flag is set to "TRUE" (S3509). The obsolete information acquiring part 117 deletes, from the list, the data contained in the list in which the GUID is contained in the acquisition information (S3510). The obsolete information acquiring part 117 creates, for each of the data contained in the list, the obsolete information in which the GUID and the update point are set, and adds to the download request 43 (S3511).

The download request 43 is created in a manner described above. The created download request 43 is sent to the server 20 by the download request sending part 118.

==Handling Process of Download Request 43 (S37)==

Figure 20:
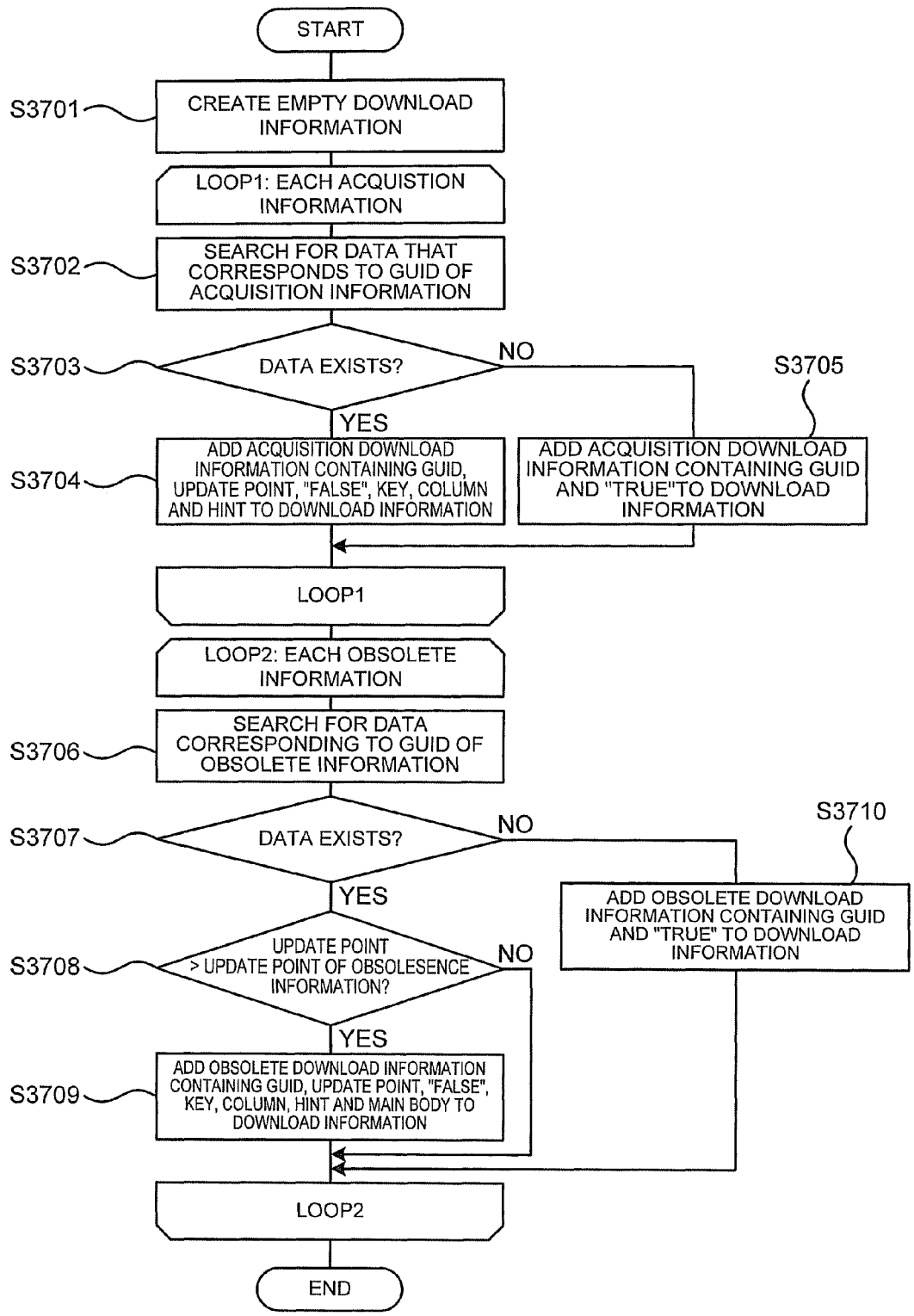
FIG. 20 is an explanatory diagram illustrating a flow of a handling process of the download request 43 according to the first embodiment.

FIG. 20 is an explanatory diagram illustrating a flow of a handling process of the download request 43 performed in the server 20.

The data acquiring part 218 creates an empty download information 44 (S3701), and performs the following processes for each of the acquisition information contained in the download request 43.

The data acquiring part 218 searches in the server database 21 for the data corresponding to the GUID contained in the acquisition information (S3702), and if the corresponding data exists (S3703:YES), creates acquisition download information containing the GUID, the update point, the key, the column, the hint and the body of the searched data and a "FALSE" delete flag and adds to the download information 44 (S3704). On the other hand, if the data corresponding to the GUID of the acquisition information does not exist (S3703:NO), the data acquiring part 218 creates acquisition download information containing the GUID of the acquisition information and the "TRUE" delete flag and adds to the download information 44 (S3705).

After having performed the above processes for each acquisition information, the data acquiring part 218 performs the following processes for each obsolete information contained in the download request 43.

The data acquiring part 218 searches in the server database 21 for the data corresponding to the GUID contained in the obsolete information (S3706), and in a case where the corresponding data exists (S3707:YES), if the update point of the relevant data is newer than the update point of the obsolete information (S3708:YES), creates an obsolete download information that contains the GUID, the update point, the key, the column, the hint and the body of the relevant data and the "FALSE" delete flag and adds it to the download information 44 (S3709). On the other hand, in a case where the data that corresponds to the GUID contained in the obsolete information does not exist (S3707:NO), the data acquiring part 218 creates the obsolete download information containing the GUID of the obsolete information GUID and the "TRUE" delete flag and adds it to the download information 44 (S3710).

By repeating the above-mentioned processes for each of the obsolete information, the download information 44 is created. The created download information 44 is sent to the client 10 by the download information sending part 219.

==Handling Process of Download Information 44 (S39)==

Figure 21:
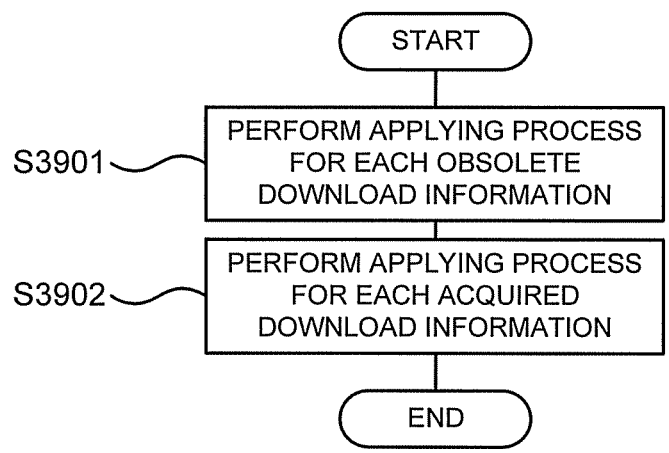
FIG. 21 is a diagram illustrating a flow of a handling process of the download information 44 according to the first embodiment.

FIG. 21 is a diagram illustrating a flow of a handling process of the download information 44 performed in the client 10.

Figure 22:
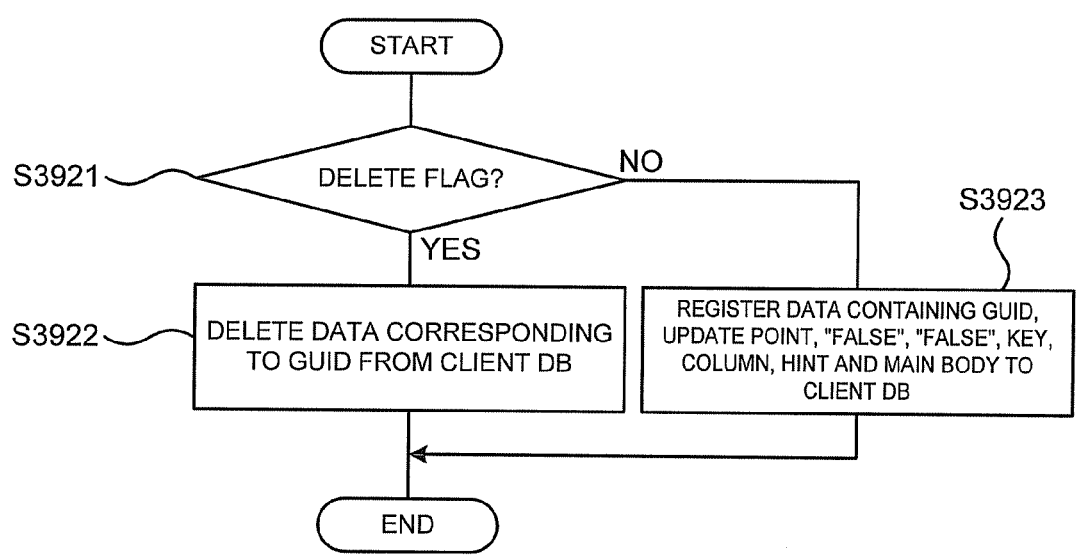
FIG. 22 is a diagram illustrating a flow of an applying process carried out by the client 10.

The update processing part 120 performs an applying process shown in FIG. 22 for each of the obsolete download information contained in the download information 44 (S3901). In other words, if the delete flag of the obsolete download information is "TRUE" (S3921:YES), the delete processing part 114 deletes, from the client database 11, the data corresponding to the GUID contained in the obsolete download information (S3922), and if the delete flag is "FALSE" (S3921:NO), the update processing part 120 creates the data containing the GUID, the key, the column, the hint and the body of the obsolete download information as well as the "FALSE" update possibility flag and the "FALSE" delete possibility flag, and registers it into the client database 11 (S3923). It is to be noted that in a case where the data having matching GUID has already been registered in the client database 11, the relevant data is written over.

Also, the update processing part 120 performs the applying process indicated in FIG. 22 for each of the acquisition download information contained in the download information 44 (S3902). That is to say, if the delete flag contained in the acquisition download information is "TRUE" (S3921:YES), the delete processing part 114 deletes, from the client database 11, the data corresponding to the GUID contained in the acquisition download information (S3922), and if the delete flag is "FALSE" (S3921:NO), the update processing part 120 creates the data containing the GUID, the key, the column, the hint and the body contained in the acquisition download information as well as the "FALSE" update possibility flag and the "FALSE" delete possibility flag and registers it into the client database 11 (S3923).

In this manner, the client database 11 is updated in response to the download information.

Synchronization of the client record and the server record that match the selection filter is performed in a manner described above.

Second Embodiment

Next, the second embodiment will be described. For the second embodiment, differences with the first embodiment will be mainly described and explanations for those part that are the same as the first embodiment will be omitted.

In the second embodiment, updating of data is also performed in the client 10. Therefore, collision may occur in which updating of different contents are performed on the same data in both the client 10 and the server 20. In general, the collision of the data is detected by the server 20, but in the second embodiment, collision is detected by both the client 10 and the server 20. Further, as a consequence of the update on different data between either of the client 10 and the server 20, duplication may occur in which different data contains the same or similar content. In the second embodiment, duplication is also detected in both the client 10 and the server 20. In the second embodiment, in a case where the keys matches, it is determined that the duplication has occurred.

=Software Configuration of Client 10=

Figure 23:
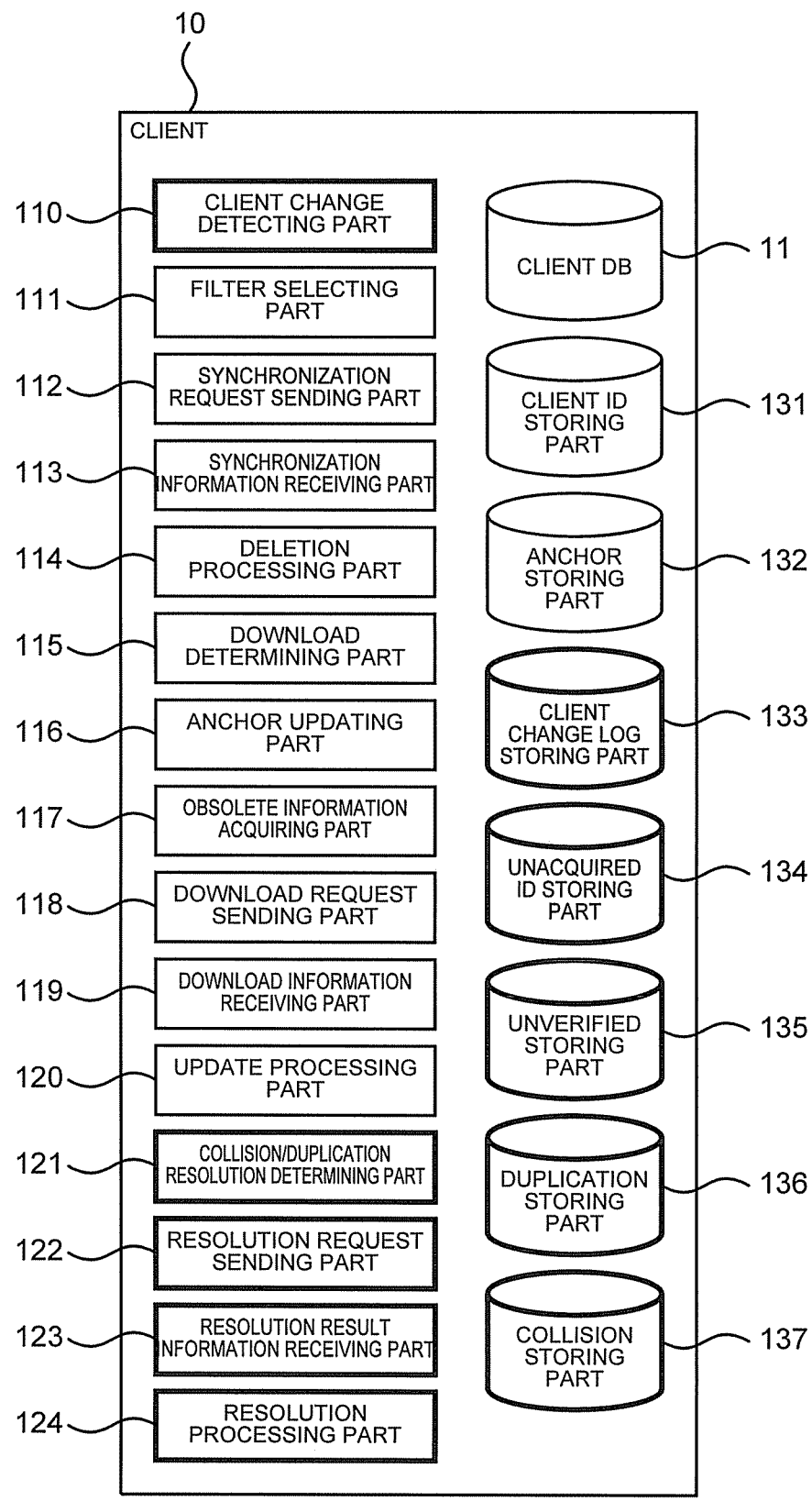
FIG. 23 is a diagram illustrating a software configuration of the client 10 according to the second embodiment.

FIG. 23 is a diagram illustrating a software configuration of the client 10 according to the second embodiment. The client 10 of second embodiment includes, in addition to the client 10 of the above-mentioned first embodiment, a client change detecting part 110, a collision/duplicate resolution determining part 121, a resolution request sending part 122, a resolution result information receiving part 123, a resolution processing part 124, a client change log storing part 133, an unacquired ID storage unit 134, an unverified storing part 135, a duplication storing part 136, a collision storing part 137. Further, the client change detecting part 110, the collision/duplicate resolution determining part 121, the resolution request sending part 122, the resolution result information receiving part 123, and the resolution processing part 124 are implemented by the CPU 101 of the client 10 reading out the program stored in the storage unit 103 and executing it. Further, the client change log storing part 133, the unacquired ID storage unit 134, the unverified storing part 135, the duplication storing part 136, and the collision storing part 137 are implementing as a storage area provided by the memory 102 or the storage unit 103 of the client 10.

FIG. 24 is a diagram illustrating an exemplary configuration of a client record stored in the client database 11 according to the second embodiment. As shown in the figure, the client record of the second embodiment contains, in addition to the client record of the first embodiment, a LUID (Local Unique Identifier). The LUID is an identification information that is assigned to the data in the client 10 and is a unique value in the client 10. As will be described later, in the second embodiment, since the server 20 assigns the GUID of the data, the GUID is not yet assigned when the data is created in the client 10, and what is assigned at this point to identify the data is the LUID. The linking (mapping) between the LUID and the GUID is performed by communicating the synchronization request 41 and the synchronization information 42.

The client change log storing part 133 stores the change log corresponding to the client database 11. In the above-mentioned server change log storing part 231, only a predetermined number of server change logs are stored in a reverse chronological order, and in the client change log storing part 133, the client change logs for all the changes on the client database 11 that have been performed after the anchor point are stored.

Figure 25:
FIG. 25 is a diagram illustrating an exemplary configuration of a client change log.

FIG. 25 is a diagram illustrating an exemplary configuration of a client change log stored in the client change log storing part 133. The client change log contains a type indicating whether the detected change was one of addition, change and delete (hereinafter referred to as a "type of change"), LUID and GUID indicating the data to be changed, an update point, a column before change (hereinafter also referred to as an "old column", a column after change (hereinafter also referred to as a "current column", a key and a hint. The type of change is one of "addition", "update", or "delete".

The unacquired ID storage unit 134 stores LUID whereto the GUID is not assigned (hereinafter referred to as an "unacquired ID"). In the unacquired ID storage unit 134, when new data is added to the client database 11, the LUID assigned to the data is registered.

The unverified storing part 135 stores the GUID indicating the data for which the determination of whether or not there is a data that duplicates with that data has not yet been performed. In the present embodiment, in a case where the data has been changed in the client 10, a query is not made as to whether duplication occurs in the server 20, and as will be described later, duplication is determined at the same time as the synchronization with the server 20. Accordingly, in a case where the data is changed, the GUID of the data is registered in the unverified storing part 135 from the time of change to the time of synchronization of the data.

Figure 26:
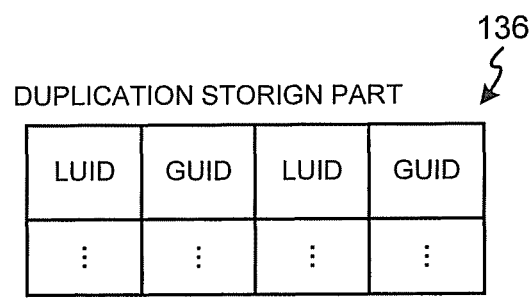
FIG. 26 is a diagram illustrating an exemplary configuration of a duplication storing part 136.

The duplication storing part 136 manages two duplicating data. FIG. 26 is a diagram illustrating an exemplary configuration of a duplication storing part 136. In the duplication storing part 136, LUID and GUID indicating the first data and LUID and GUID indicating the duplicating second data are registered in association.

The collision storing part 137 stores the GUID indicating the colliding data.

Figure 27:
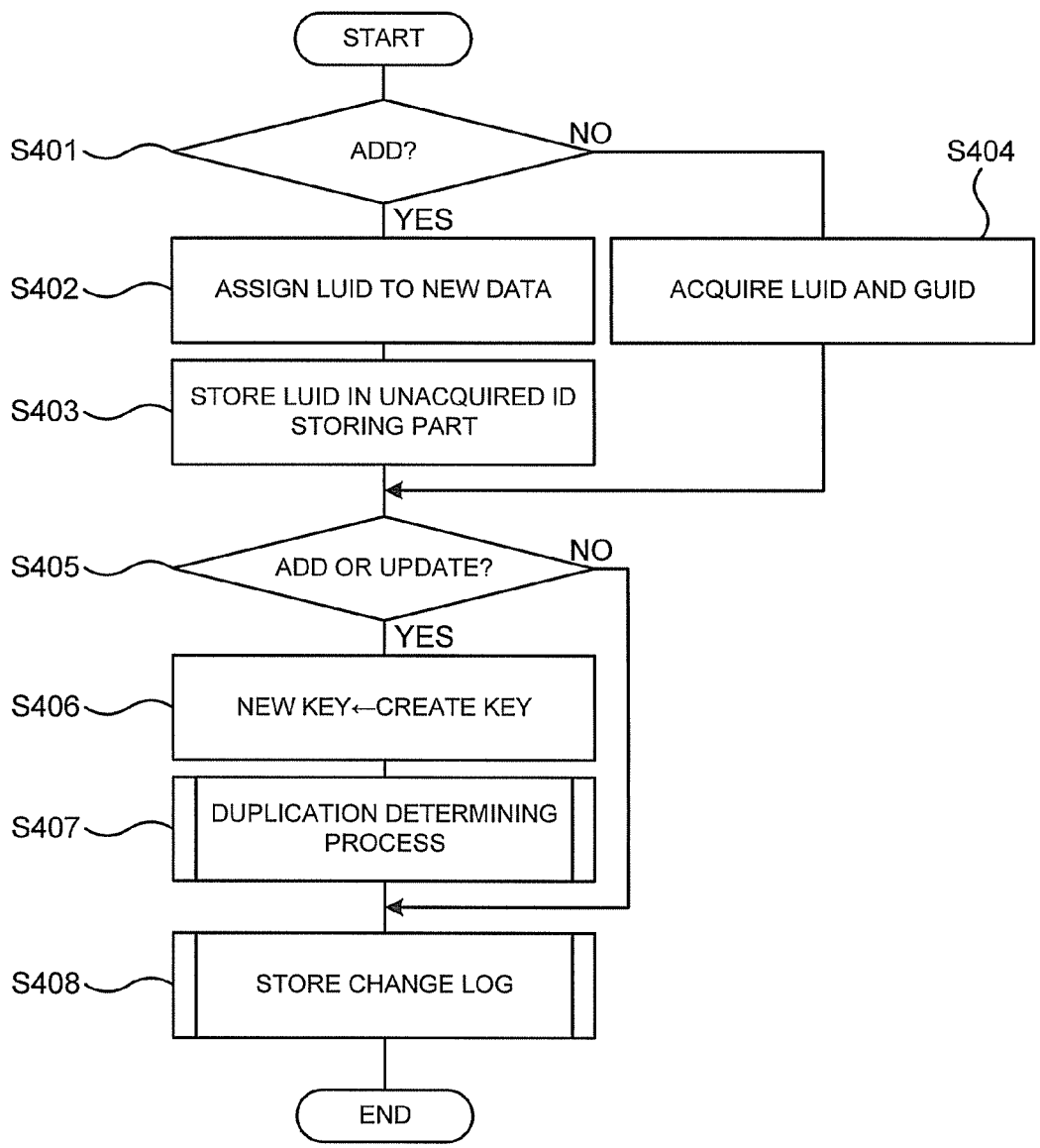
FIG. 27 is a diagram illustrating a flow of a process of a client change detecting part 110.

The client change detecting part 110 detects the change of data to the client database 11, and creates the client change log in accordance with the change and registers it into the client change log storing part 133. FIG. 27 is a diagram illustrating a flow of a process of a client change detecting part 110. In a case where a change to the client database 11 has been detected, the client change detecting part 110 performs the process shown in FIG. 27 by acquiring the data that has been added or changed (hereinafter referred to as a "new data" if the change is addition or change, and acquires the deleted or changed data (hereinafter referred to as an "old data") if the change is delete or change. It is to be noted that if the change is addition, the new data is treated as the old data.

In a case where the change is addition (S401:YES), the client change detecting part 110 assigns the LUID to the new data (S402), and registers the assigned LUID into the unacquired ID storage unit 134 (S403). On the other hand, in a case where the change is update or delete (S401:NO), the client change detecting part 110 acquires LUID and GUID from the new data (S404).

In a case where the change is addition or update (S405: YES), the client change detecting part 110 creates a key based on the body of the new data and take it as a new key (S406), and performs a duplication determining process (S407).

Finally, the client change detecting part 110 performs a change log registering process for registering the client change log (S408).

Figure 28:
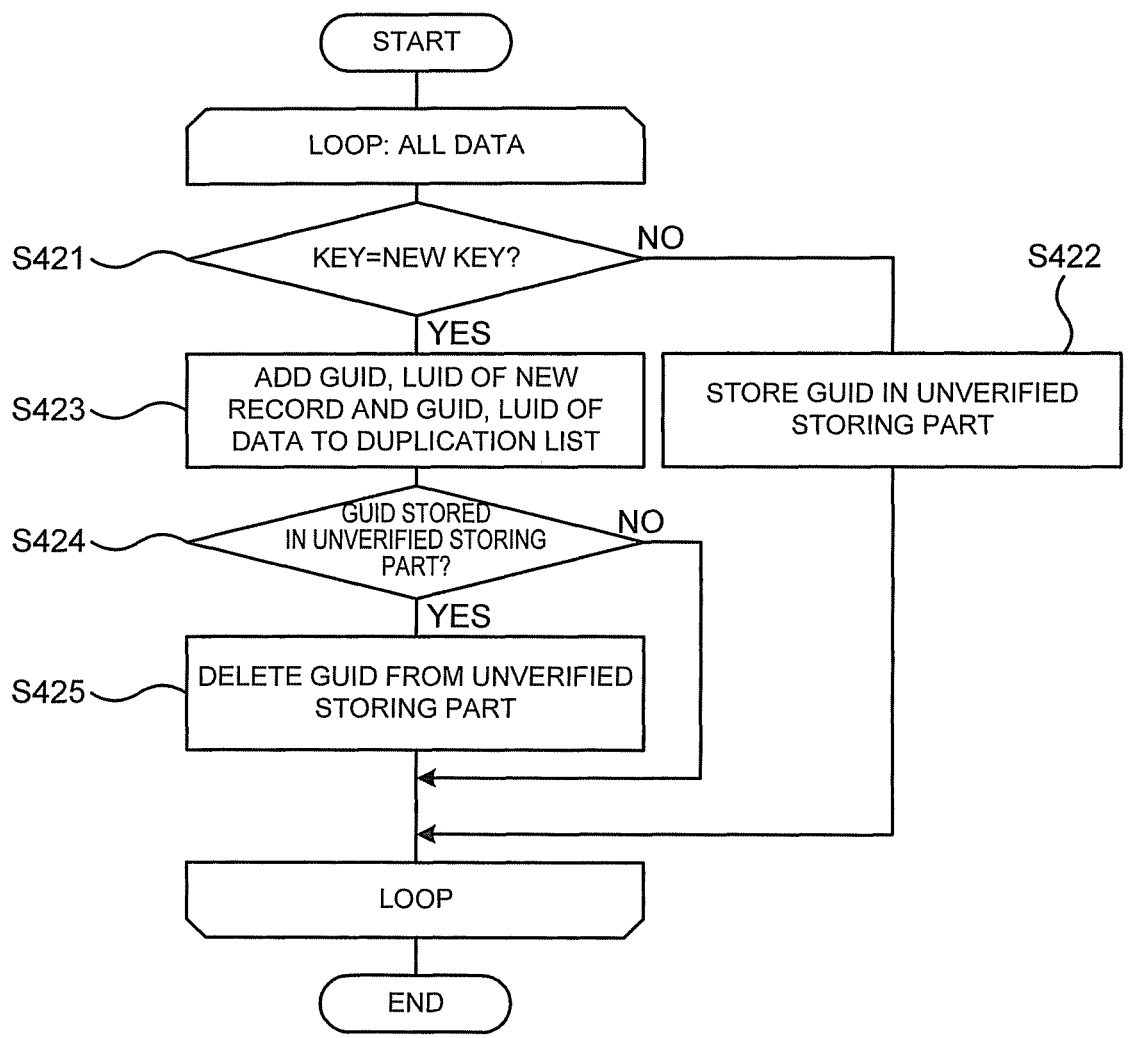
FIG. 28 is a diagram illustrating a flow of a duplication determining process shown in step S407.

FIG. 28 is a diagram illustrating a flow of a duplication determining process shown in step S407 of FIG. 27. In the duplication determining process, the client change detecting part 110 performs the following processes on all the data stored in the client database 11.

If the key of the client record does not match the new key (S321:NO), the client change detecting part 110 stores the GUID into the unverified storing part 135 (S322).

On the other hand, in a case where the key of the client record matches the new key (S321:YES), the client change detecting part 110 registers, into the duplication storing part 136, the GUID and the LUID of the new record and the GUID and the LUID of the client record in association with each other (S323). In a case where the GUID of the new record is registered in the unverified storing part 135 (S324:YES), the client change detecting part 110 deletes the GUID of the new record from the unverified storing part 135 (S325).

Figure 29:
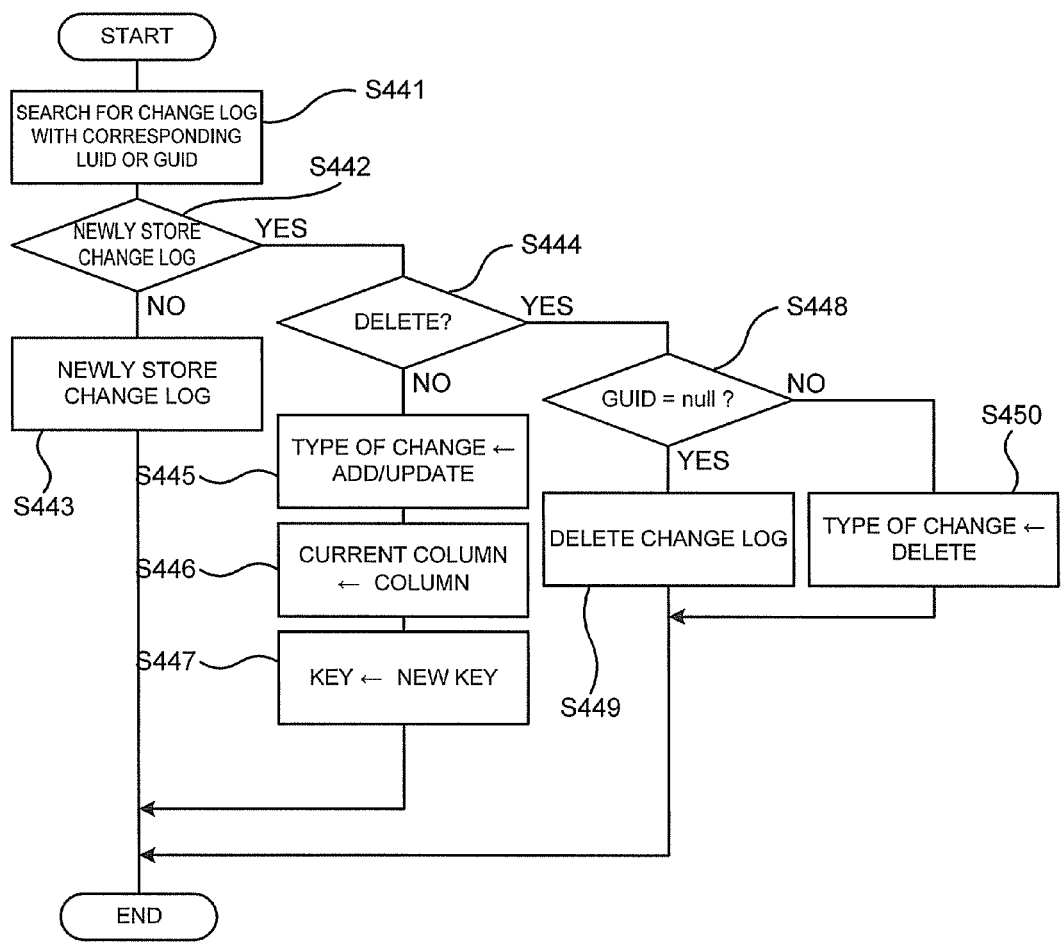
FIG. 29 is a diagram illustrating a flow of a change log registering process shown in step S408.

FIG. 29 is a diagram illustrating a flow of a change log registering process shown in step S408 of FIG. 27.

The client change detecting part 110 searches, in the client change log storing part 133, for the change log that matches the LUID or the GUID of the new data (S441). If there is no matching client change log (S442:NO), the client change detecting part 110 creates a client change log containing the type of change, the LUID, the GUID, the update point and the column of the new data, the column of the old data, and a new key and registers it into the client change log storing part 133 (S443).

On the other hand, in a case where the above-mentioned change log exists (S442:YES) and if the relevant change is addition or change (S444:NO), the client change detecting part 110 changes the type of change of the searched client change log to the type of change of the relevant change (addition or update) (S445), sets the column of the new data to the current column of the searched client change log (S446), and sets the new key to the key of the searched client change log (S347). As will be described later, since synchronization of data between the server 20 and the client 10 is performed in accordance with the client change log, in a case where there is a further update at a stage where synchronization with the server 20 is not yet complete, efficiency of the synchronization process can be increased by updating the existing client change log.

In a case where the change is delete (S444:YES) and if the GUID of the new data is not set yet, i.e., if the GUID of the new data is null (S448:YES), the client change detecting part 110 deletes the searched client change log from the client change log storing part 133 (S449). In other words, in case where the data is deleted after being created in the client 10 and uploaded in the server 20, unnecessary synchronization is avoided by deleting the client change log.

In a case where GUID is set in the new data, i.e., in a case where the GUID of the new record is not null (S448:NO), delete is set into type of change of the searched client change log(S450).

In a manner described above, when a change to the client database 11 is detected, the client change detecting part 110 registers the client change log.

Figure 30:
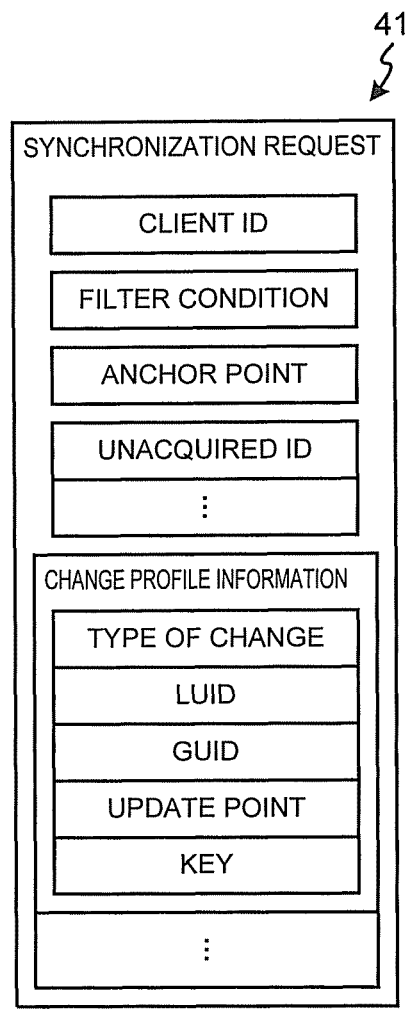
FIG. 30 is a diagram illustrating an exemplary configuration of a synchronization request 41 according to the second embodiment.

Next, an exemplary configuration of a synchronization request 41 sent by the synchronization request sending part 112 in the second embodiment is illustrated in FIG. 30. The synchronization request of the second embodiment contains, in addition to the synchronization request of the first embodiment shown in the above-mentioned FIG. 7, the unacquired ID and the change profile information. The synchronization request sending part 112 sets the unacquired ID stored in the unacquired ID storage unit 134 into the synchronization request. Also, the change profile information is information created based on the client change log and contains the type of change, the LUID, the GUID, the update point and the key of the client change log. The synchronization request sending part 112 retrieves, from the client change log storing part 133, the client change log in which GUID is not registered in the duplication storing part 136 and the collision storing part 137, and for each of the retrieved client change logs, sets the change profile information containing the type of change, the LUID, the GUID, the update point and the key of the client change log into the synchronization request.

Figure 31:
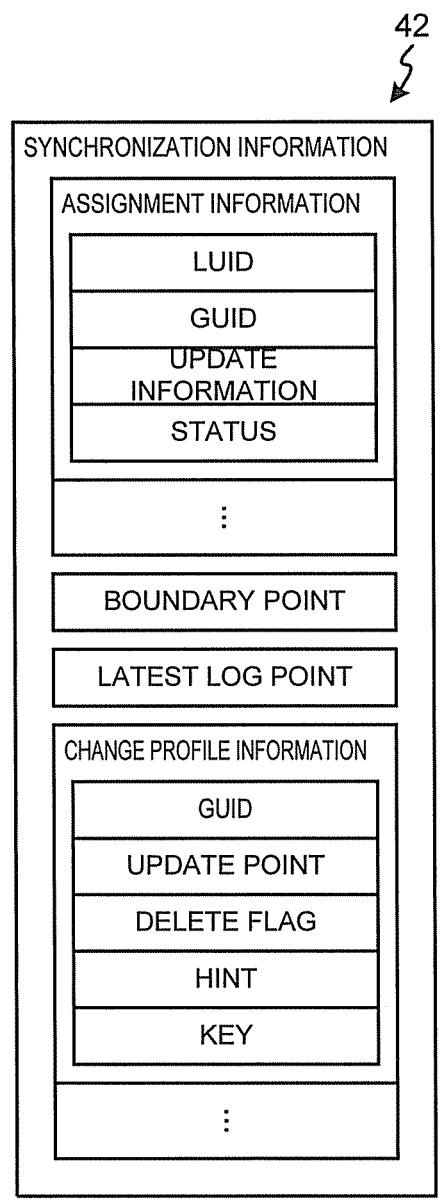
FIG. 31 is a diagram illustrating an exemplary configuration of synchronization information 42 according to the second embodiment.

FIG. 31 is a diagram illustrating an exemplary configuration of synchronization information 42 received by the synchronization information receiving part 113 in the second embodiment. In the synchronization information 42 of the second embodiment, in addition to the synchronization information 42 related to the first embodiment illustrated in the above-mentioned FIG. 8, assignment information is contained. The assignment information is information containing the GUID assigned to the unacquired ID by the server 20. The assignment information contains the LUID, the GUID, the update point and a status. The update point is an update point of the data in a case where the GUID corresponding to the LUID has already been assigned to the server 20. In a case where the data corresponding to the unacquired ID is not stored in the server 20, the update point will not be set. The status is information indicating whether or not the GUID corresponding to the unacquired ID already exists in the server 20.

Also, in the second embodiment, the change profile information contained in the synchronization information 42 is, as will be described later, added to the data that is colliding or duplicating between the client 10 and the server 20, in addition to the data that is newly added in the server 20.

In a case where the data indicated by GUID contained in the download information 44 collide or duplicate, the collision/duplicate resolution determining part 121 determines whether or not to send the relevant data to the server 20. In the present embodiment, the collision/duplicate resolution determining part 121 determines whether there is an occurrence of collision or duplication based on whether the GUID contained in the download information 44 is stored in the client change log storing part 133, the duplication storing part 136 or the collision storing part 137, and in a case where it is determined that there is an occurrence of collision or duplication, let the user select either the client record or the server record. It is to be noted that, collision/duplicate resolution determining part 121 may, for example, always give priority to the client record and select the client record unconditionally, or may select automatically by applying any algorithm.

Figure 32:
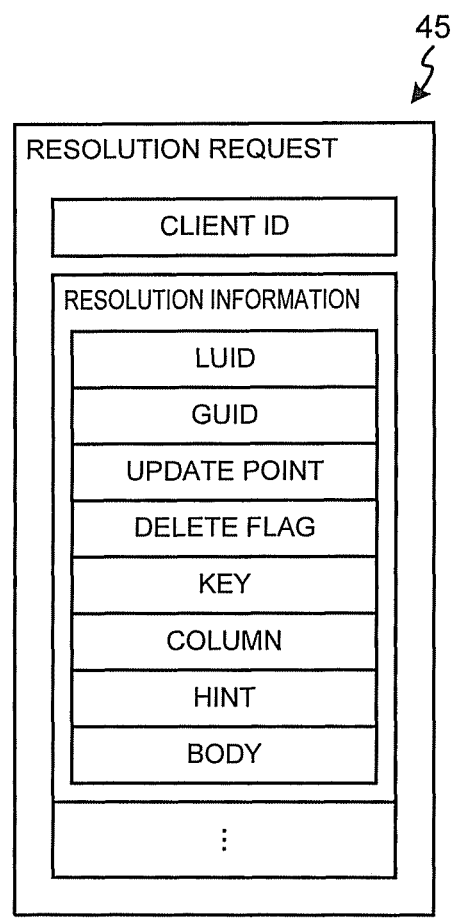
FIG. 32 is a diagram illustrating an exemplary configuration of a resolution request 45.

The resolution request sending part 122 sends, to the server 20, a command that instructs to resolve the data in which collision or duplication has occurred (hereinafter referred to as a "resolution request"). FIG. 32 is a diagram illustrating an exemplary configuration of a resolution request 45. The contains the client ID as well as resolution information in which the LUID, the GUID, the update point, the delete flag, the key, the column, the hint and the body of the client record or server record selected by the collision/duplicate resolution determining part 121 are set.

Figure 33:
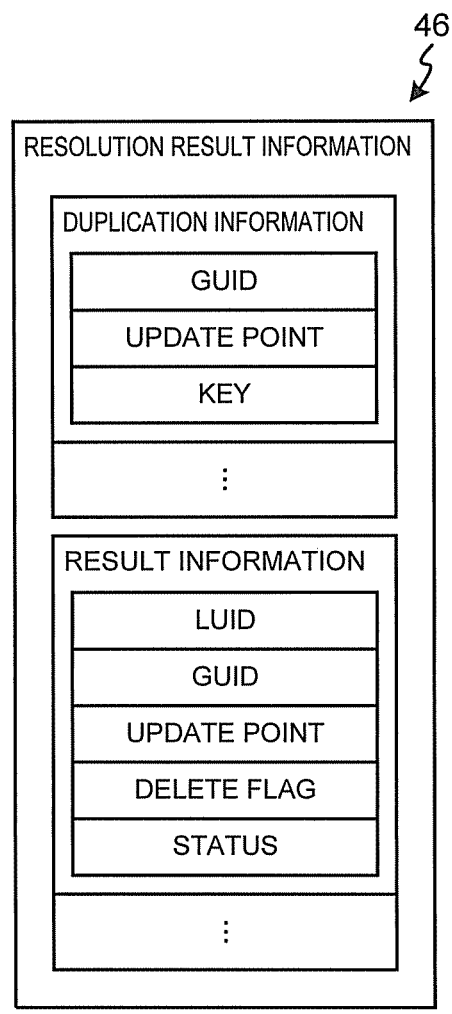
FIG. 33 is a diagram illustrating an exemplary configuration of resolution result information 46.

The resolution result information receiving part 123 receives information, which is sent from the server 20 in accordance with the resolution request, indicating a result of the resolution process of collision or duplication (hereinafter referred to as "resolution result information"). FIG. 33 is a diagram illustrating an exemplary configuration of resolution result information 46. The resolution result information 46 contains the duplicate information and the result information. The duplicate information is set in a case where duplication has occurred in the server 20 for the data indicated by the resolution information contained in the resolution request 45. In the duplicate information, the GUID, the update point, the key of the data that was duplicated in the server 20 are set. The result information is information representing a result of a process that has updated the server database 21 in response to the resolution request 45, and contains the LUID, the GUID, the update point, the delete flag and the status.

The resolution processing part 124 updates the client database 11 in accordance with the resolution result information 46. It is to be noted that details of a process in the resolution processing part 124 will be described later.

==Software Configuration of Server 20==

Figure 34:
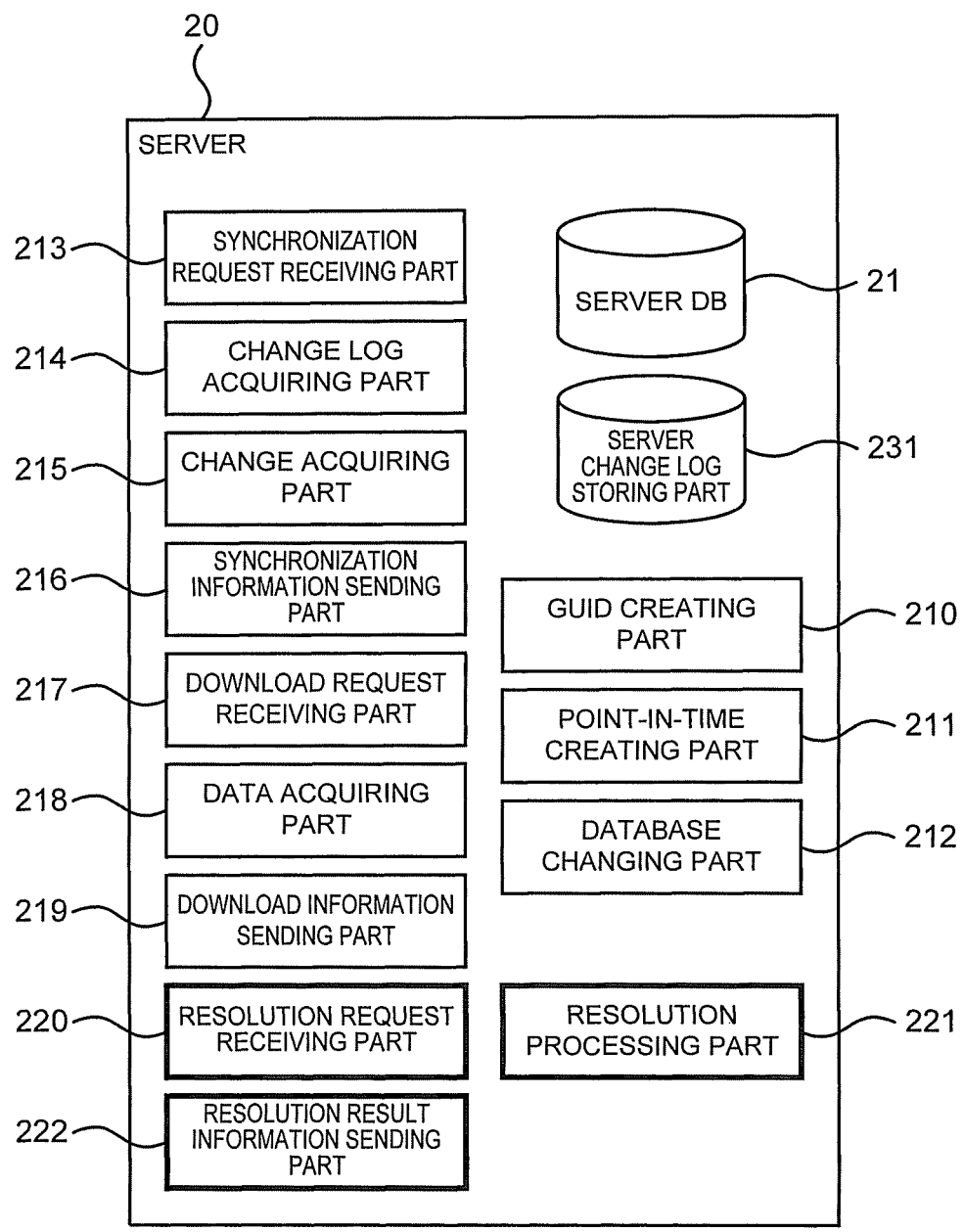
FIG. 34 is a diagram illustrating a software configuration of the server 20 according to the second embodiment.

FIG. 34 is a diagram illustrating a software configuration of the server 20 according to the second embodiment. The server 20 of the second embodiment includes, in addition to the server 20 of the first embodiment, a resolution request receiving part 220, a resolution processing part 221 and a resolution result information sending part 222. It is to be noted that the resolution request receiving part 220, resolution processing part 221 and the resolution result information sending part 222 are implement by the CPU 201 of the server 20 reading out the program stored in the storage unit 203 to the memory 202 and executing it.

FIG. 35 is a diagram illustrating an exemplary configuration of a server record stored in the server database 21 according to the second embodiment. As shown in the figure, the server record of the second embodiment contains, in addition to the server record of the first embodiment, the LUID and a creator ID. The LUID is identification information assigned by the client 10 to the data and is a unique number in the client 10. As will be described later, in the second embodiment, since the GUID of the data is assigned by the server 20, GUID is not yet assigned at the time the data is created in the client 10, and what is assigned at this point to identify the data is the LUID. The association (mapping) between LUID and GUID is performed by communicating the synchronization request 41 and synchronization information 42. The creator ID is a client ID of the client 10 that has created the data first and is set at the time of addition to the server record.

The resolution request receiving part 220 receives a resolution request 45 from the client 10.

The resolution processing part 221 updates the server database 21 in accordance with the resolution request 45. It is to be noted that details of the resolution process performed by the resolution processing part 221 will be described later.

The resolution result information sending part 222 creates resolution result information indicating the result of the resolution process performed by the resolution processing part 221 and sends it to the client 10. It is to be noted that details of the creation process of the resolution result information performed by the resolution result information sending part 222 will be described later.

==Overview of Synchronization Process==

Figure 36:
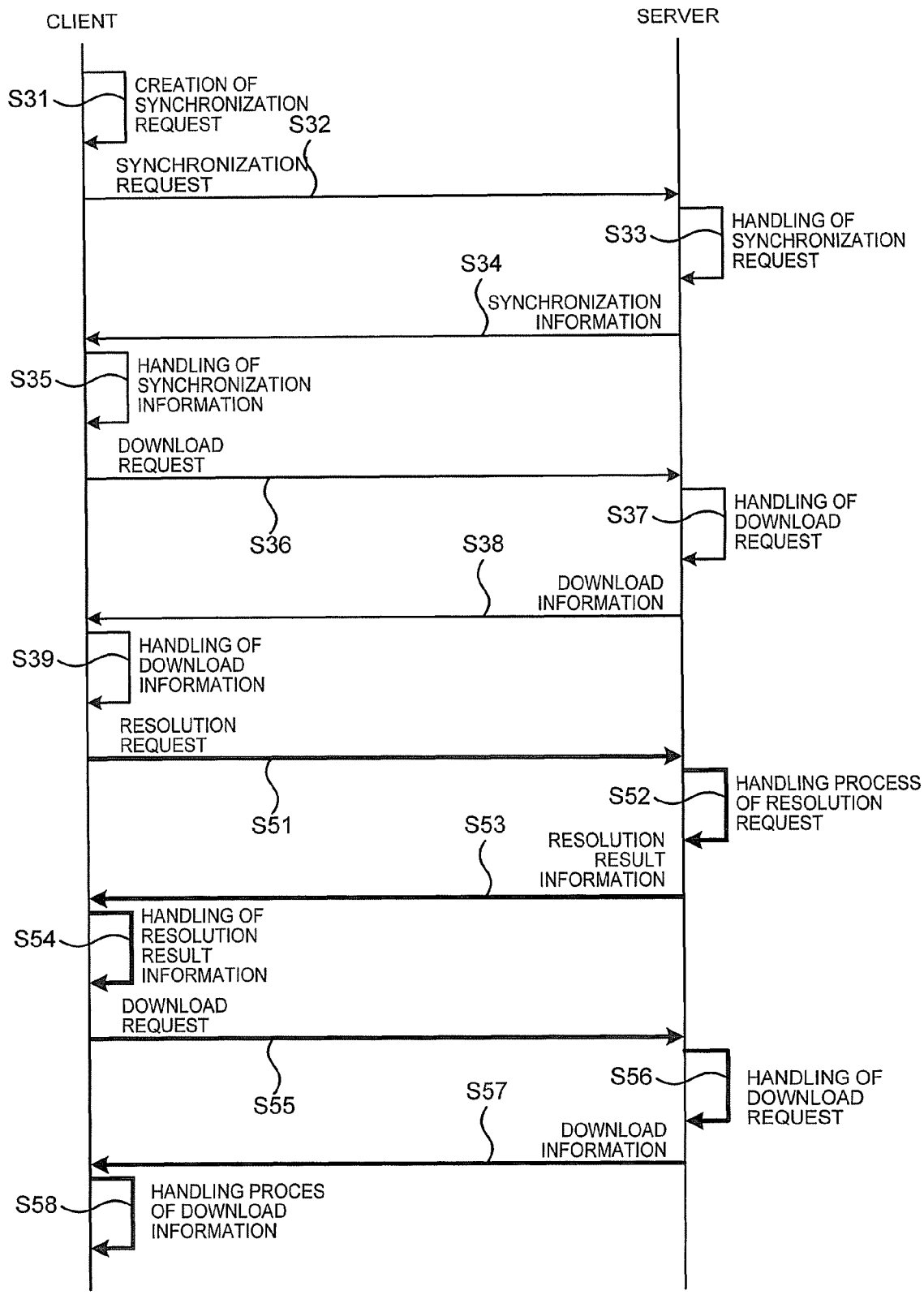
FIG. 36 is a diagram illustrating a flow of a data synchronization process according to the second embodiment.

FIG. 36 is a diagram illustrating a flow of a data synchronization process performed in the communication system of the second embodiment. In the data synchronization process of the second embodiment, steps S51 to S58 are performed in addition to the synchronization process of the first embodiment shown in FIG. 14. In other words, the client 10 performs a process corresponding to the download information 44 (S39), and thereafter sends the resolution request 45 to the server 20 (S51), and the server 20 updates the server database 21 in accordance with the resolution request 45 (S52), and sends, to the client 10, resolution result information 46 containing result information indicating the update result and duplicate information related to duplication that has occurred at the time of update (S53). The client 10 performs a process of determining the data to be further downloaded in accordance with the resolution result information 46 (S54), and sends, to the server 20, the download request 43 containing the acquisition information in which the GUID of the data to be downloaded is set (S55). The server 20 retrieves, from the server database 21, the specified data in accordance with the download request 43 (S56), and sends, to the client 10, the download information 44 in which the retrieved data is set (S57). The client 10 registers, into the client database 11, the data contained in the download information 44 (S58).

==Sending Process of Synchronization Request (S31)==

Figure 37:
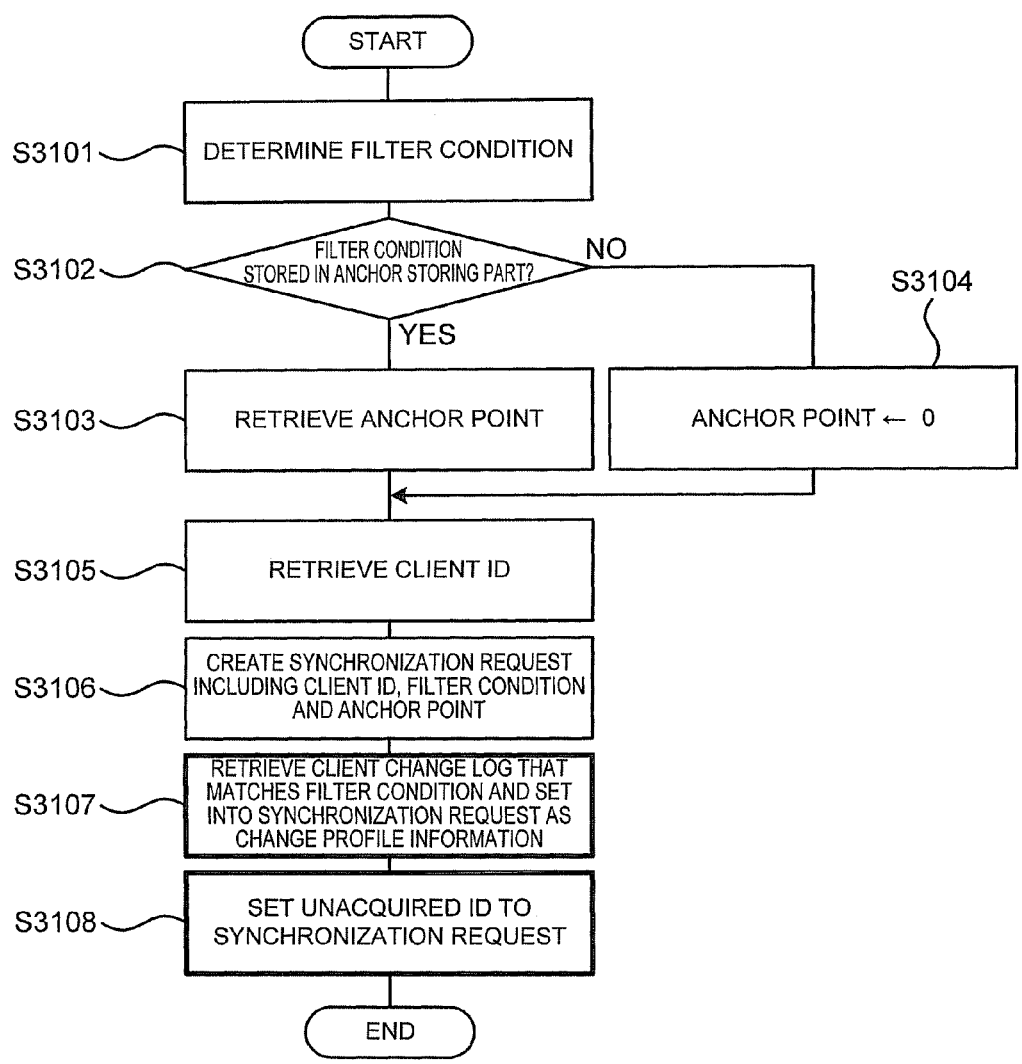
FIG. 37 is a diagram illustrating a flow of a creation process of a synchronization request according to the second embodiment.

FIG. 37 is a diagram illustrating a flow of a creation process of a synchronization request at step S31 according to the second embodiment. In the second embodiment, in addition to the above-mentioned process of FIG. 15 and subsequent to step S3106, the synchronization request sending part 112 retrieves, from the client change log storing part 133, the client change log that matches the selected filter condition and sets into the synchronization request 41 as a change log (S3107), and retrieves the unacquired ID stored in the unacquired ID storage unit 134 and sets into the synchronization request 41 (S3108).

With the update information and the unacquired ID, it becomes possible to grasp of the data update performed in the client 10 on the server 20 side.

==Process Corresponding to Synchronization Request (S33)==

Figure 38:
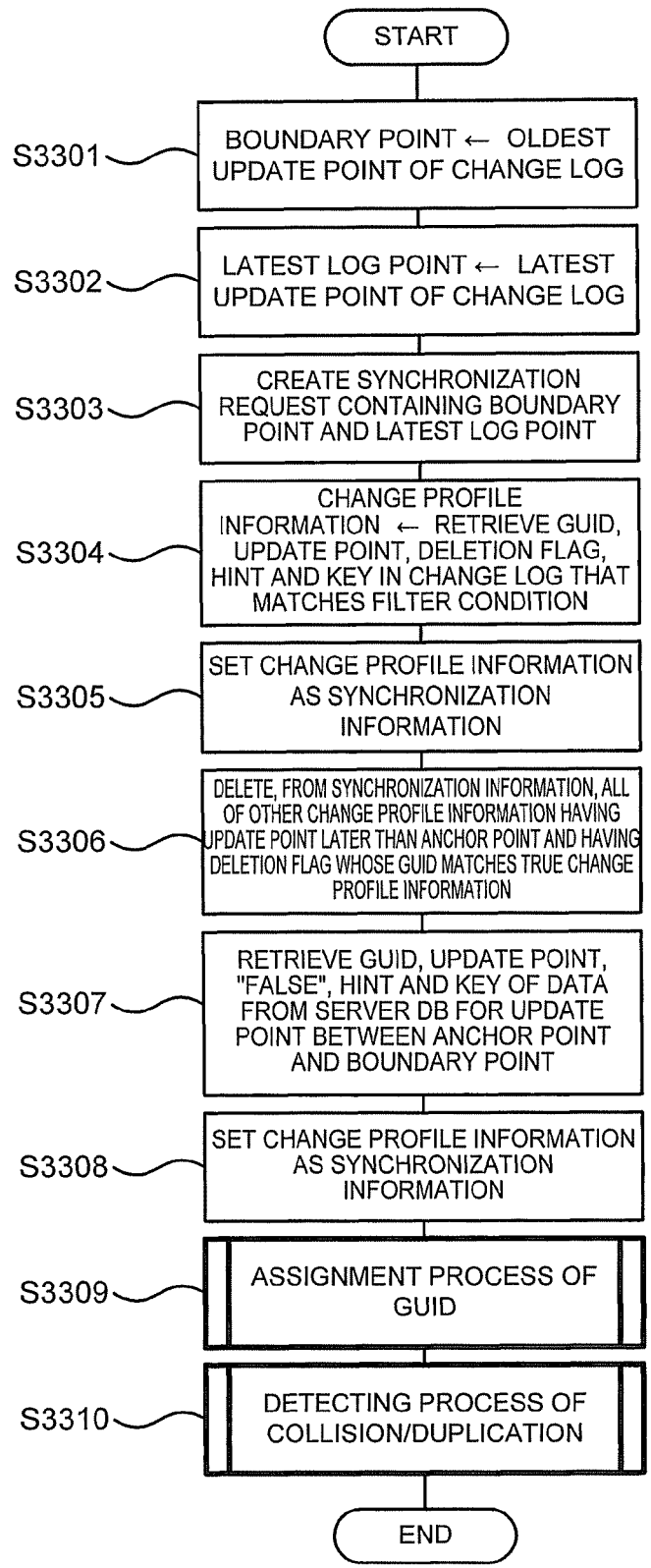
FIG. 38 is a diagram illustrating a flow of a handling process of the synchronization request according to the second embodiment.

FIG. 38 is a diagram illustrating a flow of a handling process of the synchronization request at step S33 of the second embodiment. In the second embodiment, in addition to the above-mentioned process of FIG. 16, after step S3308, the synchronization information sending part 216 performs an assignment process of the GUID illustrated in FIG. 39 (S3309), and performs a collision and duplication detecting process illustrated in FIG. 40 (S3310).

Figure 39:
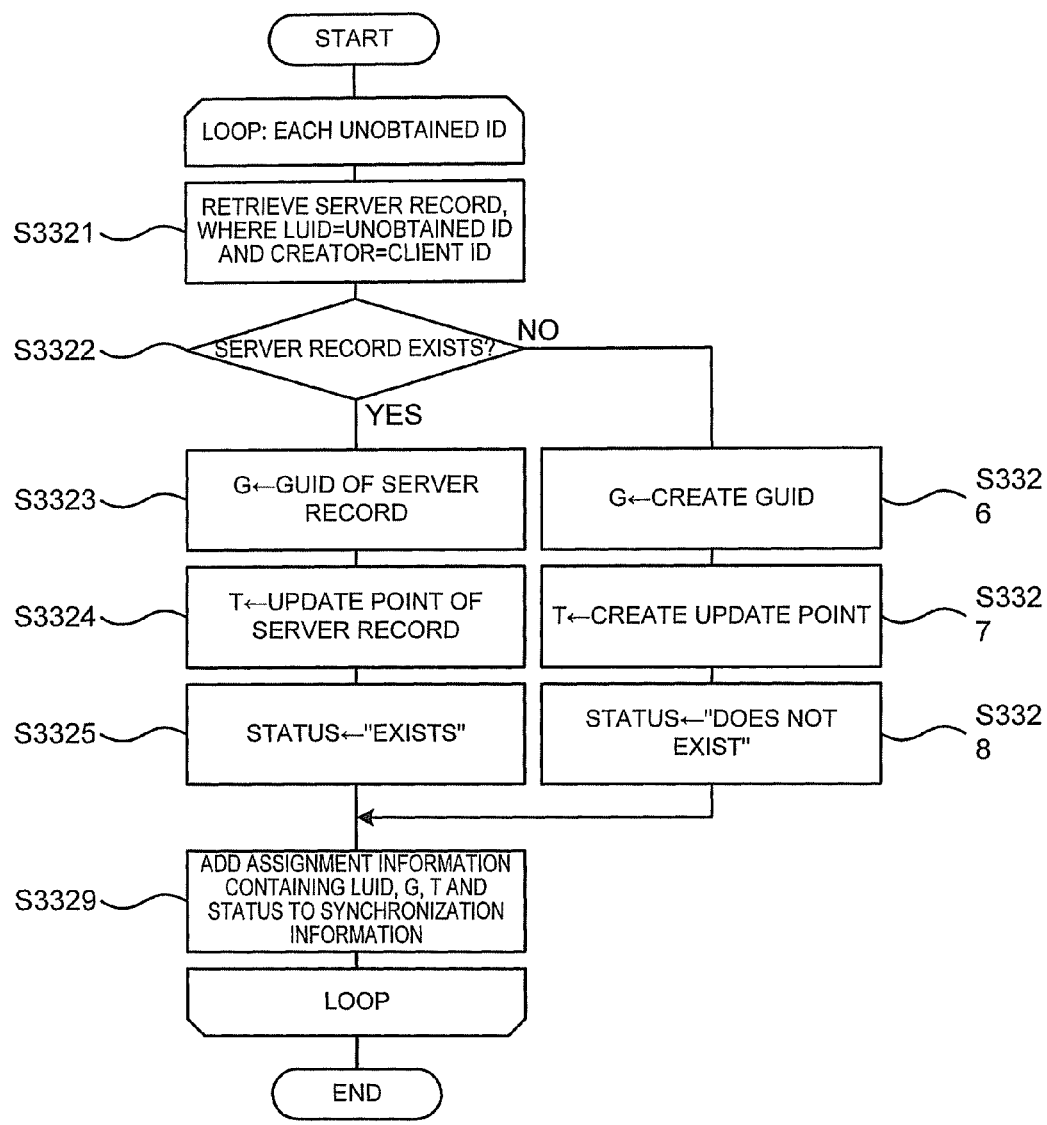
FIG. 39 is a diagram illustrating a flow of an assignment process of GUID carried out at the server 20.

In the assignment process of GUID shown in FIG. 39, the synchronization information sending part 216 performs the following processes for each unacquired ID contained in the synchronization request 41.

The synchronization information sending part 216 searches, in the server database 21, a server record having the LUID that matches the unacquired ID and the creator matches the client ID (S3321), and in a case where a matching server record exists (S3322:YES), sets the GUID of the server record to "G" (S3323), the update point of the server record to "T" (S3324) and the status to "EXISTS" (S3325).

On the other hand, in a case where there is no server record that matches the unacquired ID (S3322:NO), the synchronization information sending part 216 sets a new GUID created by the GUID creating part 210 to "G" (S3326), a new time point created by the point-in-time creating part 211 to "T" (S3327) and the status to "DOES NOT EXIST" (S3328).

The synchronization information sending part 216 adds, to the synchronization information 42, assignment information containing the LUID, "G", "T" and the status (S3329).

The above-mentioned process is repeated for each of the unacquired ID and the GUID corresponding to the unacquired ID is set in the synchronization information 42.

Figure 40:
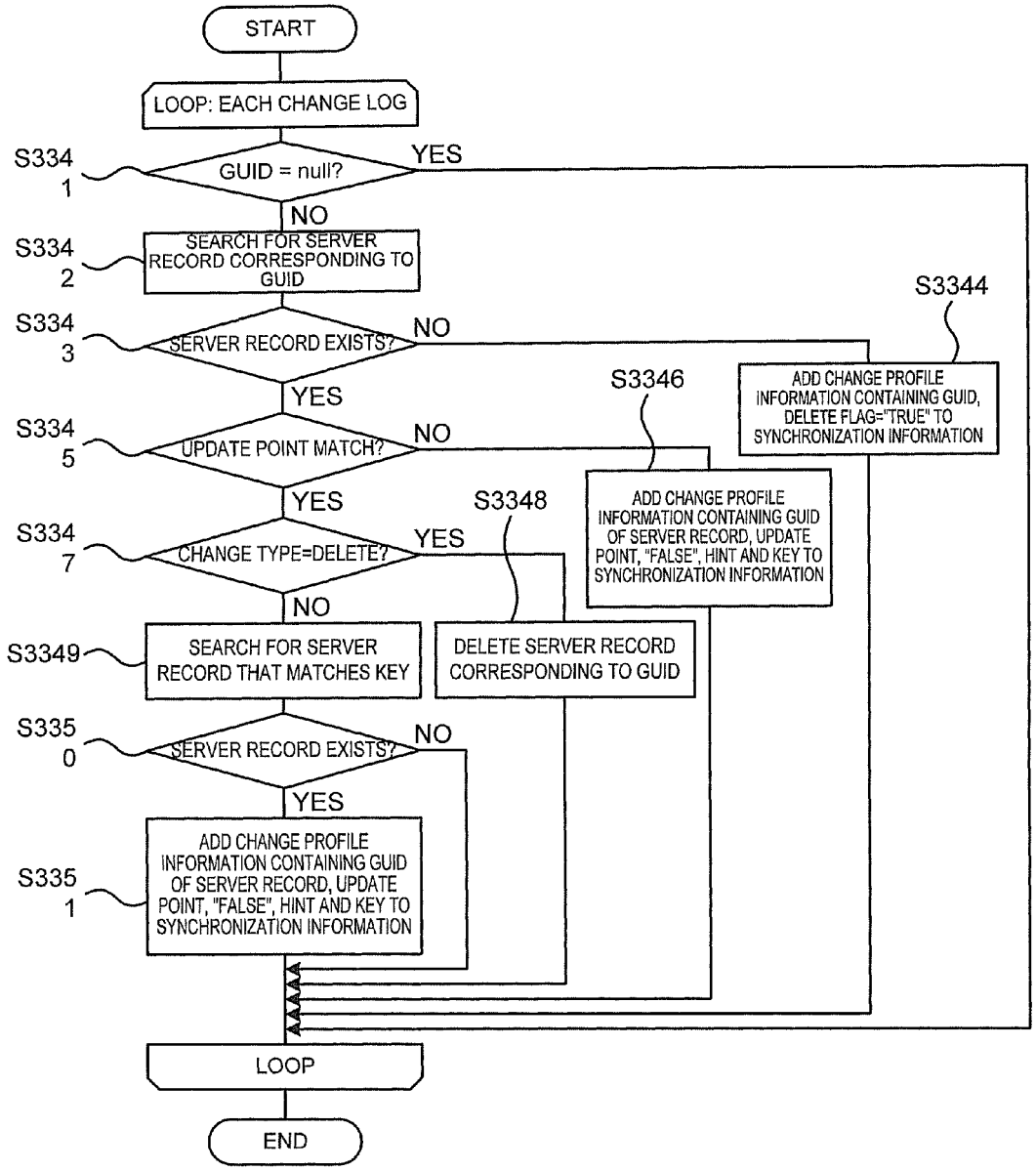
FIG. 40 is a diagram illustrating a collision and duplication detecting process carried out at the server 20.

In a collision and duplication detecting process illustrated in FIG. 40, the following process is performed for each of the change logs set in the synchronization information 42.

In a case where GUID is set in the change log (S3341:NO), the change acquiring part 215 searches, in the server database 21, for the server record corresponding to the GUID of the change log (S3342), and if the corresponding server record does not exist (S3343:NO), creates change profile information containing the GUID and "TRUE" delete flag and adds it to the synchronization information 42 (S3344).

In a case where a server record corresponding to the GUID of the change log exists (S3343:YES), the change acquiring part 215 determines whether the update point of the change log and the update point of the server record matches or not (S3345), and if the update points do not match (S3345:NO), creates change profile information containing GUID, update point, hint and key of the server record as well as the "FALSE" delete flag and adds it to the synchronization information 42 (S3346).

On the other hand, in a case where the update points match (S3345:YES), if the type of change of the change log is "delete" (S3347:YES), the server record corresponding to the GUID is deleted from the server database 21 (S3348). If the type of change is not "delete" (S3347:NO), the change acquiring part 215 searches, in the server database 21, for the server record that matches the key contained in the change log (S3349), and if there is a server record that matches the key (S3350:YES), creates change profile information containing the GUID, the update point, the hint and the key of the server record as well as the "FALSE" delete flag and adds to it the synchronization information 42 (S3351).

By performing the above-mentioned process for each of the change logs contained in the synchronization request 42, change profile information for the collided or duplicated data will be added to the synchronization information 42.

==Process Corresponding to Synchronization Information (S35)==

Figure 41:
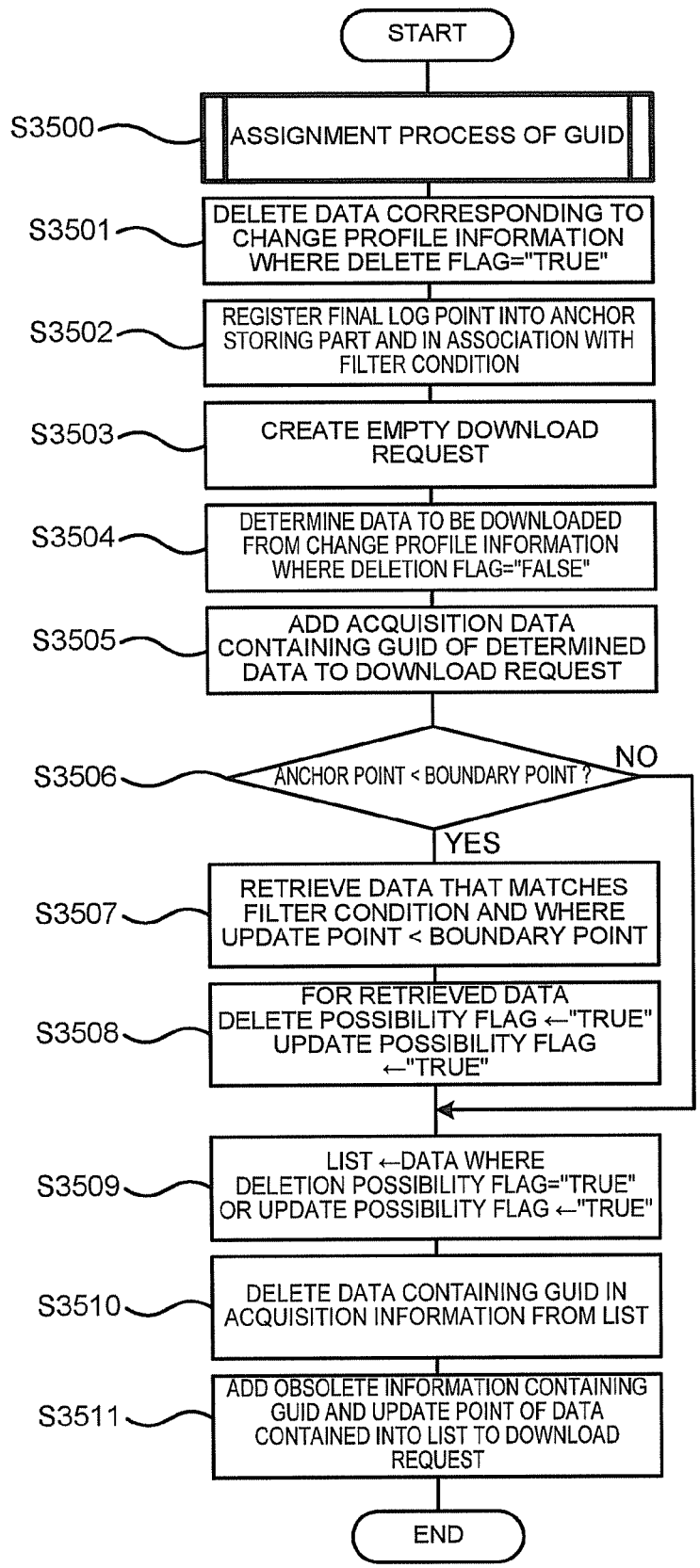
FIG. 41 is a diagram illustrating a flow of a handling process of synchronization information 42 according to the second embodiment.

FIG. 41 is a diagram illustrating a flow of a handling process of synchronization information 42 at step S35 according to the second embodiment. In the second embodiment, an assignment process of GUID shown in FIG. 42 (S3500) is performed prior to the above-mentioned process of FIG. 19.

Figure 42:
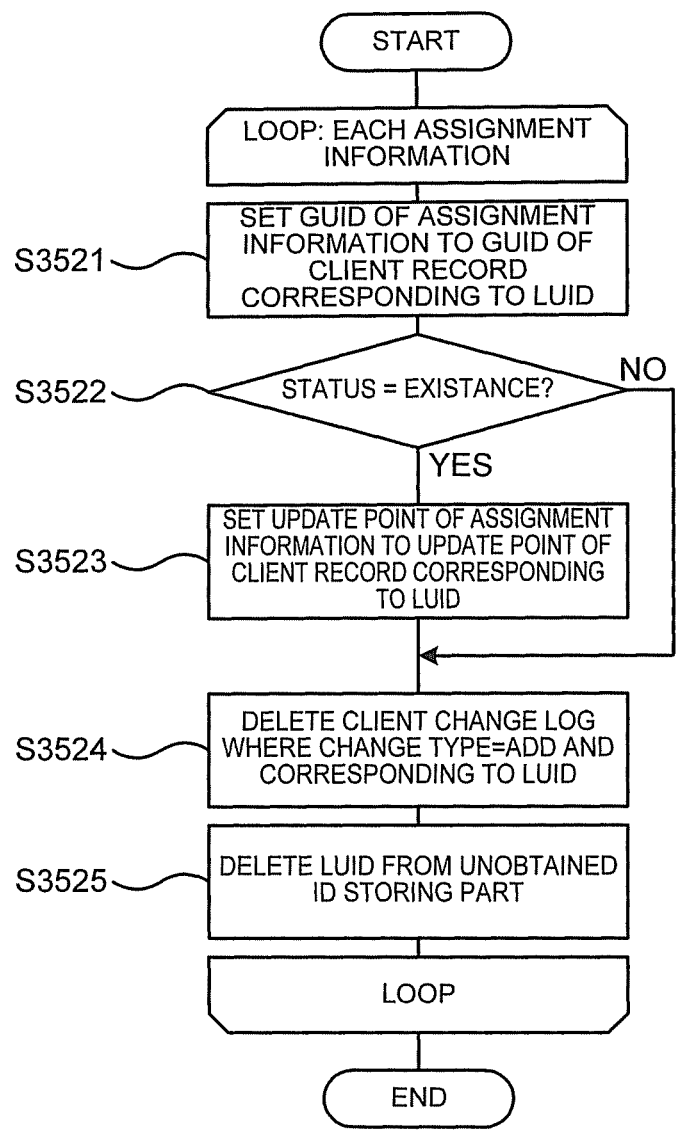
FIG. 42 is an assignment process of GUID carried out at the client 10

In an assignment process of GUID shown in FIG. 42, the update processing part 120 performs the following processes for each of the assignment information contained in the synchronization information 42.

The update processing part 120 sets GUID of the assignment information to the GUID of the client record corresponding to the LUID (S3521). In a case where the status contained in the assignment information is "EXISTS" (in a case where GUID corresponding to LUID has already been registered in the server database 21) (S3522), the update processing part 120 sets the update point of the assignment information to the update point of the client record corresponding to the LUID (S3523).

The update processing part 120 deletes, from the client change log storing part 133, the client change log in which type of change is "addition" and corresponding to LUID of assignment information (S3524). Further, the update processing part 120 deletes the LUID of the assignment information from the unacquired ID storing part 134 (S3525).

By performing the above-mentioned processes for each assignment information, the GUID corresponding to the unacquired ID is registered.

It is to be noted that, the download request 43 created in the second embodiment is the same as that of the first embodiment and the process by the server 20 in response to the download request 43 (S37) is also the same as the first embodiment.

==Handling Process of Download Information (S39)==

Figure 43:
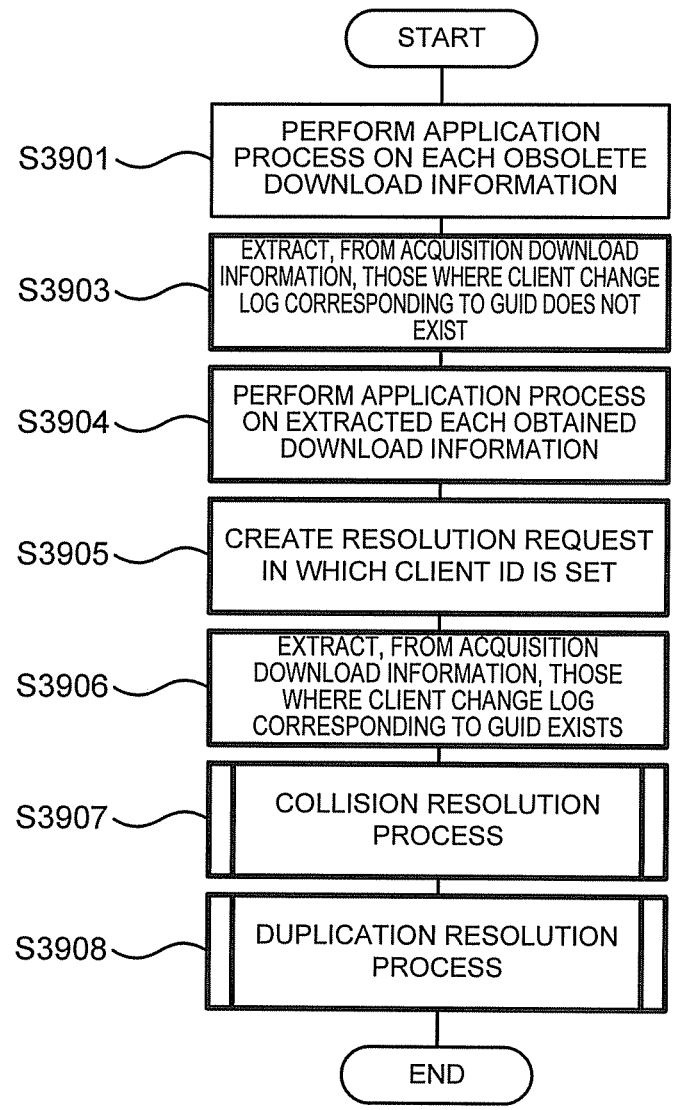
FIG. 43 is a diagram illustrating a flow of a handling process of download information 44 according to the second embodiment.

FIG. 43 is a diagram illustrating a flow of a handling process of download information 44 in step S39 according to the second embodiment. In the second embodiment, after having performed step S3901 of the above-mentioned process in FIG. 21, steps S3903 to S3908 are performed instead of step S3902.

The update processing part 120 extracts, from the acquisition download information contained in the download information 44, those in which the client change log corresponding to the GUID of the acquisition download information is not stored in the client change log storing part 133 (S3903), and performs the above-mentioned applying process shown in FIG. 22 for respective extracted acquisition download information (S3904). In other words, if the delete flag contained in the acquisition download information is "TRUE" (S3921:YES), the delete processing part 114 deletes from the client database 11 the client record corresponding to the GUID contained in the acquisition download information (S3922), and if the delete flag is "FALSE" (S3921:NO), the update processing part 120 registers, into the client database 11, the client record containing the GUID, the key, the column, the hint and the body contained in the acquisition download information, as well as, the "FALSE" update possibility flag and the "FALSE" delete possibility flag (S3923).

Next, the resolution request sending part 122 creates a resolution request 45 in which client ID stored in the client ID storing part 131 is set (S3905). The update processing part 120 extracts, from acquisition download information contained in the download information 44, those in which the client change log corresponding to the GUID of acquisition download information is stored in the client change log storing part 133 (S3906). The resolution processing part 124 performs the collision resolution process shown in FIG. 44 (S3907), and duplication resolution process shown in FIG. 45 (S3908).

Figure 44:
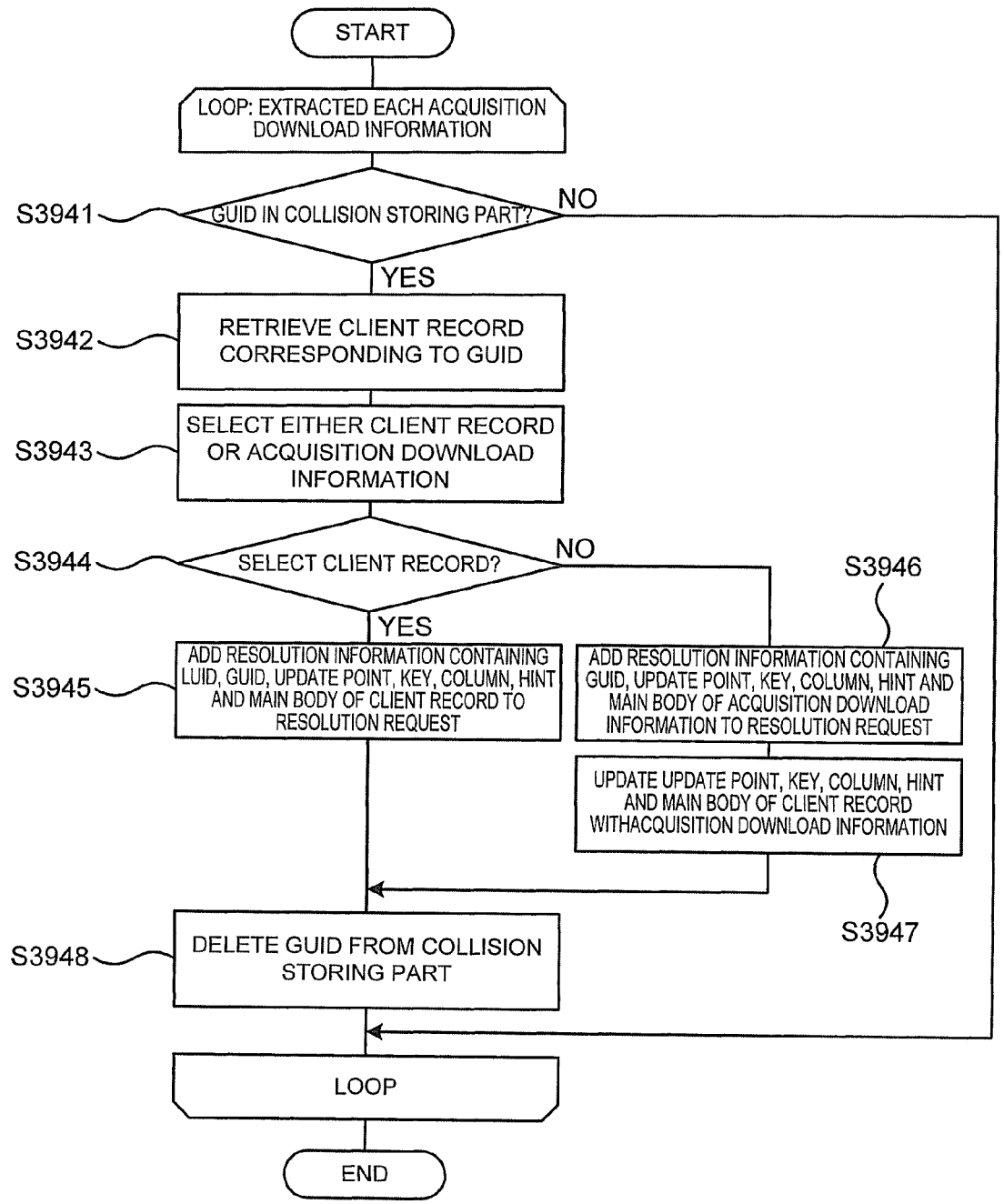
FIG. 44 is a diagram illustrating a flow of a collision resolving process carried out at the client 10.

In a collision resolving process shown in FIG. 44, the following processes are performed for each of the acquisition download information extracted in step S3906 of the above-mentioned FIG. 43.

If the GUID contained in the acquisition download information is stored in the collision storing part 137 (S3941), the resolution processing part 124 retrieves a client record corresponding to the relevant GUID (S3942) and selects either the retrieved record and the acquisition download information (S3943). The resolution processing part 124, for example, may output a hint of the client record and acquisition download information ant let the user make a selection.

In a case where the client record is selected (S3944:YES), the resolution processing part 124 adds resolution information containing the LUID, the GUID, the update point, the key, the column, the hint and the body of the client record to the resolution request 45 (S3945), and in a case where the acquisition download information is selected (S3944:NO), the resolution information containing the GUID, the update point, the column, the hint and the body of the acquisition download information is added to the resolution request 45 (S3946) and updates the client database 11 in such a manner that the update point, the key, the column, the hint and the body of the client record are changed to those of the acquisition download information (S3947). The resolution processing part 124 deletes the above-mentioned GUID from the collision storing part 137 (S3948).

Figure 45:
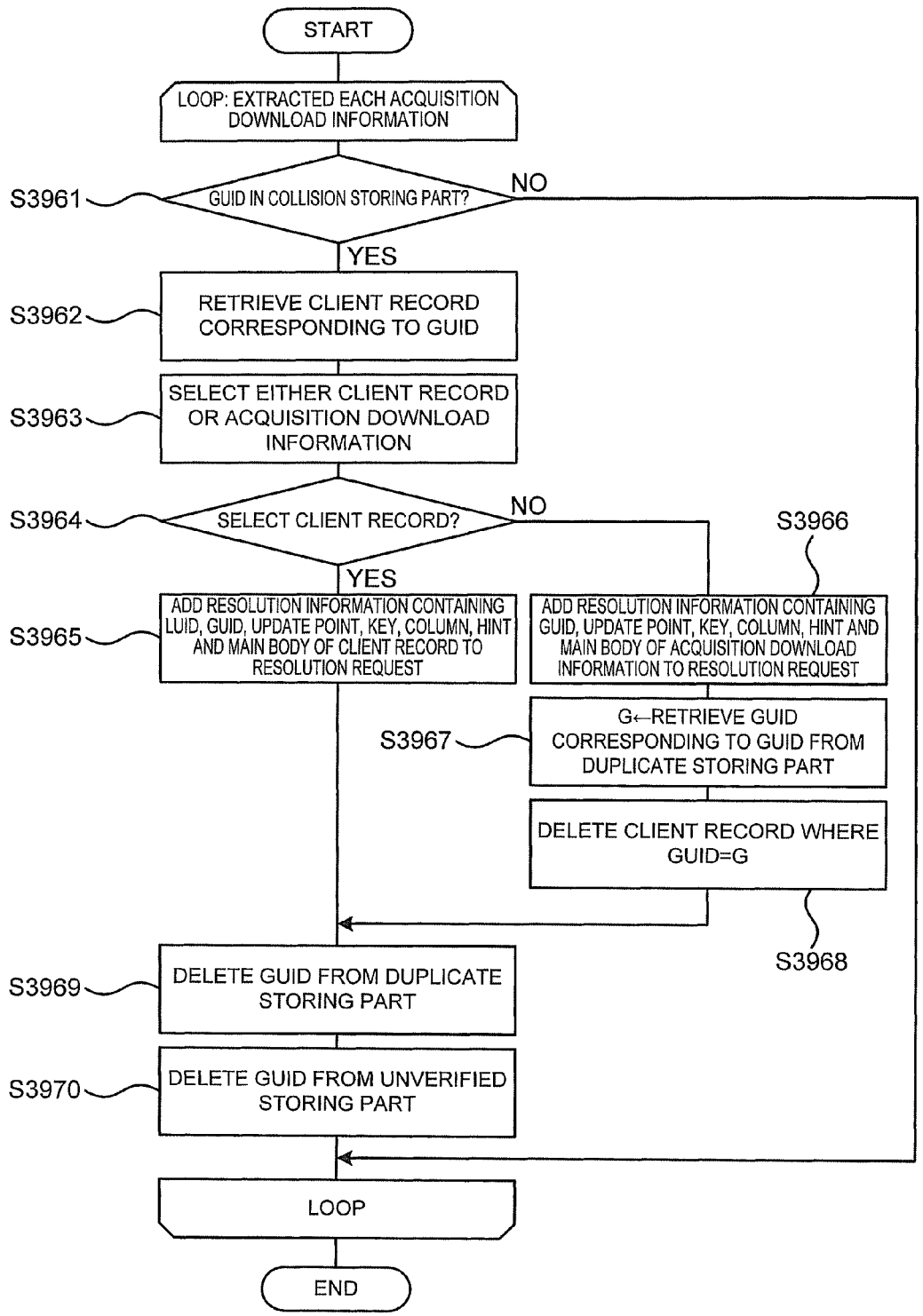
FIG. 45 is a diagram illustrating a flow of a duplication resolving process carried out at the client 10.

In a duplication resolving process shown in FIG. 45, the following processes are performed for each of the acquisition download information that are extracted in step S3906 of the above-mentioned FIG. 43.

If GUID contained in the acquisition download information is stored in the duplication storing part 136 (S3961), the resolution processing part 124 retrieves, from the client database 11, the client record corresponding to the relevant GUID (S3962), and selects either the retrieved client record or the acquisition download information (S3963). The resolution processing part 124 can, for example, similarly to the above-mentioned collision resolution process, out put the hint of the client record and acquisition download information and let the use make a selection.

In a case where the client record is selected (S3964:YES), the resolution processing part 124 adds the resolution information containing the LUID, the GUID, the update point, the key, the column, the hint and the body of the client record to the resolution request 45 (S3965), and in a case where the acquisition download information is selected (S3964:NO), adds the resolution information containing the GUID, the update point, the column, the hint and the body of the acquisition download information to the resolution request 45 (S3966). The resolution processing part 124 retrieves, from the duplication storing part 136, the GUID corresponding to the GUID of the acquisition download information and sets as "G" (S3967), deletes, from the client database 11, the client record having GUID that matches "G" (S3968).

The resolution processing part 124 deletes, from the duplication storing part 136, the record corresponding to the GUID of the acquisition download information (S3969), and deletes, from the unverified storing part 135, the GUID of the acquisition download information (S3970).

==Handing of Resolution Request (S52)==

Figure 46:
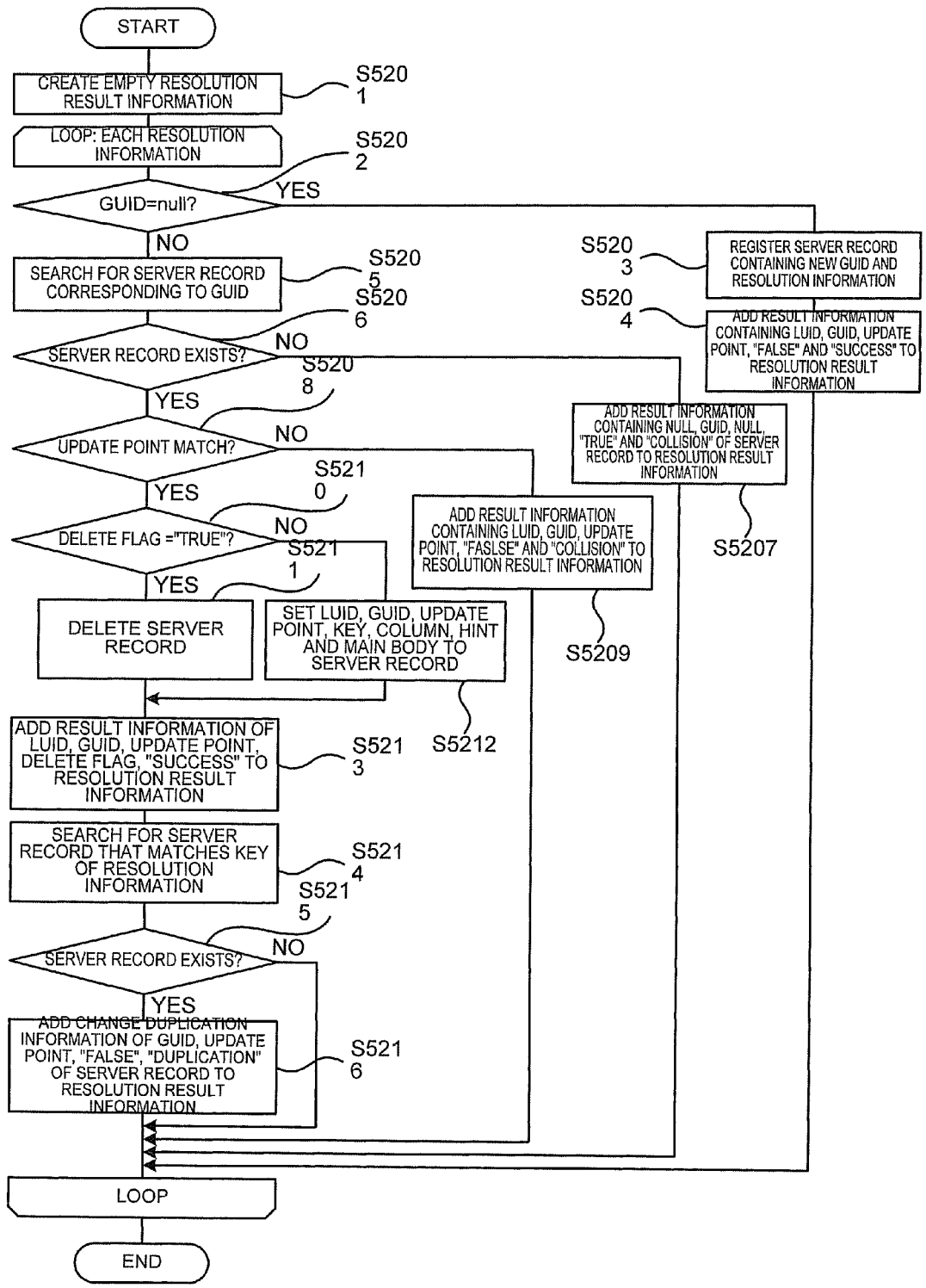
FIG. 46 is a diagram illustrating a flow of a process corresponding to a resolution request 45.

FIG. 46 is a diagram illustrating a flow of a process corresponding to a resolution request 45 performed by the server 20 in the above-mentioned step S52 in FIG. 36.

The resolution processing part 221 creates an empty resolution result information 46 (S5201) and performs the following processes for each of the resolution information contained in the resolution request 45.

In a case where the GUID of the resolution information is not set (S5202:YES), the resolution processing part 221 creates a server record in which a newly assigned GUID as well as the LUID, the update point, the key, the column, the hint and the body that are set in the resolution information and registers it into the server database 21 (S5203), and adds the result information containing the LUID, the GUID, the update point, the "FALSE" delete flag and the "SUCCESS" status to the resolution result information 46 (S5204).

On the other hand, in a case where GUID is set in the resolution information (S5202:NO), the resolution processing part 221 searches in the server database 21 for the server record corresponding to the GUID of the resolution information (S5205), and if the server record corresponding to the relevant GUID does not exist (S5206:NO), the resolution processing part 221 adds to the resolution result information 46 the result information containing GUID of the resolution information as well as the "TRUE" delete flag and the "COLLISION" status (S5207).

In a case where a server record corresponding to the above-mentioned GUID exists (S5206:YES), if the update point of the server record and the update point of the resolution information do not match (S5208:NO), the resolution processing part 221 adds to the resolution result information 46 the result information containing the GUID and update point of the server record as well as the "FALSE" delete flag and the "COLLISION" status (S5209).

If the update points match (S5208:YES) and the delete flag of the resolution information is "TRUE" (S5210:YES), the resolution processing part 221 deletes, from the server database 21, the server record corresponding to the GUID (S5211), and if the delete flag is "FALSE" (S5210:NO), the resolution processing part 221 updates the server database 21 in such a manner that the update point, the key, the column, the hint and the body of resolution information are set in the server record (S5212).

The resolution processing part 221 adds, to the resolution result information 46, the result information containing the LUID, the GUID, the update point and the delete flag of the resolution information as well as the "SUCCESS" status (S5213).

Further, the resolution processing part 221 searches in the server database 21 for the server record corresponding to the key of the resolution information (S5214), and in a case where matching server records exist (S5215:YES), adds to the resolution result information 46 the duplicate information containing GUID and update point of the searched server record as well as the "FALSE" delete flag and the "COLLISION" status (S5216).

The processes above are performed for each resolution information.

==Handling of Resolution Result (S54)==

Figure 47:
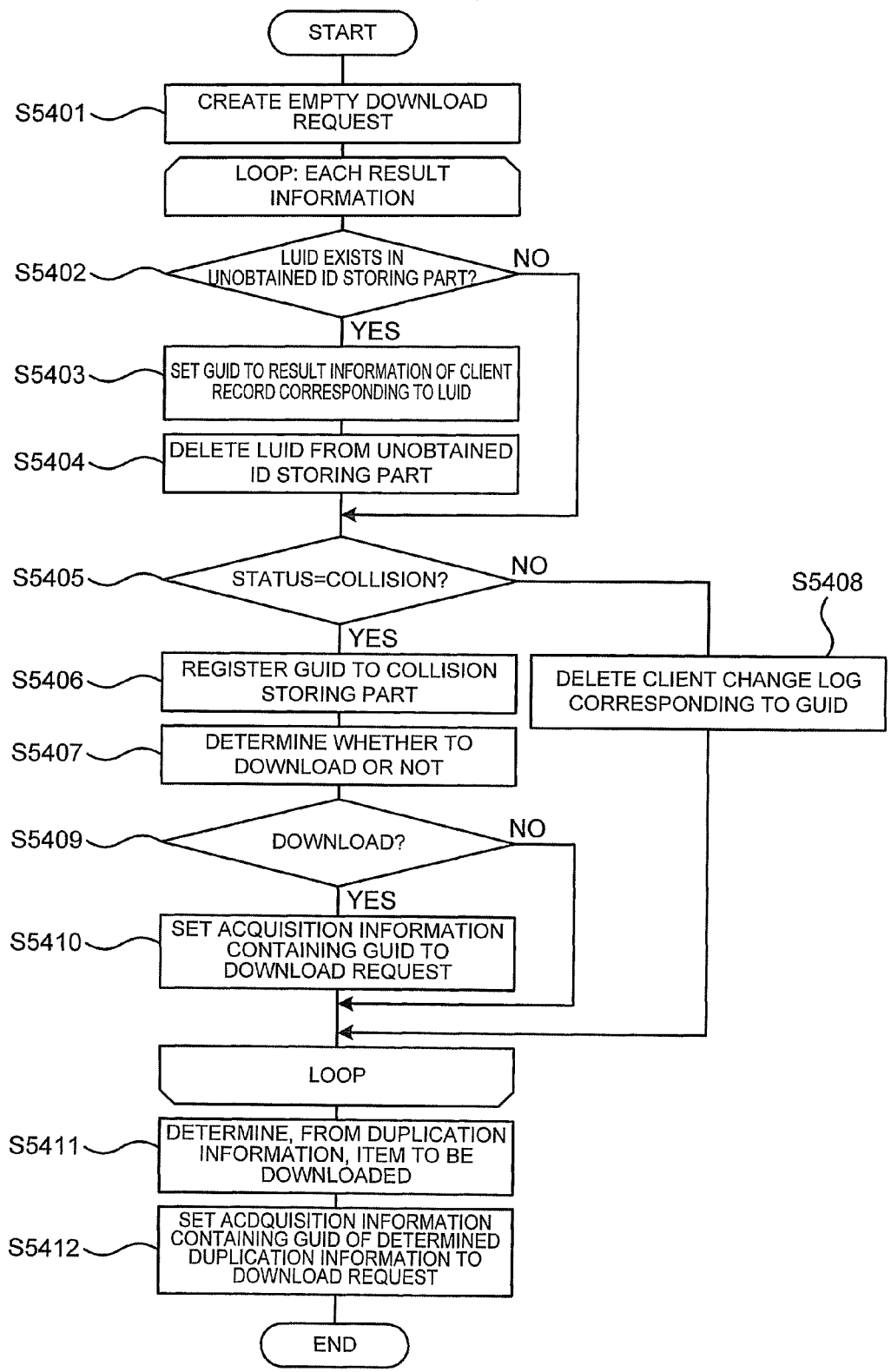
FIG. 47 is a diagram illustrating a flow of a process corresponding to resolution result information 46.

FIG. 47 is a diagram illustrating a flow of a process corresponding to resolution result information 46 performed by the client 10 in the above-mentioned step S54 of FIG. 36.

The resolution processing part 124 creates an empty download request 43 (S5401) and performs the following processes for each of the of the result information contained in the resolution result information 46.

In a case where LUID contained in the result information is registered in the unacquired ID storing part 134 (S5402:YES), the resolution processing part 124 updates the client database 11 in such a manner that GUID of the result information is set to the client record corresponding to the relevant LUID (S5403), and deletes the corresponding LUID from the unacquired ID storing part 134 (S5404).

Next, if the status is "COLLISION" (S5405:YES), the resolution processing part 124 registers GUID of the result information to the collision storing part 137 (S5406), and the download determining part 115 determines whether or not to download the data indicated by the GUID of the relevant result information (S5407). The download determining part 115 may, for example, determine to download automatically in such a manner that the collided data is given priority to the server 20; may determine not to download by giving priority the client data; or may inquire the user whether to download or not. Further, by providing the key, the column or the hint in the result information, the download determining part 115 may decide to download in a case where key, column or hint satisfies a predetermined condition. In a case where it is decided to download (S5409:YES), the download determining part 115 creates acquisition information containing the GUID of the result information and sets it into the download request 43 (S5410).

On the other hand, if the status is "SUCCESS" (S5405: NO), the resolution processing part 124 deletes, from the client change log storing part 133, the client change log corresponding to the GUID of the result information (S5408).

After having repeated the above-mentioned processes for each of the result information, the download determining part 115 determines the corresponding data is to be downloaded from the duplicate information contained in the resolution result information 46 (S5411), creates acquisition information containing the GUID of the determined duplicate information and sets it into the download request 43 (S5412). It is to be noted that in a case where acquisition information was not set in the download request 43, processes of steps S55 to S58 of the above-mentioned FIG. 36 will be omitted.

In this manner, synchronization between the client record and the server record that match the selection filter is performed.

As has been described above, according to the above-mentioned communication systems of the first and second embodiment, for the data in which the server change log is recorded in the server 20, the client 10 can reflect addition, update or delete of data based on the server change log. On the server 20 side, it is not necessary to manage which data should be updated for which client 10. Therefore, cost of managing the status for each client 10 at the server 20 can be reduced. Thus, the server 20 can be operated effectively. Therefore, it is advantageous in a case where a single server 20 is accessed by a large number of clients 10.

Further, according to the communication system of the present embodiment, by setting the filter condition in the synchronization request and sending it, the server 20 can detect addition, delete and update only for those data that match the filter condition. Therefore, for example, since only a part of data that matches the filter condition can be selectively synchronized without having to manage, at the server 20, a list of data stored in the client 10 and sending from the client 10 a list of data stored therein, and thus efficient data synchronization can be achieved.

Further, in general, since newer data is often more valuable, according to the communication system of the present embodiment, synchronization can be performed based on the server change log without performing a search in the server database 21 in which a large quantity of data is stored and thus data synchronization can be performed efficiently. In other words, data synchronization can be performed more efficiently for the more valuable data. Therefore, an efficient synchronization can be made between the client and the server.

Also, in general, since the filtered out data is not synchronized and synchronization is performed in such a manner that the data in the client 10 is deleted, in the present embodiment, the data to be synchronized is determined by the client 10 and thus the client 10 can specify the data ID in the download request also for the data that is filtered out in the server 20 and treat it as the data to be synchronized. In the client 10, the data before update is stored in the client database 11, and the user of the client 10 is interested in the data stored in the client database 11. According to the communication system of the present embodiment, even if filtered out on the server 20 side, it becomes possible to give priority to the synchronization of data that is of interest to the user, i.e., the data having a higher importance to the user, and thus it is convenient for the user. Also, by giving priority to the downloading of the data that is of interest to the user, it is expected that the user feels that the time for response has shortened.

Also, in the communication system of the present embodiment, the data that is added or updated in the server 20 is not sent abruptly and the client 10 can download only the necessary data by referring to the hint. Therefore, for example, with a mobile phone, since a storage capacity is limited and there is also a limit in the communication speed, a large quantity of data may not be downloaded, the client 10 can flexibly acquire the data depending on the storage capacity or the communication speed.

Also, according to the communication system of the present embodiment, in a case where the anchor point is before the boundary point, the server 20 searches for the data that has been added between the anchor point the boundary point, and informs the client 10 as change profile information. Therefore, even if server change log before the boundary point is not record in the server 20, the client 10 can acquire at least the added and updated data. Therefore, since data synchronization can be performed without recording all change logs in the server 20, a load on the server 20 related to data synchronization can be suppressed.

Also, according to the communication system of the present embodiment, in a case where the anchor point is before the boundary point, it is possible to query the server 20 as to whether has been any update or delete by sending, from the client 10 to the server 20, the data having update point prior to the boundary point as obsolete information. Therefore, subsequent to the update for the data for which the change log exists, synchronization can be performed for the data for which the change log does not exist. Therefore, data synchronization can be performed securely.

Also, in a case where there is an update for the column whereto the filter condition is to be applied, since the column before update is managed in the server change log storing part 231 as an old column, the data is updated in the server 20 for the data for which the change log exists and, even in a case where it does not match the filter condition, can be synchronized with the data stored in the client 10.

Also, according to the communication system of the present embodiment, the server 20 is created after the anchor point, and for the data that is deleted thereafter, update information is not sent to the client 10. Therefore, synchronization can be performed efficiently.

Also, according to the communication system of the second embodiment, even in a case where the data is changed in both the client 10 and the server 20, collision is detected in the client 10, and collision can be resolved by selecting either the data changed in the client 10 or the data changed in the server 20.

Also, in the client 10, duplication of data can be detected and duplication can be resolved. Therefore, consumption of resources by making a plurality of registration for the same data can be suppressed.

Also, according to the communication system of the second embodiment, in a case of creating the data at the client 10, the client 10 does not assign GUID, but only assigns LUID that is unique in the client 10, and therefore the server 20 can, in the same period of time, assign a global ID that is unique in the system. In the case of assigning GUID each time the client 10 creates the data, the load on the assignment process of the GUID is not negligible, but as in the second embodiment, since the client 10 simply needs to assign LUID, it is possible to suppress the process load required for the assignment of the ID. On the other hand, since the assignment of GUID can be centralized in the server 20, unique GUID can be assigned securely and in a facilitated manner.

Also, in the communication system of the second embodiment, collision in which the data has been changed in both the client 10 and the server 20 is detected and synchronization is performed after having resolved the collision based on the hint and the like. Therefore, even in a situation where a change is made on the same data from a plurality of clients 10, synchronization can be performed in an appropriate manner.
==Variants==

It is to be noted that according to the above-mentioned embodiment, the creation point, the update point and the delete point of the data are values indicating the order of change to the server database 21, but it is not limited thereto and a time stamp may be used. In such a case, a unit time of the time stamp is small (for example, millisecond or microsecond) and a plurality of changes is made on the same time stamp, the time stamp whereto identification of the data is linked is used as a "point in time", and a timing to register the server change log to the server change log storing part 231 may be delayed for at least more than the above-mentioned unit time.

Also, in the above-mentioned embodiment, in order to facilitate the explanation, it was assumed that a single client 10 and a single server 20 are provided, but may be of a configuration in which a plurality of clients 10 is connected to a single server 20, a configuration in which a single client 10 is connected to a plurality of server 20 or a configuration in which a plurality of clients 10 are connected to a plurality of servers 20.

Also, in the present embodiment, the client ID was stored in advance in the client ID storing part 131, but it is not limited thereto and, for example, the server 20 may assign a client ID to the client 10 and the client 10 may acquire the client ID assigned by the server 20 and register into the client ID storing part 131. The client ID may, for example, be reset every time the client 10 is started up.

Also, in the present embodiment, the server change log storing part 231 had server change logs related to addition, update and delete, but may manage only the server change log related to delete. In such a case, in step S3307 of processing the synchronization request 41 (FIG. 16 or FIG. 38), the server 20 acquires, from the server database 21, GUID, update point, hint and key of the server record in which the update point is later than the anchor point and sets into the change profile information. By managing delete only, resources required for managing the server change logs can be reduced.

Also, the server change log storing part 231 may be omitted. In such a case, the server 20 searches, in the server database 21, the server record containing the update point that is later than the anchor point and creates change profile information. In the step S3506 to S3508 of a handing process of the synchronization information 42 (FIG. 19 or FIG. 41), the client 10 sets "TRUE" for the delete possibility flag of all client records. Also, in such a case, for delete, instead of the server change log, the log may be managed by setting the delete flag in the server record. The server 20 may be configured to regularly delete, from the server database 21, the server record prior to a predetermined past point in time from the current point in time.

Also, in the present embodiment, in the synchronization information 42, all of the change profile information corresponding to the filter condition was contained in the synchronization information 42, but a condition for limiting the number of change profile in formations to be contained in the synchronization information 42 (hereinafter referred to as a "limit condition") may be contained in the synchronization request. The limit condition may be, for example, set as a predetermined number from the n-th record sorted by a predetermined column.

Also, in the present embodiment, the filter condition was always set, but all the data may be updated by not specifying the filter condition.

Also, in the present embodiment, the synchronization information 42, the download information 44 and the resolution request 45, etc., are sent in a single transmission, but may be sent in a plurality of times.

Also, in the present embodiment, the change profile information was contained in the synchronization information 42 also for the data that has been added or updated before the boundary point, but, the synchronization information 42 may contain only the change profile information for the data on or after the boundary point, in a case where is before the anchor point is before the boundary point, the update processing part 120 of the client 10 sets the anchor point and the boundary point into a command for acquiring data that is added or updated before the boundary point (hereinafter referred to as an "added/updated information acquisition request") and sends to the server 20, and the change acquiring part 215 of the server 20 may search in the server database 21 for the server record in which the creation point is later than the anchor point contained in the added/updated information acquisition request and the update point is before the boundary point contained in the added/updated information acquisition request, create the change profile information and send to the client 10. In such a case, it becomes possible to prioritize updating of the data based on the change log.

Also, in a case where server 20 may reset or in a case where the server 20 manages a plurality of server databases 21, an ID (hereinafter referred to as a "synchronization ID") may be assigned to the server database 21 to be synchronized, and, the synchronization request 41, the synchronization information 42, the download request 43, the download information 44, the resolution request 45 and the resolution result information 46 may be configured to contain the synchronization ID. In such a case, the client 10 may, in a case where the synchronization ID that is set in the synchronization request 41, the download request 43 and the resolution request 45, and the synchronization ID that is set in the synchronization information 42, the download information 44 and the resolution result information 46 that are sent in response from the server 20 are different, the client 10 may delete all the data stored in the client database 11 and start the synchronization process over from the beginning.

Also, in the present embodiment, for example, in step S3502 in FIG. 19, the anchor point was updated by the latest log point in the synchronization information 42, but the latest update point contained in the data that was determined to be downloaded, from the change profile information contained in the synchronization information 42, by download determining part 115 may be associated with the selected filter condition as the anchor point and registered into the anchor storing part 132. Further, it may be configured in such a manner that when the synchronization information 42 is received, the anchor point is not updated, and thereafter the download information 44 is received from the server 20 in response to the download request 43, and, every time the data is registered into the client database 112 based on the download information 44, register the update point of the registered data as the anchor point into the anchor storing part 13. Accordingly, for example, in a case where downloading is not performed at once but a process of downloading a predetermined number of data and registering into the client database 11 is repeated for a plurality of times, if the downloading fails in the mid course, synchronization of the data after the point of failure can be performed again in the next synchronization process. In such a case, the latest log point contained in the synchronization information 42 may be registered into the anchor storing part 132 as the anchor point, only when the data corresponding to all the change profile information contained in the synchronization information 42 is downloaded.

Also, in the present embodiment, the obsolete information acquiring part 117 creates obsolete information for all the client record in which the GUID is not contained in the acquisition information, among the client record in which the delete possibility flag or the update possibility flag is "TRUE", however, it is not limited thereto, and among the client record in which either delete possibility flag or the update possibility flag is "TRUE", i.e., among the data which could have been deleted or updated in the server 20, the data to be checked for whether delete or update has been performed in the server 20 is determined and the obsolete information may be created for the determined data. In such a case, the client 10 may, for example, create obsolete information for all of the client records in which at least one of the delete possibility flag and the update possibility flag is "TRUE", create obsolete information for the client data that matches a predetermined condition, or create obsolete information for the client data specified by the user of the client 10.

Also, in the present embodiment, downloading is simply not performed for those data for which the download determining part 115 has decided not to download, but, for those data that is updated in the server 20, a flag indicating that it has been updated (hereinafter referred to as an "update flag" may be set in the client record), and, those having the update flag set to TRUE may also be decided to be downloaded in the next synchronization process. In such a case, the download determining part 115 may, for example, specify the data that has been added or updated based on the change profile information contained in the synchronization information 42, search in the client database 11 for the client record whose update flag is TRUE is set to the and determine the data to be downloaded from the specified data and the searched client record.

Also, the data that the download determining part 115 has decided not to download may be downloaded afterwards or may be deleted from the client database 11.

Also, old data stored in the client database 11 may be deleted on a regular basis. In such a case, the client 10 may, for example, delete from the client records, those having an update point that is more than a predetermined time prior to the current time and date, for every predetermined period of time such as one minute, five minutes and one hour, or when a decrease in the process load in the client 10 was detected. The anchor storing part 132 may associated the filter condition with the anchor point, store the time and date at which these were stored in the anchor storing part 132 and the client 10 may determine whether the filter condition is old or new by determining whether the registration time and date is more than a predetermined time period before the current time and date and delete, from the client database 11, those client records that do not match a new filter condition from the client records that match the old filter condition.

Also, in the above-mentioned embodiment, regardless of the type of change (addition, update or delete), a single server change log was created every time the data was changed in the server 20, but, for example, a single server change log may be recorded for the updated data. In such a case, the server change log is configured in such a manner that a predetermined number of logs can be set for each field of the data, such as, for example, the field of the changed data is expressed in a list expression "{field=latest value, nearest value, . . . , oldest value}". In a case where, every time the server record is updated, the server change log corresponding to the GUID of the updated server record is searched from the server change log storing part 231 and if the server change log exists, sets the latest value of the updated server record as a latest value of the field contained in the server change log. In a case where the list of logs of the fields has exceeded a predetermined number, the oldest value is deleted from the list. In this manner, by managing a plurality of changes for a single server record by a single change log, even in a case where an update frequency of a single server record has increased, it is possible to avoid a situation in which the server change logs for the update of the relevant server record dominates the server change log storing part 231. Therefore, in a case where the number of change logs is limited, even if the update frequency of the server record is high, the change log can be managed for more data. Therefore, even with the limited change log, the change of data in the server 20 can be securely managed.

Also, in the present embodiment, the server database 21 stores the server record containing the body of the data as well as key, column and hint, but may record the body of the data and meta information, such as key, column and hint, of the relevant data as different data. For example, the server record stored in the server database 21 only contains GUID, creation point, update point and body, and the server 20 may include a header database that stores information containing GUID, update point, key, column and hint (hereinafter referred to as "header data") corresponding to each server record stored in the server database 21. In such a case, in step S3307 of a handling process to the synchronization request 41 illustrated in FIG. 16 and FIG. 38, the change acquiring part 215 retrieves, from the header database, the data in which the update point is after the anchor point and the update point is before boundary point, and creates the change profile information. Therefore, the change acquiring part 215 becomes capable of detecting the data that have been added or updated between the anchor point and the boundary point in accordance with the synchronization request 41 without accessing the server database 21, and even in a case where there are frequent accesses to the server database 21, the data to be synchronized can be detected efficiently. Also, by providing the header database, synchronization of the data can be performed using the header data without changing the configuration of the server database 21. Therefore, for example, even in a case where a server database 21 that is in operation exists, the server database 21 in operation can be easily synchronized.

Further, in a similar manner, the client 10 may be provided with a header database, separate from the client database 11, which stores header data. In such a case, for example, even when an application such as PIM (Personal Information Manager) that utilizes the client database 11 is operating in the client 10, data can be synchronized without changing the configuration of the client database.

Also, in the present embodiment, server change log for delete is registered into the server change log storing part 231, but the delete flag may be set in the server record. In such a case, when deleting the server record, the delete flag of the server record is set to TRUE, and current point in time is set to the update point. Further, among the server records where the delete flag is set to TRUE, those in which the update point of the server record is older than the boundary point (the oldest update point of the server change log registered in the server change log storing part 231) are deleted from the server database 21, on a regular basis. The change log acquiring part 214 searches in the server change log storing part 231 for the server change log that matches the selected filter condition and searches for those having the delete flag set to TRUE, among the server records that match the selected filter condition, and creates change profile information based on the searched server change log and server record. The change log acquiring part 214 determines the later one of the latest point of the server change log that matches the selected filter condition and the latest update point of the server record in which the delete flag is "TRUE" as the latest log point.

Also, in the present embodiment, the server change logs are registered together in the server change log storing part 231, but may be stored in such a manner that they are attached to the server records registered in the server database 21. For example, in a case where the server record is implemented as an object, for each instance of the server record, the server change log may be managed as its attribute. In such a case, a predetermined number of server change logs are stored for each instance and the server change log exceeding the predetermined number is deleted in a chronological order.

Also, in the present embodiment, in step S3508 of the handling process of the synchronization information 42 shown in FIG. 41 (and FIG. 19), for the data where the update point is before the boundary point, the delete possibility flag and the update possibility flag were set to TRUE, but point in time in which download was not performed due to detection of collision or duplication may also be taken into consideration. In such a case, in the client record, an "observation point" indicating the update point of the known server record is made to be contained, and, for example, in the loop of the above-mentioned collision resolving process of FIG. 44 or the duplication resolving process of FIG. 45, if a client record corresponding to the GUID set in the acquisition download information exist in the client database 11, the update point of the acquisition download information is set in the observation point of the corresponding client record. Further, in a case where the observation point of the client record that matches the filter condition is prior to the anchor point corresponding to the filter condition, the observation point of the client record is updated to the anchor point. Further, in S3508 of FIG. 41, only the update possibility flag is set to "TRUE" and thereafter, those that match the filter condition and in which the observation point is before the boundary point is searched and the delete possibility flag of the searched client data is set to "TRUE". Thus, the delete possibility flag will not be set to the data that is before the point where it is known to be not deleted in the server 20. Thus, the client 10 can determine, for the client record in which the delete possibility flag is "FALSE" and the update possibility flag is "TRUE", that the relevant client record is at least not deleted in the server. Therefore, for example, in a case where the client 10 inquires the server 20 about whether the client record has been deleted in the server 20, since it is only necessary to inquire the server about the client record in which the delete possibility flag is "TRUE", the client records for which an inquiry is to be made can be narrowed down. Further, in a case where download determining part 115 determines the data to be downloaded, it is possible to prioritize in accordance with the delete possibility flag. For example, in a case where there is a limit on the number of data that can be download in a single download, the data in which the delete possibility flag is "FALSE" can be downloaded first, or reversely, the data in which the delete possibility flag is "TRUE" can be downloaded first.

Also, in the second embodiment, the server 20 sends back, to the client 10, only the server change log that matches the filter condition contained in the synchronization request 41, but it is not limited thereto, and, for example, even if it does not match the filter condition, those having a value similar to the value designated to the filter condition can be set to the synchronization information 42. In such a case, the server 20 sets the flag indicating that there was no match to the filter condition (hereinafter referred to as a "match unknown flag") to the synchronization information 42 and attached to the server change log. The client 10 may, for example, for those in which the match unknown flag is FALSE, indicate to the user as a suggestion information indicating that it does not match the filter condition, but has a possibility of a match.

Also, in the second embodiment, the synchronization request 41 contains change profile information of all the client change logs in which the GUID is not registered in the duplication storing part 136 and the collision storing part 137, but the synchronization request 41 may contain only the change profile information based on the client change log in which GUID is not registered in the duplication storing part 136 and the collision storing part 137, and also the type of change is "delete". In such a case, in the handling process of the synchronization request (FIG. 38) in step S33 shown in FIG. 36, the server 20 omits the collision/duplication detecting process of step S3310, and for those client change logs in which the type of change is other than "delete", for those that collide, the resolution processing part 124 selects, in step 3943 of FIG. 44, either the client record or the server record, and for those that are contained in the resolution request 45 but do not collide, the resolution processing part 124 causes, after the 3908 of FIG. 43, the corresponding client record to be contained in the resolution request 45. In this manner, process load for performing collision and duplication processes in the server 20 can be reduced.

In the description above, the present embodiment has been described. However, the above-mentioned present embodiment is for facilitating the understanding of the present invention and is not to be construed as limiting the present invention. The present invention may be variously be modified or altered without departing from its spirit and encompass equivalents thereof.

LIST OF REFERENCE NUMERALS 10 client
11 client database
20 server
21 server database
30 communication network
41 synchronization request
42 synchronization information
43 download request
44 download information
45 resolution request
46 resolution result information
101 CPU
102 memory
103 storage unit
104 communication interface
105 input unit
106 output unit
110 client change detecting part
111 filter selecting part
112 synchronization request sending part
113 synchronization information receiving part
114 delete processing part
115 download determining part
116 anchor updating part
117 obsolete information acquiring part
118 download request sending part
119 download information receiving part
120 update processing part 121 collision/duplicate resolution determining part
122 resolution request sending part
123 resolution result information receiving part
124 resolution processing part
131 client ID storing part
132 anchor storing part
133 client change log storing part
134 unacquired ID storing part
135 unverified storing part
136 duplication storing part
137 collision storing part
201 CPU
202 memory
203 storage unit
204 communication interface
205 input unit
206 output unit
210 GUID creating part
211 point-in-time creating part
212 database changing part
213 synchronization request receiving part
214 change log acquiring part
215 change acquiring part
216 synchronization information sending part
217 download request receiving part
218 data acquiring part
219 download information sending part
220 resolution request receiving part
221 resolution processing part
222 resolution result information sending part
231 server change log storing part

The invention claimed is:

1. A data synchronization system for synchronizing data between a server and a client communicably connected to the server,
   the server being accessible to a first database configured to store at least one data item containing an update point,
   the client being accessible to a second database configured to store the data item acquired from the server,
   the server comprising a storage device that stores a program, a memory, and a CPU,
   the client comprising a storage device that stores a program, a memory, and a CPU,
   the server further comprising a change information acquiring part, a synchronization information sending part, a data acquiring part and a download information sending part, which are implemented by the CPU of the server executing the program stored in the storage device of the server,
   the client further comprising an anchor point storing part implemented by at least one of the memory of the client and the storage device of the client,
   the client further comprising a synchronization request sending part, a download determining part, a download request sending part and an update processing part, which are implemented by the CPU of the client executing the program stored in the storage device of the client,
   the anchor point storing part storing an anchor point which is a point in time at which the data item was last acquired from the server; and
   the synchronization request sending part configured to send a synchronization request containing the anchor point to the server,
   the change information acquiring part configured to search for an updated data item in the first database, the updated data item being the data item in which the update point is later than the anchor point, and to create change information for data item, the change information containing a data ID indicating the updated data item and the update point of the updated data item; and
   the synchronization information sending part configured to send synchronization information containing the change information to the client,
   the download determining part configured to determine an acquisition data item to be downloaded from the data item corresponding to the change information; and
   the download request sending part configured to send a download request to the server, the download request containing a data ID indicating the acquisition data item,
   the data acquiring part configured to acquire, from the first database, the data item corresponding to the data ID contained in the download request; and
   the download information sending part configured to send download information containing the acquired data to the client, and
   the update processing part configured to register the data item contained in the download information into the second database.

2. The data synchronization system according to claim 1, wherein, for each of the change information, the download determining part acquires, from the second database, the update point contained in the data item corresponding to the data ID contained in the change information, and in a case where the update point acquired from the second database is older than the update point contained in the change information, determines that the data item is to be downloaded, and in a case where the update point acquired from the second database is newer than the update point contained in the change information, determines whether or not to download the data item in response to a setting specified by a user.

3. The data synchronization system according to claim 1, wherein
   the server further includes:
   a server change log storing part configured to store a change log containing the data ID indicating the data item deleted from the first database and a delete point; and
   a change log acquiring part configured to acquire, from the server change log storing part, the change log that contains the delete point which is later than the anchor point contained in the synchronization request,
   the synchronization information sending part adds the change log acquired by the change log acquiring part into the synchronization information, and
   the client further includes a delete processing part that deletes, from the second database, the data item corresponding to the change log contained in the synchronization information.

4. The data synchronization system according to claim 1, wherein
   the server includes a server change log storing part configured to store, for a data item deleted from the first database, a predetermined number of change logs each containing a data ID indicating the deleted data item and a delete point in a reverse chronological order of the delete point,
   the change information acquiring part acquires, from the server change log storing part, the change log containing the delete point after the anchor point,
   the synchronization information sending part sends the synchronization information to the client with a boundary point and the acquired change log contained therein in addition to the change information, the boundary point being the oldest delete point contained in the change log contained in the change log stored in the server change log storing part,
the client further includes:
a delete processing part configured to delete, from the second database, the data item corresponding to the change log contained in the synchronization information; and
an obsolete information acquiring part configured to search through the data items stored in the second database for the data item in which the update point of the data item is before the boundary point and the change information containing a data ID indicating the data item is not contained in the synchronization information, in a case where the anchor point is before the boundary point, and to create obsolete information containing, for each of the searched data item, the data ID indicating the data item and the update point of the data item,
the download request sending part sends the download request to the server, the download request containing the obsolete information therein in addition to the acquired data ID,
the data acquiring part further determines, for each of the obsolete information contained in the download request, whether the data item corresponding to the obsolete information is stored in the first database or not, and adds the data ID indicating the data item which has been determined as not being stored in the first database into the download information as a delete ID indicating deleted data item, and
the delete processing part deletes, from the second database, the data item corresponding to the delete ID contained in the download information.

5. The data synchronization system according to claim 1, wherein the client includes a collision resolving part configured to retrieve, from the second database and for each of the change information contained in the synchronization information, the update point of the data item corresponding to the data ID contained in the change information, and to determine, in a case where the retrieved update point is newer than the update point contained in the change information, whether to upload the data item corresponding to the data ID to the server or to download the data item corresponding to the data ID from the server,
the download request sending part sends the download request to the server, the download request further containing the data ID indicating the data item which has been determined by the collision resolving part to be downloaded,
the client further includes a resolution request sending part configured to retrieve, from the second database, the data item which has been determined by the collision resolving part to be uploaded, and to send a resolution request that contains the retrieved data item to the server, and
the server further includes a resolution processing part configured to register the data item contained in the resolution request into the first database.

6. A data synchronization system for synchronizing data between a server and a client communicably connected to the server,
the server being accessible to a first database configured to store at least one data item with an update point being attached to the data item,
the client being accessible to a second database configured to store the data item acquired from the server,
the server comprising a storage device that stores a program, a memory, and a CPU;
the client comprising a storage device that stores a program, a memory, and a CPU;
the server further comprising a server change log storing part implemented by at least one of the memory of the server and the storage device of the server;
the server further comprising a change log acquiring part, a change information acquiring part, a synchronization information sending part, a data acquiring part and a download information sending part;
the client further comprising an anchor storing part implemented by at least one of the memory of the client and the storage device of the client;
the client further comprising a synchronization request sending part, a download determining part, an obsolete information acquiring part, a download request sending part an update processing part;
the server change log storing part configured to store only a predetermined number of change logs of the data item with respect to the first database in a reverse chronological order;
the change log stored in the server change log storing part being a server change log, the server change log containing a data ID indicating the data item that has been changed and an update point attached to the data item;
the anchor storing part that stores an anchor point which is a point in time at which the data item was last acquired from the server;
the synchronization request sending part configured to send a synchronization request to the server, the synchronization request containing a condition for acquiring the data item and the anchor point;
the change log acquiring part configured to acquire, from the server change log storing part, a server change log having the update point that is later than the anchor point from the server change log corresponding to the data item that matches the condition contained in the synchronization request;
the change information acquiring part configured to search, in the first database, for the data item having the update point later than the anchor point and before a boundary point, the boundary point being the latest update point stored in the server change log storing part, through the data items that match the condition contained in the synchronization request and to create, for each of the searched data item, change information containing the data ID indicating the data item and the update point attached to the data item;
the synchronization information sending part configured to send synchronization information to the client, the synchronization information containing the boundary point, the acquired server change log and the change information,
the download determining part configured to determine the data item to be downloaded from among the data items corresponding to one of the server change log and the change information contained in the synchronization information;
the obsolete information acquiring part configured to search in the second database for the data item having the update point between the anchor point and the boundary point through the data items that matches the condition, and to create, for each of the searched data item, obsolete information containing the data ID indicating the data item and the update point attached to the data item;

the download request sending part configured to send a download request to the server, the download request containing an acquired data ID indicating the determined data item and the obsolete information, the data acquiring part configured to acquire, from the first database, the data item having the update point newer than the update point contained in the obsolete information and the data item corresponding to the acquired data ID from the data item corresponding to the obsolete information in the download request;

the download information sending part configured to send download information containing the acquired data item to the client; and the update processing part configured to register the data item contained in the download information into the second database.

7. The data synchronization system according to claim 6, wherein the server change log further contains type-of-change information indicating one of addition, update and delete for the change of data item, and the client further includes a delete processing part that deletes, from the second database and in response to reception of the synchronization information, the data item identified by the data ID contained in the server change log for those server change logs contained in the synchronization information in which the type of change information indicate delete.

8. The data synchronization system according to claim 6, the data acquiring part sets delete information containing the data ID contained in the obsolete information into the download information, for those obsolete information contained in the download request in which the data item corresponding to the data ID contained in the obsolete information is not registered in the first database, and the client further includes a delete processing part that deletes, from the second database, the data item corresponding to the data ID contained in the delete information, in a case where the delete information is contained in the download information.

9. The data synchronization system according to claim 6, wherein the data item further includes a column attached thereto, the column being information for determining whether the data item matches the condition and created based on a content of the data item, the server change log further contains type-of-change information indicating one of addition, update and delete of data item regarding the change of data item, and the column attached to the data item, the change log acquiring part acquires those server change log in which the column matches the condition contained in the synchronization request and the update point is later than the anchor point, the change information acquiring part searches through the data items stored in the first database for the data item in which the column attached to the data item matches the condition contained in the synchronization request and in which the update point is after the anchor point and before the boundary point, and for each of the searched data item, sets the data ID indicating the data item, the update point attached to the data item, and column contained in the data item to the change information, and the obsolete information acquiring part searches through the data items stored in the second database for the data item in which the column matches the condition and the update point is between the anchor point and the boundary point.

10. The data synchronization system according to claim 6, wherein the data item further includes a hint attached thereto that is information for determining whether or not to download the data item at the client, the hint being created based on a content of the data item, the server change log further includes type of change information indicating which of addition, update and delete the change of data item was and the hint attached to the data item, the change information acquiring part further adds, for each of the searched data item, the hint added to the data item, and the download determining part determines the data item to be downloaded based on one of the server change log and the hint contained in the change information.

11. The data synchronization system according to claim 10, wherein the download determining part outputs the hint contained in one of the server change log and the change information, and determines the data item corresponding to the output data item selected by the user as the data item to be downloaded.

12. The data synchronization system according to claim 6, wherein the data item includes the update point attached thereto, the server further includes a point-in-time creating part that creates, as the update point, a numerical value that increases each time an operation on the first database is performed, and the update point created by the point-in-time creating part is attached to the data item when the data item is written into the first database.

13. The data synchronization system according to claim 6, wherein the data item includes the update point attached thereto, the server further includes a point-in-time creating part that acquires, when an operation to the first database is performed, a time stamp at the server and creates, as the update point, a linked value of the acquired time stamp and an identification value of the data item, and the update point created by the point-in-time creating part is attached to the data item when the data item is written into first database.

14. The data synchronization system according to claim 6, wherein, the client further includes a client change log storing part that stores a change log of the data item at the second database, the change log stored in the client change log storing part being a client change log, the client change log containing the data ID of the data item that has been changed and the update point attached to the data item, the synchronization request sending part acquires the client change log that corresponds to the data item that matches the condition, sets the acquired client change log to the synchronization request and sends to the server, the server further includes a collision detecting part configured to create collision information containing the update point attached to the data item stored in the first database and the data ID, for each of the client change logs contained in the synchronization request, in a case where the update point attached to the data item stored in the first database and corresponding to the data ID contained in the client change log is later than the update point contained in the client change log, the synchronization information sending part sends the synchronization information to the client, the synchronization information further containing the collision information, the client further includes a collision resolving part configured to determine whether the data item corresponding to the data ID contained in the collision information is to be uploaded to the server or downloaded from the server, the download request sending part sends the download request to the server, the download request further containing the data ID indicating the data item that the collision resolving part has decided to download, the client further includes a resolution request sending part configured to retrieve, from the second database, the data item that has been determined by the collision resolving part to be uploaded, and to send a resolution request containing the retrieved data item to the server, and the server further includes a resolution processing part configured to register the data item contained in the resolution request into the first database.

15. The data synchronization system according to claim 14, wherein the data item further includes a key attached thereto, the key being a data item derived by applying a predetermined algorithm to the data item, the server change log and the client change log each contains the key, the server further includes a duplicate detecting part configured to perform a search through the data items stored in the first database for the data item having a key that matches a key contained in one of the client change logs contained in the synchronization request and to create duplicate information containing the data ID identifying the searched data item, the synchronization information sending part sends the synchronization information further containing the duplicate information to the client, the client includes a duplicate resolution part that determines a data item to be deleted from among the data items corresponding to the data ID contained in the duplicate information, the resolution request sending part sends resolution information to the server, the resolution information containing the data ID indicating the data item that has been determined by the duplication resolution part to be delete, the resolution information being further contained in the resolution request, and the resolution processing part further deletes, from the first database, the data item corresponding to the data ID contained in the resolution information contained in the resolution request.

16. The data synchronization system according to claim 14, wherein the data item includes the data ID attached thereto, the data ID contains a local ID that is unique identification information in the client and a global ID that is unique identification information in both the server and the client, the client further includes:

a local ID assigning part that assigns the local ID to the created data item in a case where the data item has been created in the client, and an unacquired ID storing part that stores an unacquired ID whereto the global ID is not assigned from among the local IDs assigned to the created data item, the synchronization request sending part further sends the synchronization request to the server with the unacquired ID stored in the unacquired ID storing part being contained therein, the server further includes a global ID acquisition part configured to perform a search on the first database for the global ID corresponding to the acquired ID contained in the synchronization request, and to acquire, in a case where there is the global ID corresponding to the unacquired ID, the corresponding global ID from the first database, to create an ID information containing the acquired global ID and the unacquired ID, and to newly assign the global ID and create an ID information containing the assigned global ID and the local ID, in a case where there is no global ID corresponding to the local ID, the synchronization information sending part further sends the synchronization information to the client with the ID information being contained in the synchronization information, the client further includes a global ID registering part configured to search, for each of the ID information contained in the synchronization information, in the first database for the data item corresponding to the unacquired ID contained in the ID information, and to set the global ID contained in the ID information to the data ID attached to the searched data item.

17. A method of synchronizing data between a server and a client communicably connected to the server, the server being accessible to a first database configured to store at least one data item containing an update point, the client being accessible to a second database configured to store the data item acquired from the server, the method comprising:

storing by the client an anchor point which is a point in time at which the data item was last acquired from the server, the client sending a synchronization request containing the anchor point to the server, searching by the server in the first database for an updated data item that is the data item having the update point later than the anchor point, creating by the server change information for data items, the change information containing a data ID indicating the updated data item and the update point of the updated data item, the server sending synchronization information containing the change information to the client, determining by the client an acquisition data item to be downloaded from among the data items corresponding to the change information and sending a download request containing a data ID indicating the acquisition data item to the server, acquiring by the server the data item corresponding to the data ID contained in the download request from the first database, the server sending download information containing the acquired data item to the client, and registering by the client the data item contained in the download information into the second database.

18. The data synchronization method according to claim 17, further comprising:

retrieving, by the client, from the second database and for each of the change information contained in the synchronization information, the update point of the data item corresponding to the data ID contained in the change information, and when the retrieved update point is newer than the update point contained in the change information, and determining, by the client, whether the data item corresponding to the data ID is to be uploaded to the server or to be downloaded from the server, sending, by the client, the download request to the server, the download request further including the data ID indicating the data item that has been determined to be downloaded, retrieving, by the client, from the second database, the data item that has been determined to be uploaded and sending a resolution request containing the retrieved data item to the server, and registering, by the server, the data item contained in the resolution request into the first database.

19. A method of synchronizing data between a server and a client communicably connected to the server, the server being accessible to a first database configured to store at least one data item with an update point attached thereto, the client being accessible to a second database configured to store the data item acquired from the server, the method comprising:

storing, by the server, a predetermined number of change logs of data item corresponding to the first database in a reverse chronological order, the change log stored in the server being a server change log, the server change log including a data ID indicating the data item that has been changed and the update point attached to the data item, storing, by the client, an anchor point that is a point in time at which the data item was last acquired from the server, sending, by the client, a synchronization request containing a condition for acquiring the data item and the anchor point to the server, acquiring, by the server, from the server change logs corresponding to the data item that matches the condition contained in the synchronization request, the server change log having the update point that is later than the anchor point, searching, by the server, in the first database through the data items that match the condition contained in the synchronization request for the data item in which the update point is later than the anchor point and before a boundary point which is the oldest of the update point of the server change log stored in the server, creating, by the server, for each of the searched data item, change information containing the data ID indicating the data item and the update point attached to the data item, sending, by the server, synchronization information to the client, the synchronization information containing the boundary point, the acquired server change log, and the change information, determining, by the client, the data item to be downloaded from the data item corresponding to one of the server change log and the change information contained in the synchronization information, searching, by the client, in the second database through the data items that match the condition for the data item having the update point between the anchor point and the boundary point and creating, for each of the searched data item, obsolete information containing the data ID indicating the data item and the update point attached to the data item, sending, by the client, a download request to the server, the download request containing an acquisition data ID indicating the determined data item and the obsolete information, acquiring, by the server, from the first database and from the data items corresponding to the obsolete information contained in the download request, the data item having the update point newer than the update point contained in the obsolete information and corresponding to the acquired data ID, sending, by the server, download information containing the acquired data item to the client, and registering, by the client, the data item contained in the download information into the second database.

20. The data synchronization method according to claim 19, further comprising:

storing, by the client, a change log of the data item at the second database, the change log stored in the client being a client change log, the client change log containing the data ID indicating the data item that has been changed and the update point attached to the data item, acquiring, by the client, the client change log corresponding to the data item that matches the condition, setting, by the client, the acquired client change log to the synchronization request and sending it, by the client, to the server, creating, by the server, for each of the client change log contained in the synchronization request, collision information containing the update point attached to the data item stored in the first database and the data ID, in a case where the update point corresponding to the data ID contained in the client change log and attached to the data item stored in the first database is later than the update point contained in the client change log, sending, by the server, the synchronization information to the client, the synchronization information further containing the collision information, determining, by the client, whether the data item corresponding to the data ID contained in the collision information is to be uploaded to the server or to be downloaded from the server, sending, by the client, the download request to the server, the download request further containing the data ID indicating the data item determined to be downloaded, retrieving, by the client, from the second database, the data item determined to be uploaded and sending a resolution request containing the retrieve data item to the server, and registering, by the server, the data item contained in the resolution request into the first database.

* * * * *

UNITED STATES PATENT AND TRADEMARK OFFICE
CERTIFICATE OF CORRECTION

| | | |
|---|---|---|
| PATENT NO. | : 8,775,374 B2 | Page 1 of 1 |
| APPLICATION NO. | : 13/390431 | |
| DATED | : July 8, 2014 | |
| INVENTOR(S) | : Yoshiaki Araki et al. | |

It is certified that error appears in the above-identified patent and that said Letters Patent is hereby corrected as shown below:

In the Claims

In claim 4, column 43, line 1, "contained in the change log" should be deleted.

Signed and Sealed this
Third Day of February, 2015

Michelle K. Lee
*Deputy Director of the United States Patent and Trademark Office*